(12) United States Patent
Asano et al.

(10) Patent No.: US 8,416,949 B2
(45) Date of Patent: Apr. 9, 2013

(54) ACTOR NODE, SENSOR NODE, COVERAGE BLOCK CHANGE METHOD, PARAMETER CHANGE METHOD, PROGRAM, AND INFORMATION PROCESSING SYSTEM

(75) Inventors: Tomoyuki Asano, Kanagawa (JP); Masafumi Kusakawa, Tokyo (JP); Imsung Choi, Suwon (KR)

(73) Assignee: Sony Corporation (JP)

( * ) Notice: Subject to any disclaimer, the term of this patent is extended or adjusted under 35 U.S.C. 154(b) by 328 days.

(21) Appl. No.: 12/927,515

(22) Filed: Nov. 17, 2010

(65) Prior Publication Data

US 2011/0145578 A1    Jun. 16, 2011

(30) Foreign Application Priority Data

Dec. 15, 2009    (JP) ................ P2009-284226

(51) Int. Cl.
*H04L 9/28* (2006.01)
*H04L 9/32* (2006.01)
*H04L 9/08* (2006.01)

(52) U.S. Cl. .......... 380/44; 380/277; 380/278; 713/150; 713/153; 713/169; 713/171

(58) Field of Classification Search .............. 713/150, 713/153, 169–171; 380/44, 277–278
See application file for complete search history.

(56) References Cited

U.S. PATENT DOCUMENTS

| 8,107,397 | B1* | 1/2012 | Bagchi et al. | 370/254 |
|---|---|---|---|---|
| 2004/0215639 | A1* | 10/2004 | Bamford et al. | 707/100 |
| 2009/0024848 | A1* | 1/2009 | Takasugi et al. | 713/169 |
| 2009/0257373 | A1* | 10/2009 | Bejerano | 370/328 |
| 2010/0261495 | A1* | 10/2010 | Li et al. | 455/513 |

OTHER PUBLICATIONS

Fei Hu ; Xiaojun Cao, Security in Wireless Actor & Sensor Networks (WASN):Towards A Hierarchical Re-Keying Design, IEEE, 2005 NY USA.*
Kui Ren, Shucheng Yu, Wenjing Lou, and Yanchao Zhang,Multi-User Broadcast Authentication in Wireless Sensor Networks, IEEE vol. 58, No. 8, Oct. 2009.*
Ali Abbasi, Euhanna Ghadimi, Ahmad khonsari , Naser Yazdani, and Mohamed Ould-Khaoua. A Distributed Clustering Algorithm for Fault-Tolerant Event Region Detection in Wireless Sensor Networks, ISPA 2007 Workshops, LNCS 4743, pp. 493-502, 2007 Berlin Heidelberg 2007.*
"Hybrid Authentication and Key Management Scheme for WSANs", Cao et al., ISPA Workshops 2005, LNCS 3759, pp. 454-465, 2005.
"Key Establishment Between Heterogenous Nodes in Wireless Sensor and Actor Networks", Yu et al., APWeb Workshops 2006, LNCS 3842, pp. 196-205, 2006.

* cited by examiner

*Primary Examiner* — Andrew Nalven
*Assistant Examiner* — Amir Mehrmanesh
(74) *Attorney, Agent, or Firm* — Lerner, David, Littenberg, Krumholz & Mentlik, LLP

(57) ABSTRACT

An actor node according to the present invention includes a dynamic change unit for temporarily changing a coverage block in which data are obtained from a sensor node and temporarily causing another actor node to obtain, on behalf of the actor node, data from the sensor node arranged in a partial region of at least a portion of the coverage blocks. The dynamic change unit obtains identification information unique to the another actor node from the another actor node. The dynamic change unit notifies, to the sensor node arranged in the partial region, the obtained identification information. The dynamic change unit notifies, to the another actor node, a portion of the hash chain and a temporary key generated using the obtained identification information and the key used for communication with the sensor node arranged in the partial region.

10 Claims, 33 Drawing Sheets

1 : INFORMATION PROCESSING SYSTEM

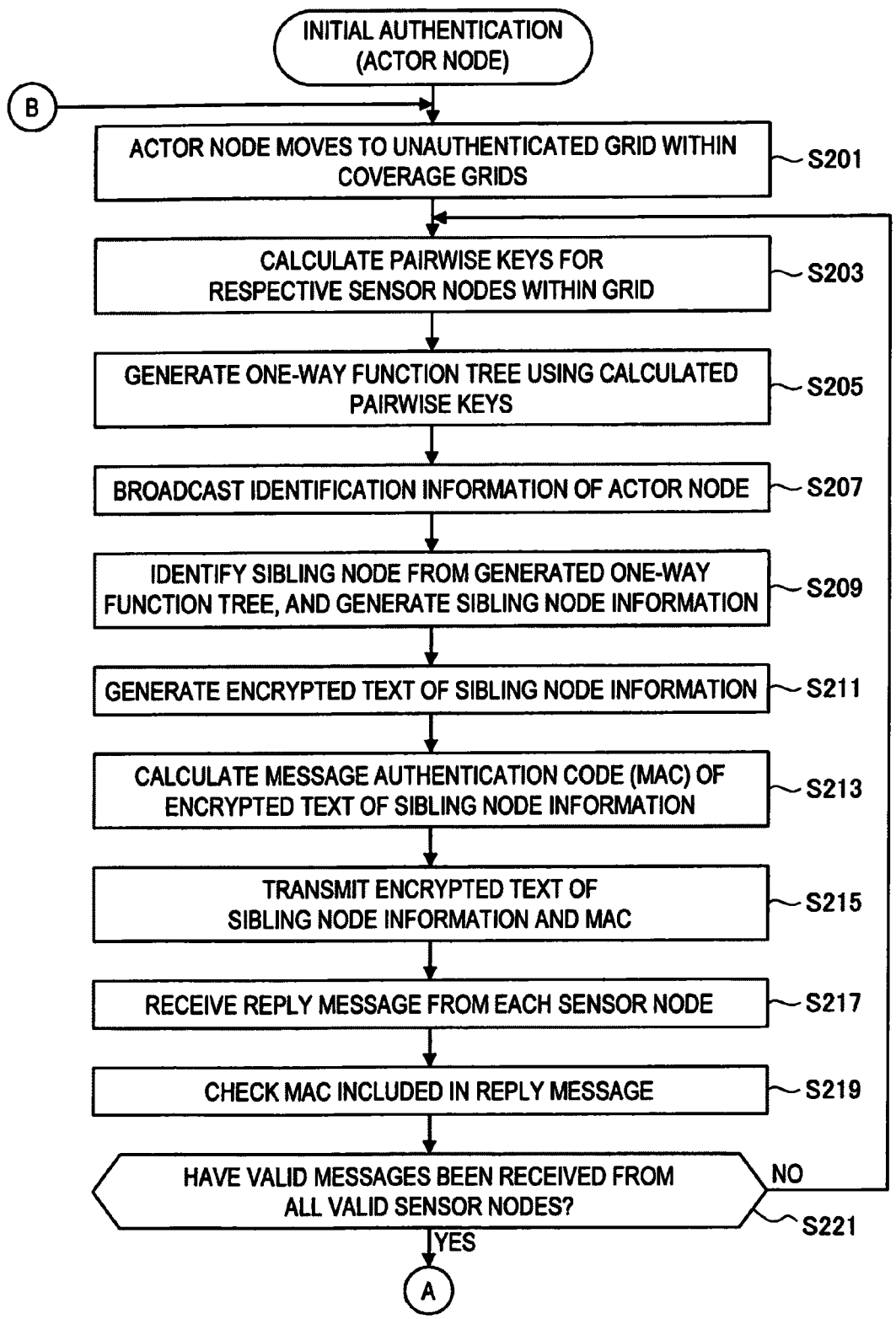

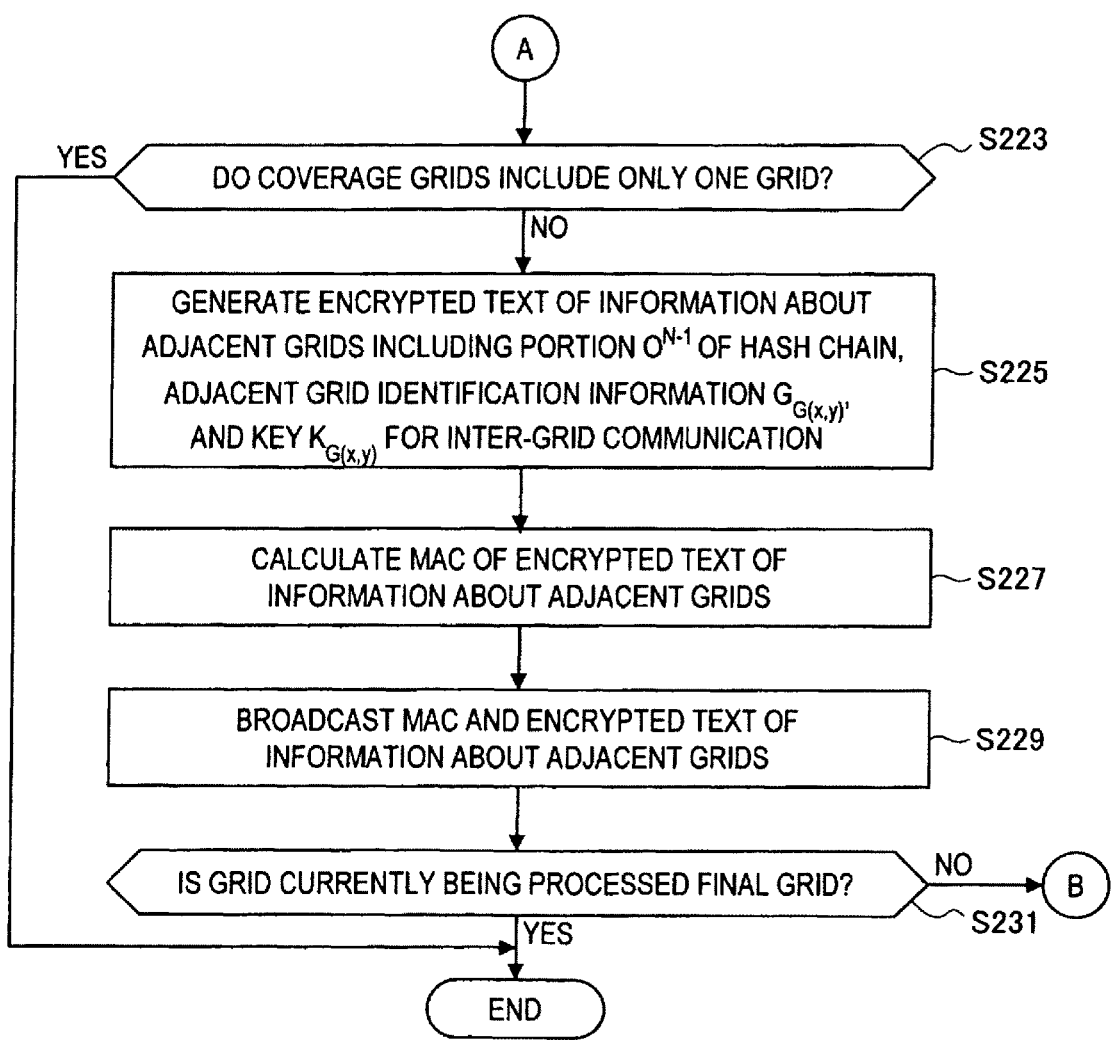

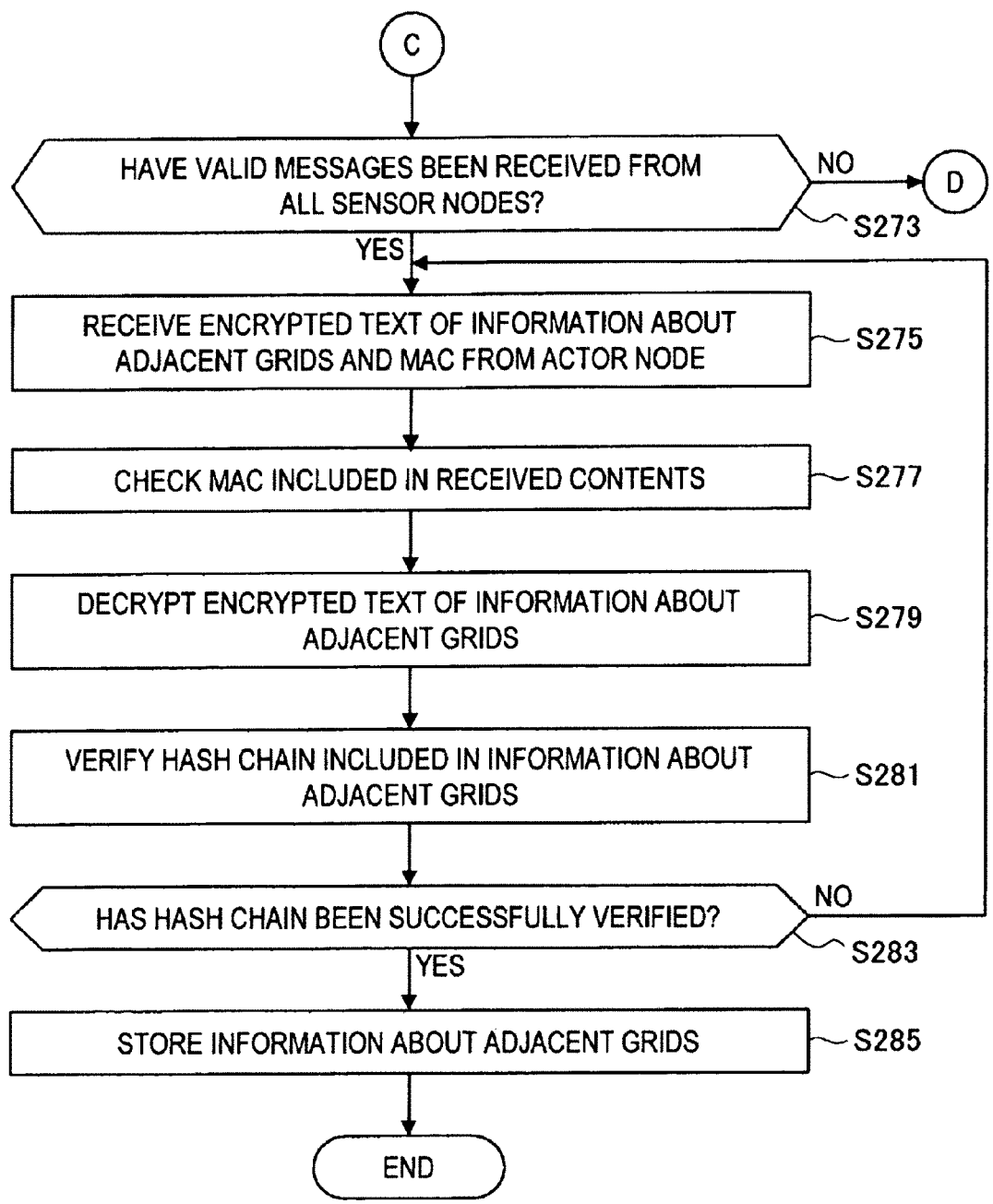

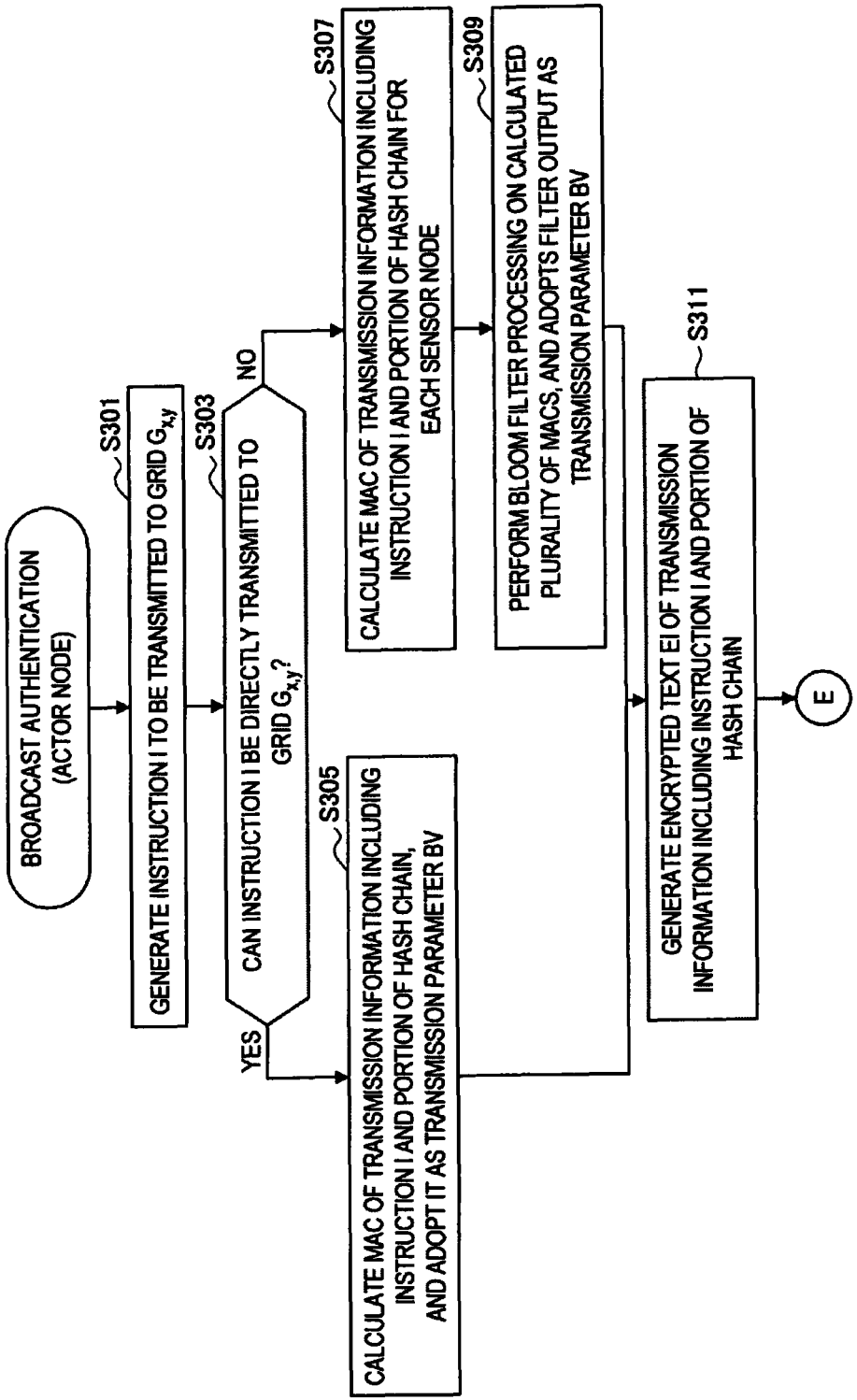

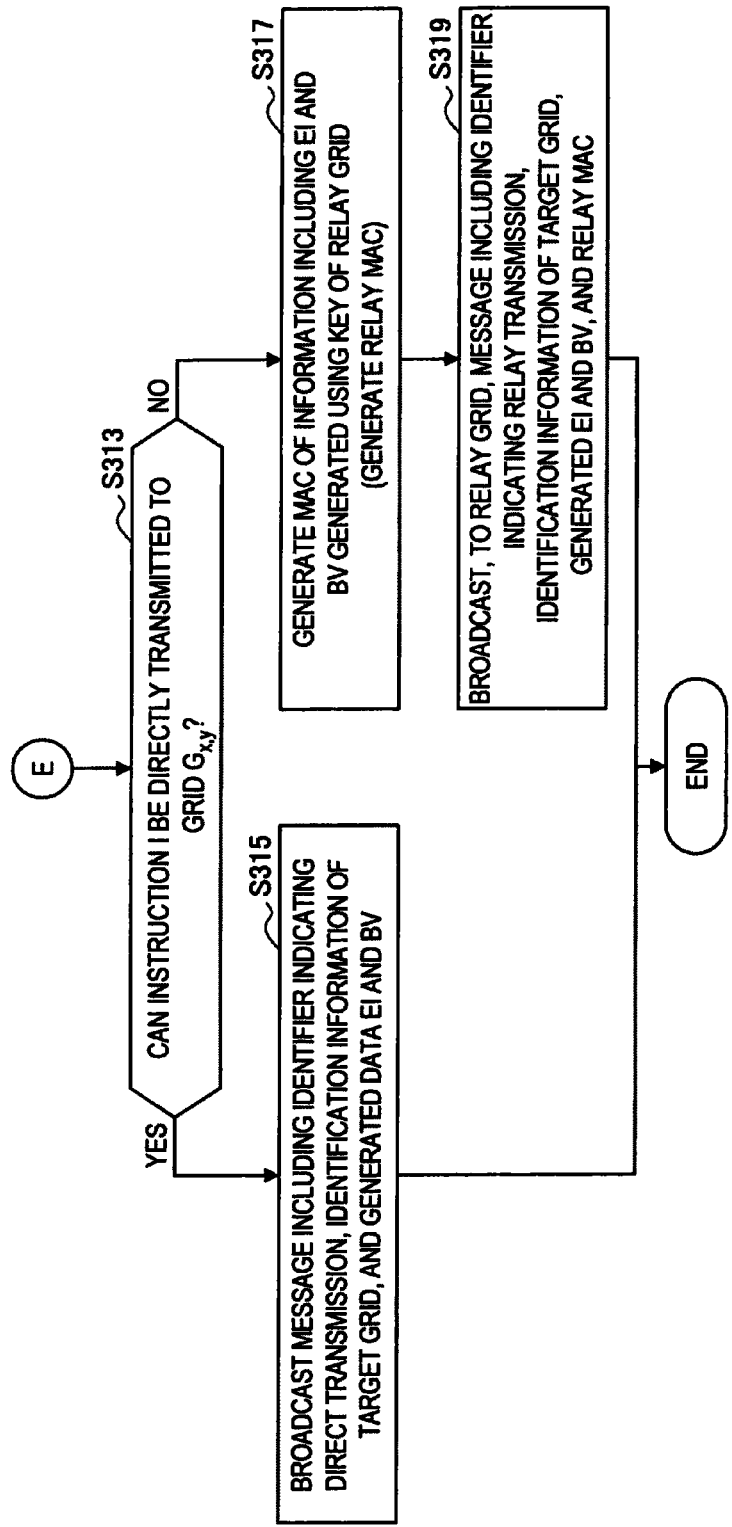

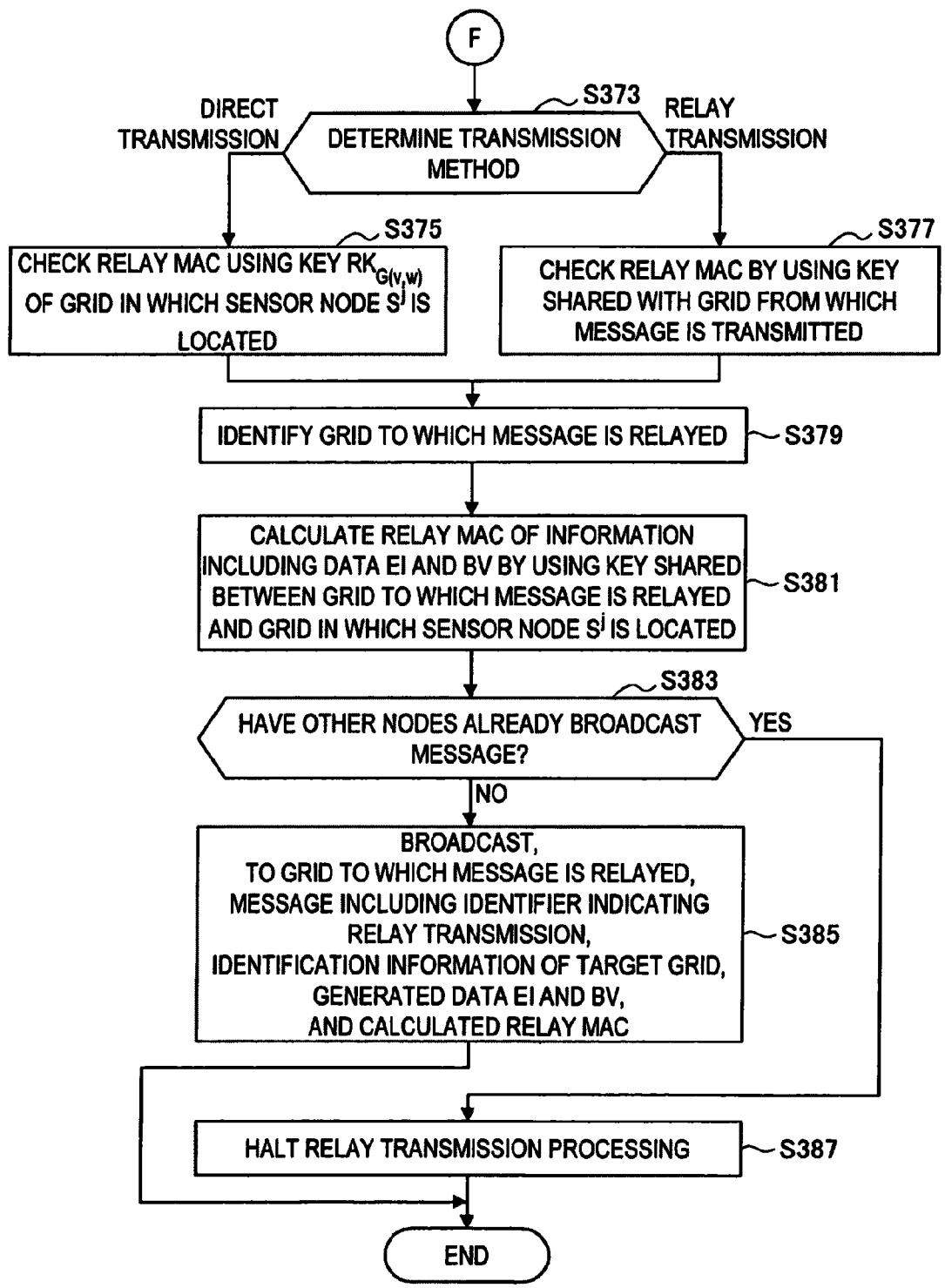

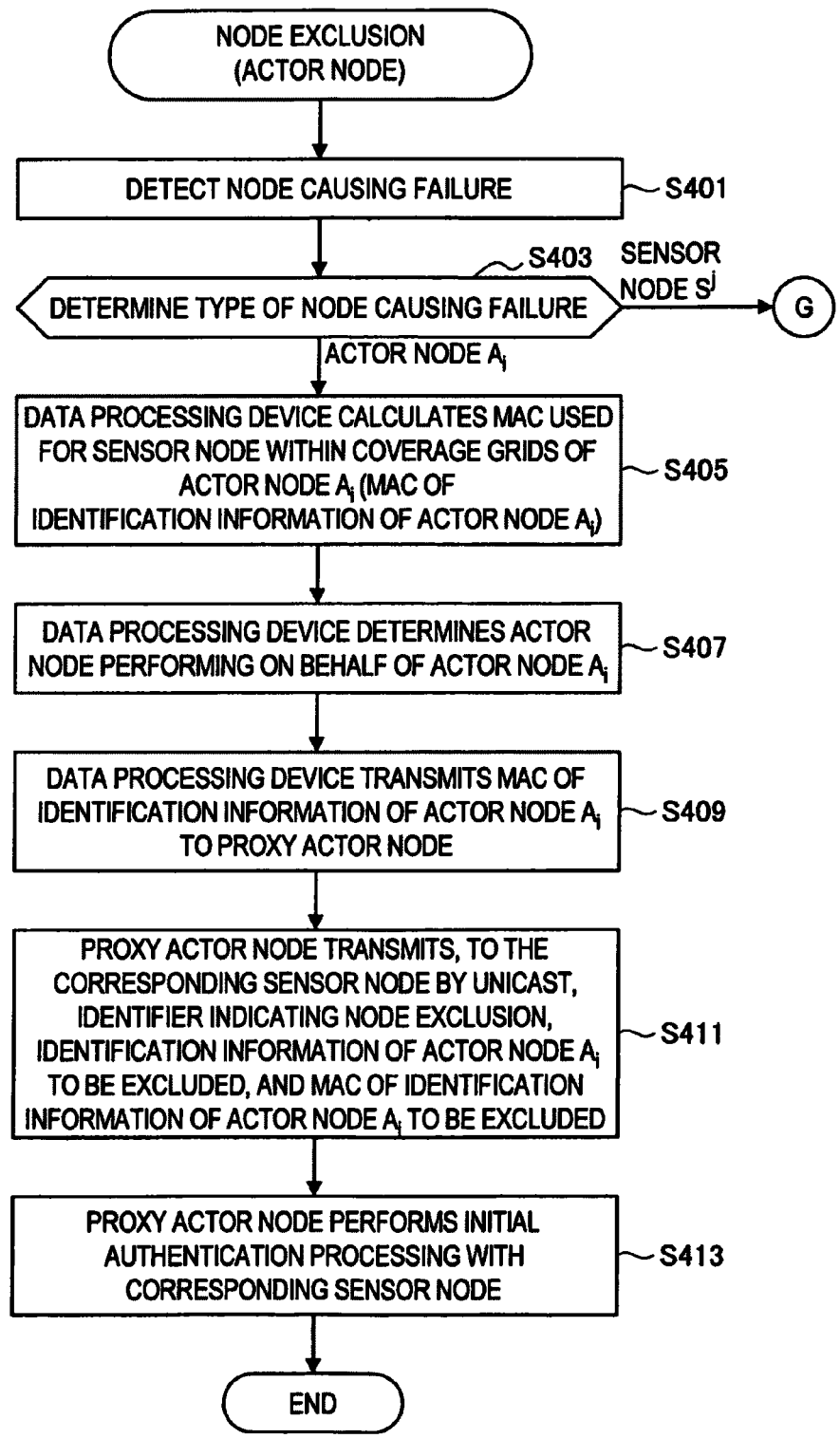

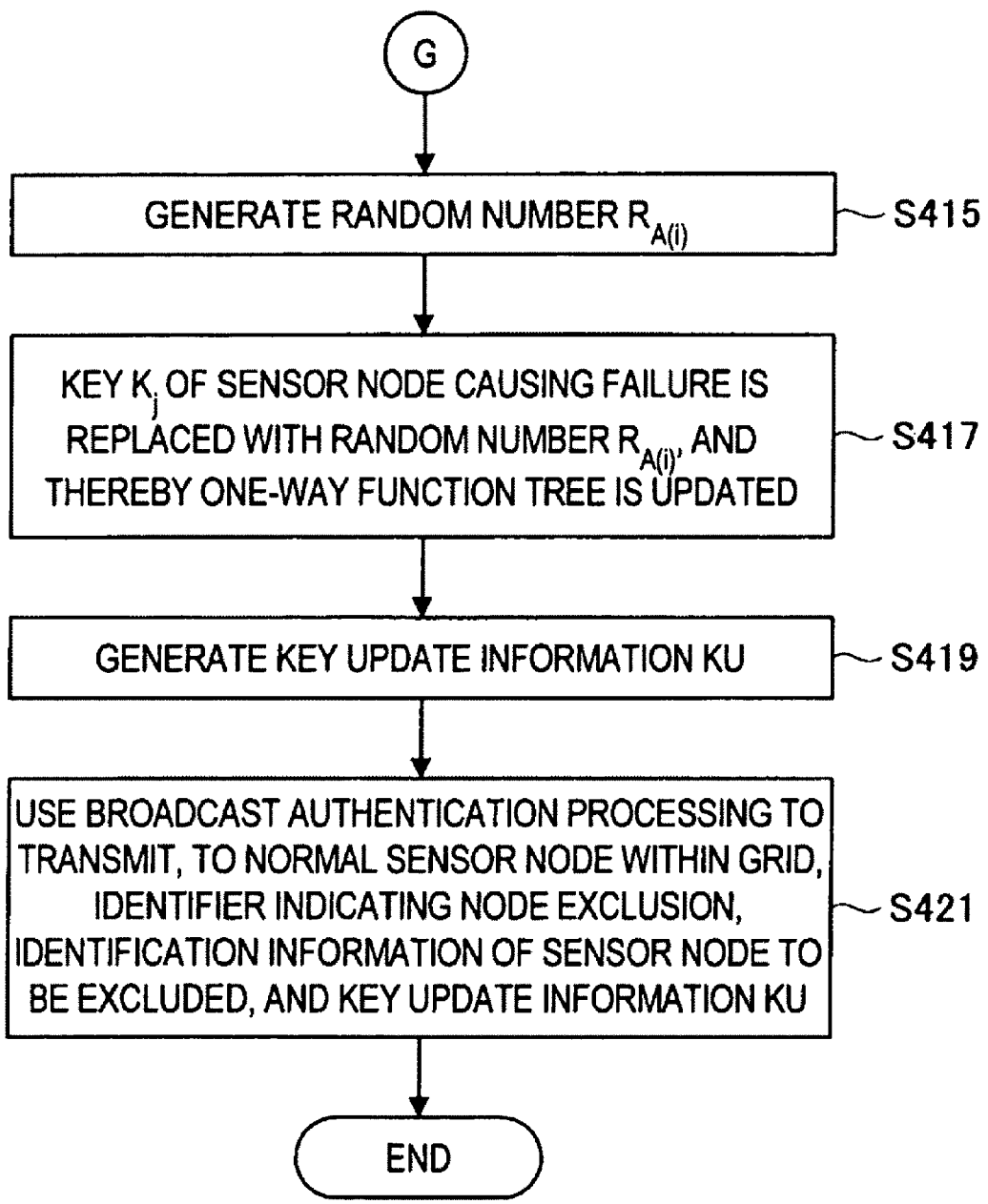

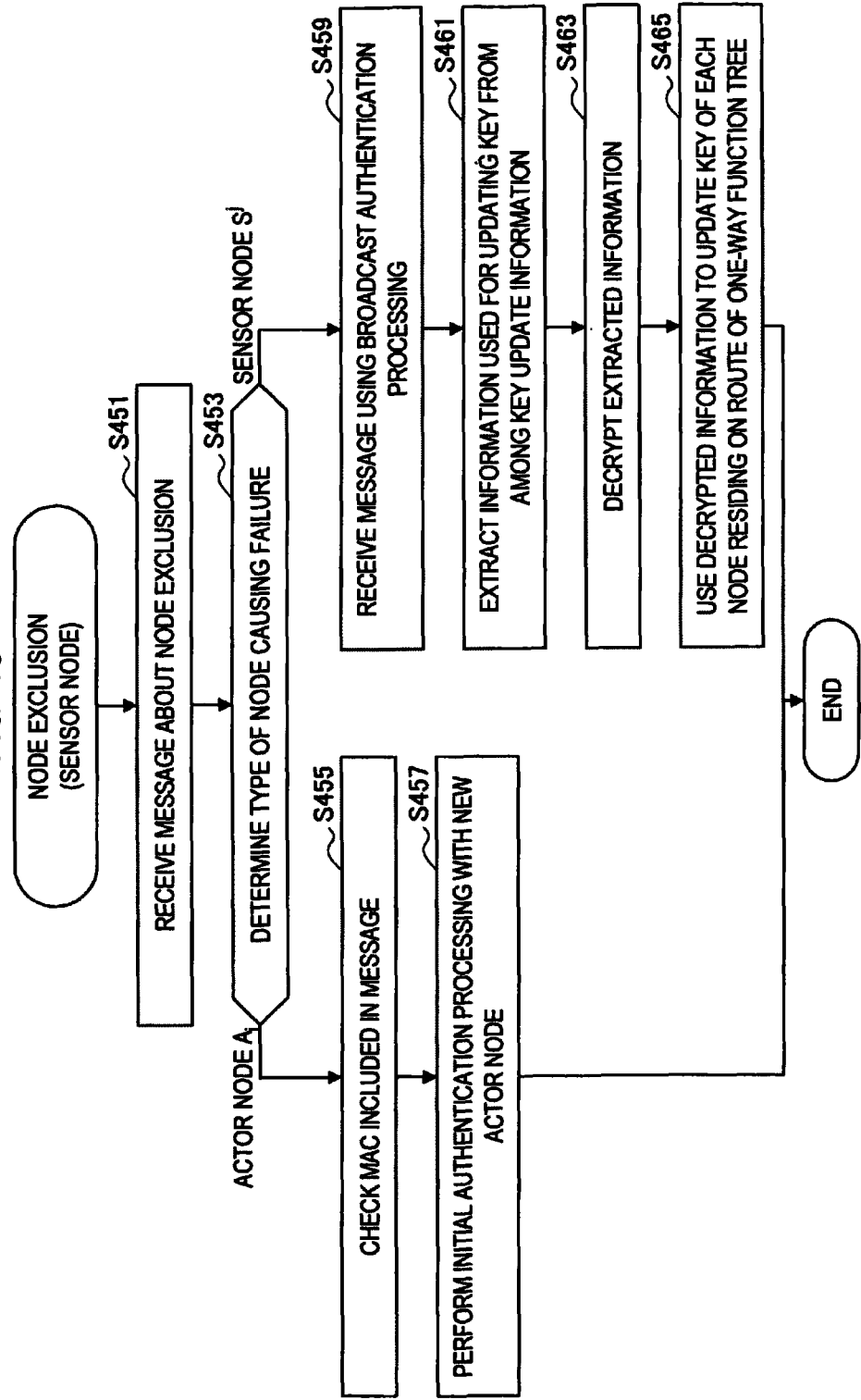

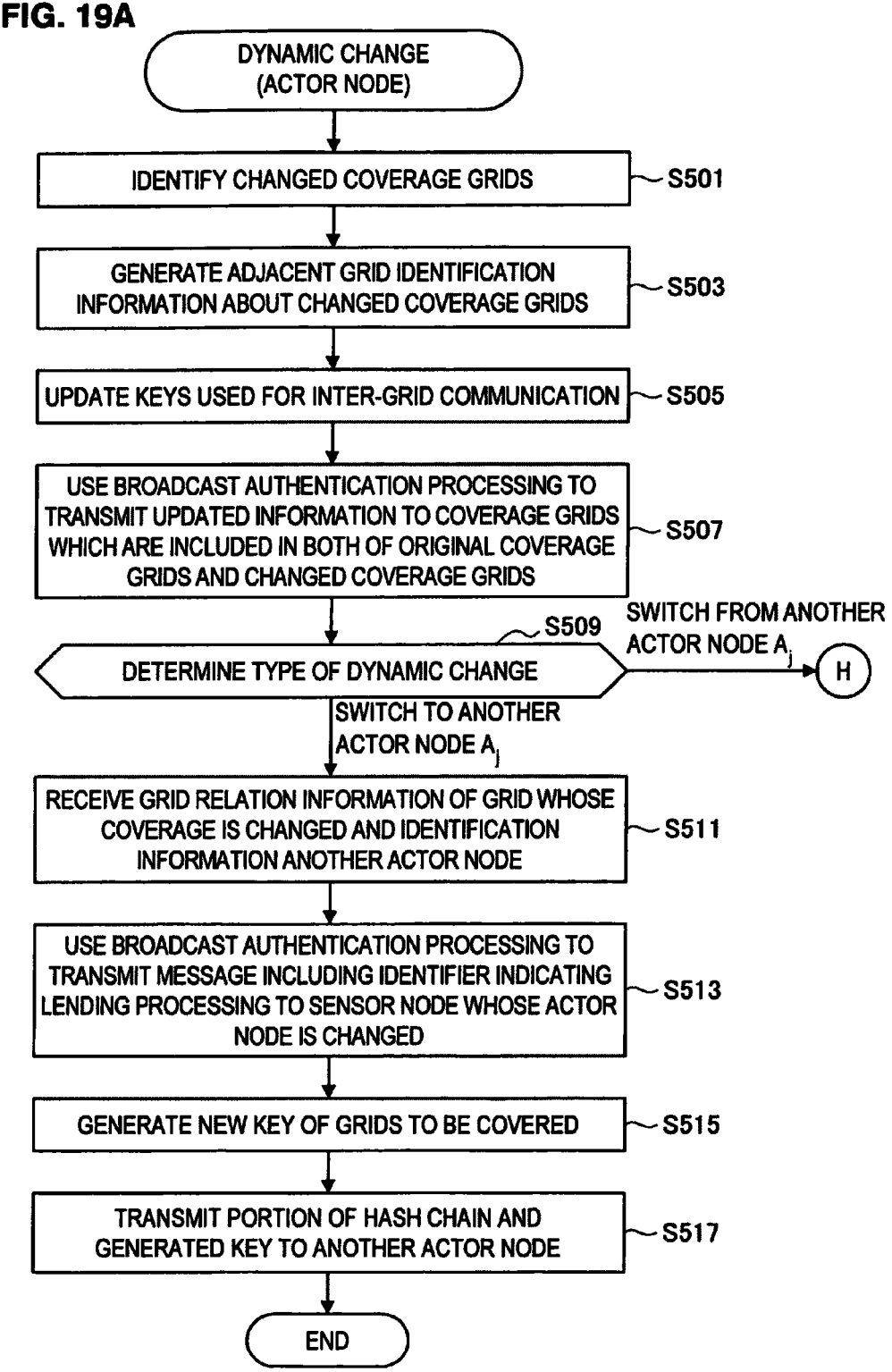

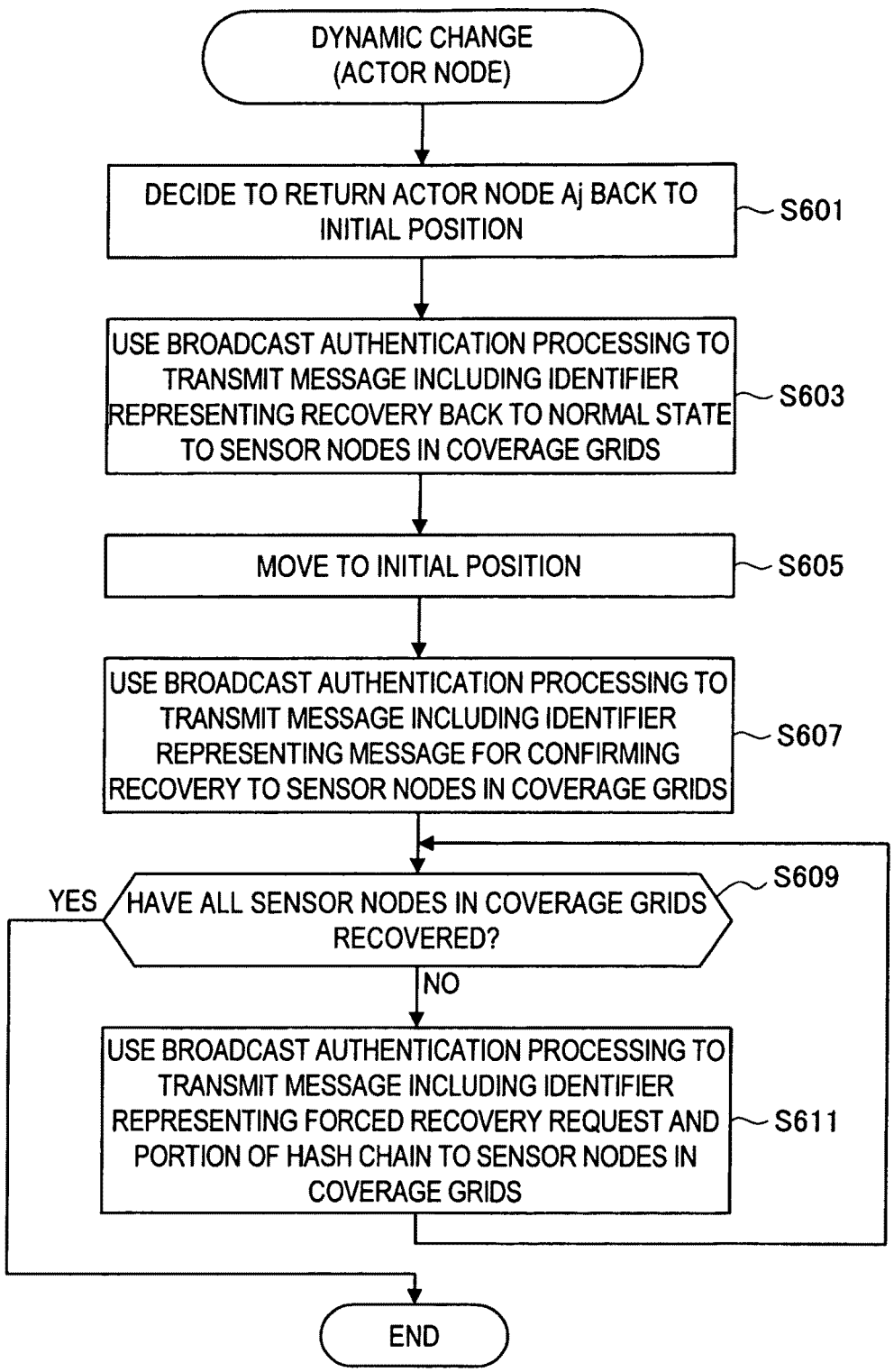

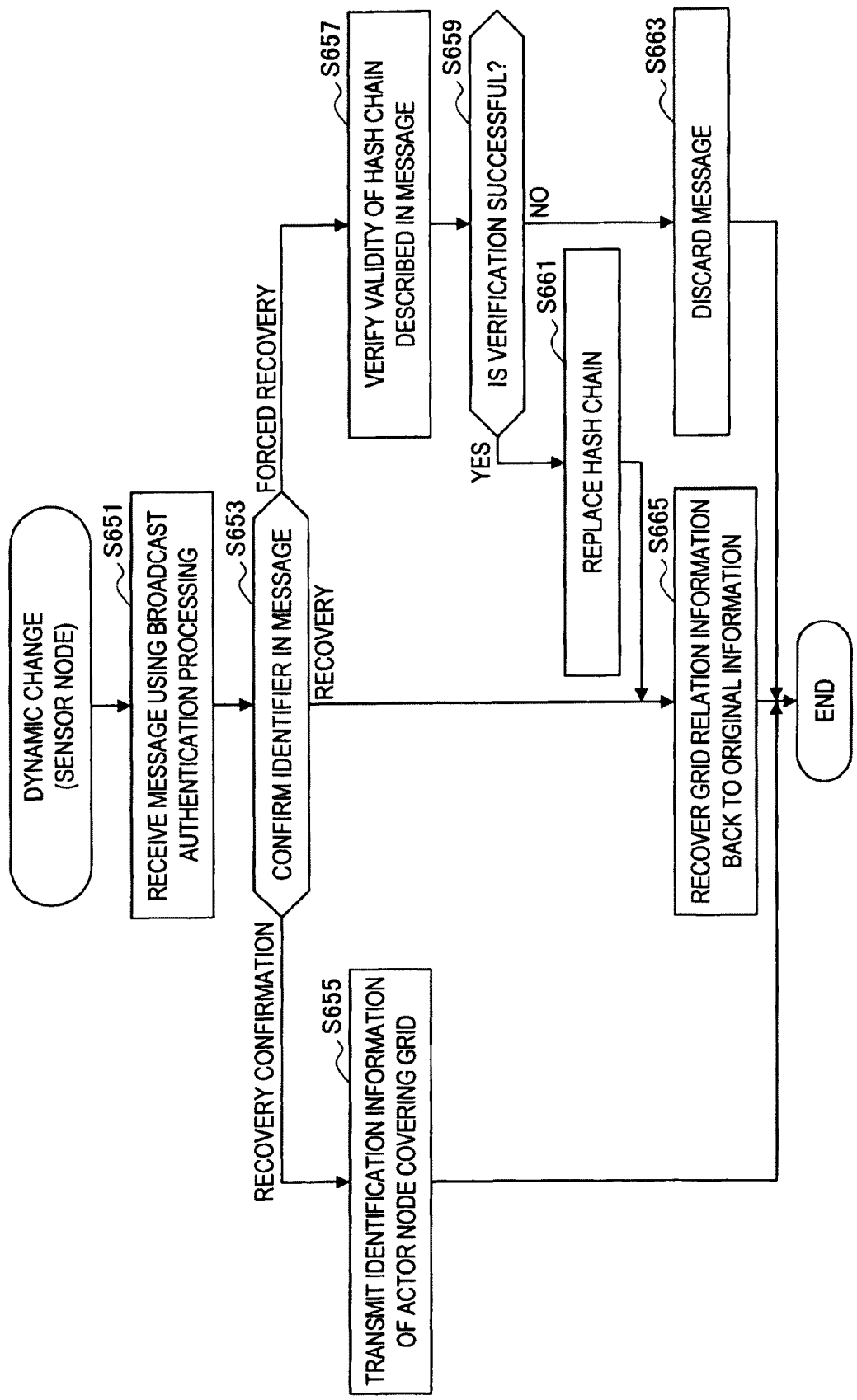

US 8,416,949 B2

ACTOR NODE, SENSOR NODE, COVERAGE BLOCK CHANGE METHOD, PARAMETER CHANGE METHOD, PROGRAM, AND INFORMATION PROCESSING SYSTEM

CROSS-REFERENCE TO RELATED APPLICATION

The present application claims priority from Japanese Patent Application No. JP 2009-284226 filed in the Japanese Patent Office on Dec. 15, 2009, the entire content of which is incorporated herein by reference.

BACKGROUND OF THE INVENTION

1. Field of the Invention

The present invention relates to an actor node, a sensor node, a coverage block change method, a parameter change method, a program, and an information processing system.

2. Description of the Related Art

Wireless sensor network (WSN) has been studied for a long time. The wireless sensor network is a system for obtaining data from many sensor nodes arranged within a predetermined region and performing a predetermined processing based on the obtained data. Recently, a method using an actor node capable of moving in a network field has been used in order to easily obtain data from many sensor nodes. Such system using the actor node to collect data is called a wireless sensor and actor network (WSAN).

This WSAN is a system used to achieve an object such as monitoring whether there is an intruder and preventing fire. When an event occurs that may cause failure of an object to be achieved, such as presence of an intruder and an occurrence of fire, the system performs operation to get rid of this event.

In the WSAN, various kinds of information and instructions are transmitted in communication between an actor node and a sensor node and among actor nodes. Accordingly, it is important to improve the security of communication between the nodes. Therefore, studies have been performed for the purpose of improving the security of communication in the WSAN (for example, see X. Cao, M. Huang, Y. Chen and G. Chen, "Hybrid Authentication and Key Management Scheme for WSANs", ISPA Workshop 2005, LNCS 3759, pp. 454-465, 2005, and B. Yu, J. Ma, Z. Wang, D. Mao and C. Gao, "Key Establishment Between Heterogenous Nodes in Wireless Sensor and Actor Networks", IWSN 2006, LNCS 3842, pp. 196-205, 2006.).

SUMMARY OF THE INVENTION

However, methods described in "Hybrid Authentication and Key Management Scheme for WSANs" and "Key Establishment Between Heterogenous Nodes in Wireless Sensor and Actor Networks" relate to authentication processing between nodes and sharing of a key used in communication, and have a drawback in that when an event occurs, both of event-handling and data-collection cannot be achieved at the same time.

The present invention addresses the above-identified, and other issues associated with the methods and apparatuses in the related art, and provides an actor node, a sensor node, a coverage block change method, a parameter change method, a program, and an information processing system, wherein even when an event occurs, not only event-handling but also data-collection can be achieved at the same time.

According to an embodiment of the present invention, there is provided an actor node capable of mutually communicating with a sensor node arranged in a predetermined region divided into a plurality of blocks, the actor node obtaining data generated by the sensor node from the sensor node arranged in a block covered by the actor node, the actor node including a key acquisition unit for obtaining, from a predetermined device, key information including a key used for communication with another actor node, key generation information for generating a key used for communication with the sensor node arranged in a coverage block, and a hash chain having a predetermined length unique to the coverage block, and a dynamic change unit for temporarily changing the coverage block in which data are obtained from the sensor node and temporarily causing the another actor node to obtain, on behalf of the actor node, data from the sensor node arranged in a partial region of at least a portion of the coverage blocks. The dynamic change unit obtains identification information unique to the another actor node from the another actor node, the dynamic change unit notifies, to the sensor node arranged in the partial region, the identification information unique to the another actor node and an identifier indicating temporary change of the actor node performing data collection, and the dynamic change unit notifies, to the another actor node, a portion of the hash chain and a temporary key generated using the identification information unique to the another actor node and the key used for communication with the sensor node arranged in the partial region.

The actor node may hold block identification information for identifying blocks adjacent to each other for each of the plurality of blocks included in the coverage blocks, when the dynamic change unit delegates the partial region to the another actor node, the dynamic change unit may identify a block whose block identification information is changed, and the dynamic change unit may notify, to a sensor node arranged in a coverage block common to original coverage blocks and changed coverage blocks, the changed block identification information and information about a predetermined key changed due to the delegation.

When the delegation of the partial region to the another actor node is not cancelled, the dynamic change unit may notify, to the sensor node arranged in the partial region, an identifier indicating cancellation of the delegation to the another actor node and a portion of the hash chain.

The key generation information may include information about a two-variable polynomial formula of a predetermined degree, and the actor node may calculate the key unique to the sensor node used for communication with the sensor node arranged in the coverage block by substituting identification information unique to the actor node and identification information unique to the sensor node into the two-variable polynomial formula.

When the actor node is unable to directly communicate with a sensor node, with which the actor node is to communicate, arranged in a coverage block, the actor node may use Bloom Filter to generate information for identifying the sensor node with which the actor node is to communicate.

The actor node may further include a node exclusion unit for excluding a sensor node or another actor node having a failure from a system. When the sensor node has a failure, the node exclusion unit may randomly select a random number in place of a key, unique to the sensor node having the failure, used for communication with the sensor node having the failure, the node exclusion unit may use the randomly selected random number to generate key update information for updating a key used for inter-sensor node communication in a block, to which the sensor node having the failure belongs, by another sensor node arranged in the block, and the node exclusion unit may notify the key update information to the block including the sensor node having the failure.

The actor node may further include an initial authentication unit for performing mutual authentication, prior to communication, with the sensor node arranged in the coverage blocks, and a node exclusion unit for excluding a sensor node having a failure or another actor node from a system. In a case where a failure occurs in the another actor node, and the actor node is to newly cover the block that was covered by the another actor node, the node exclusion unit may notify, to the sensor node belonging to the block newly covered by the actor node, identification information unique to the actor node and an identifier indicating that the actor node having the failure is to be excluded, and the initial authentication unit may perform mutual authentication with the sensor node belonging to the block newly covered by the actor node.

According to another embodiment of the present invention, there is provided a sensor node arranged in a predetermined region divided into a plurality of blocks, the sensor node outputting generated data to an actor node covering a block in which the sensor node is arranged, the sensor node including a key acquisition unit for obtaining, from a predetermined device, key information including key generation information for generating a key used for communication with the actor node or another sensor node and a hash chain having a predetermined length unique to the block in which the sensor node is arranged, and a dynamic change unit for temporarily changing a parameter used for communication with the another sensor node according to an instruction given by the actor node to which the generated data are transmitted. When the actor node instructs the sensor node to temporarily change the recipient of the data to another actor node, the dynamic change unit uses identification information unique to the another actor node notified by the actor node to update a key used for communication with the another actor node and a key used for communication with the another sensor node.

The key generation information may include information about a two-variable polynomial formula of a predetermined degree, and the sensor node may calculate the key unique to the sensor node used for communication with the actor node by substituting identification information unique to the actor node and identification information unique to the sensor node into the two-variable polynomial formula.

The sensor node may previously receive, from the actor node to which the generated data are transmitted, block identification information for identifying a block adjacent to the block in which the sensor node is arranged and block relation information including a key used for communication with the adjacent block, and when the recipient of the generated data is temporarily changed to the another actor node, the dynamic change unit may use the block relation information newly notified by the actor node to communicate with the another actor node.

When the recipient of the data is temporarily changed, the dynamic change unit may save the original block relation information to a predetermined location, and when the another actor node instructs the sensor node to change the recipient of the data to the actor node, the dynamic change unit may replace the block relation information with the saved original block relation information.

The sensor node may further including an initial authentication unit for performing mutual authentication, prior to communication, with the actor node to which the data are transmitted. The initial authentication unit may regard the key unique to the sensor node as a leaf node of a one-way function tree, and may use a tree structure of the one-way function tree and a hash function included in the key information to calculate the key used for communication with the another sensor node belonging to the same block.

The sensor node may further including a node exclusion unit for excluding an actor node or another sensor node having a failure from a system. When the actor node has a failure, the node exclusion unit may randomly obtain identification information, unique to a proxy actor node, transmitted from the proxy actor node performing processing on behalf of the actor node having the failure, and the initial authentication unit may use the identification information, unique to the proxy actor node, obtained by the node exclusion unit to perform mutual authentication with the proxy actor node.

When the another sensor node has the failure, the node exclusion unit may update a key used for communication with the another sensor node by using the one-way function tree and the key update information for updating the key, used for communication with the another sensor node, notified by the actor node to which the data are transmitted.

According to another embodiment of the present invention, there is provided a coverage block change method performed by an actor node capable of mutually communicating with a sensor node arranged in a predetermined region divided into a plurality of blocks, the actor node obtaining data generated by the sensor node from the sensor node arranged in a block covered by the actor node, the coverage block change method including the steps of obtaining, from a predetermined device, key information including a key used for communication with another actor node, key generation information for generating a key used for communication with the sensor node arranged in a coverage block, and a hash chain having a predetermined length unique to the coverage block, and temporarily changing the coverage block in which data are obtained from the sensor node and temporarily causing the another actor node to obtain, on behalf of the actor node, data from the sensor node arranged in a partial region of at least a portion of the coverage blocks. In the step of temporarily causing the another actor node to obtain the data on behalf of the actor node, identification information unique to the another actor node is obtained from the another actor node, the identification information unique to the another actor node and an identifier indicating temporary change of the actor node performing data collection are notified to the sensor node arranged in the partial region, and a portion of the hash chain and a temporary key generated using the identification information unique to the another actor node and the key used for communication with the sensor node arranged in the partial region are notified to the another actor node.

According to another embodiment of the present invention, there is provided a parameter change method performed by a sensor node arranged in a predetermined region divided into a plurality of blocks, the sensor node outputting generated data to an actor node covering a block in which the sensor node is arranged, the parameter change method including the steps of obtaining, from a predetermined device, key information including key generation information for generating a key used for communication with the actor node or another sensor node and a hash chain having a predetermined length unique to the block in which the sensor node is arranged, and temporarily changing a parameter used for communication with the another sensor node according to an instruction given by the actor node to which the generated data are transmitted. In the step of temporarily changing the parameter, when the actor node instructs the sensor node to temporarily change the recipient of the data to another actor node, identification information unique to the another actor node notified by the actor node is used to update a key used for communication with the another actor node and a key used for communication with the another sensor node.

According to another embodiment of the present invention, there is provided a program for causing a computer to function as an actor node capable of mutually communicating with a sensor node arranged in a predetermined region divided into a plurality of blocks, the actor node obtaining data generated by the sensor node from the sensor node arranged in a block covered by the actor node, the program causing the computer to realize a key acquisition function for obtaining, from a predetermined device, key information including a key used for communication with another actor node, key generation information for generating a key used for communication with the sensor node arranged in a coverage block, and a hash chain having a predetermined length unique to the coverage block, and a dynamic change function for temporarily changing the coverage block in which data are obtained from the sensor node and temporarily causing the another actor node to obtain, on behalf of the actor node, data from the sensor node arranged in a partial region of at least a portion of the coverage blocks, the dynamic change function including a function for obtaining identification information unique to the another actor node from the another actor node, a function for notifying, to the sensor node arranged in the partial region, the identification information unique to the another actor node and an identifier indicating temporary change of the actor node performing data collection, and a function for notifying, to the another actor node, a portion of the hash chain and a temporary key generated using the identification information unique to the another actor node and the key used for communication with the sensor node arranged in the partial region.

According to another embodiment of the present invention, there is provided a program for causing a computer to function as a sensor node arranged in a predetermined region divided into a plurality of blocks, the sensor node outputting generated data to an actor node covering a block in which the sensor node is arranged, the program causing the computer to realize a key acquisition function for obtaining, from a predetermined device, key information including key generation information for generating a key used for communication with the actor node or another sensor node and a hash chain having a predetermined length unique to the block in which the sensor node is arranged, and a dynamic change function for temporarily changing a parameter used for communication with the another sensor node according to an instruction given by the actor node to which the generated data are transmitted, the dynamic change function including a function for using identification information unique to the another actor node notified by the actor node to update a key used for communication with the another actor node and a key used for communication with the another sensor node, when the actor node instructs the sensor node to temporarily change the recipient of the data to another actor node.

In order to alleviate the above and other issues, still another aspect of the present invention provides an information processing system including the above actor node and the above sensor node.

As explained above, according to the present invention, in a case where an actor node handles an unexpected event when an event occurs, coverage regions of actor nodes can be temporarily changed. As a result, another actor node can perform data collection from sensor nodes, which is to be performed by the actor node handling the event, on behalf of the actor node handling the event. Therefore, in the present invention, even when an event occurs, not only event-handling but also data-collection can be achieved at the same time.

BRIEF DESCRIPTION OF THE DRAWINGS

FIG. 11A is a flow diagram illustrating an initial authentication processing performed by the actor node according to the embodiment;

FIG. 11B is a flow diagram illustrating an initial authentication processing performed by the actor node according to the embodiment;

FIG. 12B is a flow diagram illustrating an initial authentication processing performed by the sensor node according to the embodiment;

FIG. 14A is a flow diagram illustrating a broadcast authentication processing performed by the actor node according to the embodiment;

FIG. 14B is a flow diagram illustrating a broadcast authentication processing performed by the actor node according to the embodiment;

FIG. 16B is a flow diagram illustrating a broadcast authentication processing performed by the sensor node according to the embodiment;

FIG. 17A is a flow diagram illustrating a node exclusion processing performed by the actor node according to the embodiment;

FIG. 17B is a flow diagram illustrating a node exclusion processing performed by the actor node according to the embodiment;

FIG. 18 is a flow diagram illustrating a node exclusion processing performed by the sensor node according to the embodiment;

FIG. 19A is a flow diagram illustrating a dynamic change processing performed by the actor node according to the embodiment;

FIG. 22 is a flow diagram illustrating a dynamic change processing performed by the actor node according to the embodiment;

FIG. 23 is a flow diagram illustrating a dynamic change processing performed by the sensor node according to the embodiment.

DETAILED DESCRIPTION OF THE EMBODIMENTS

Figure 1:
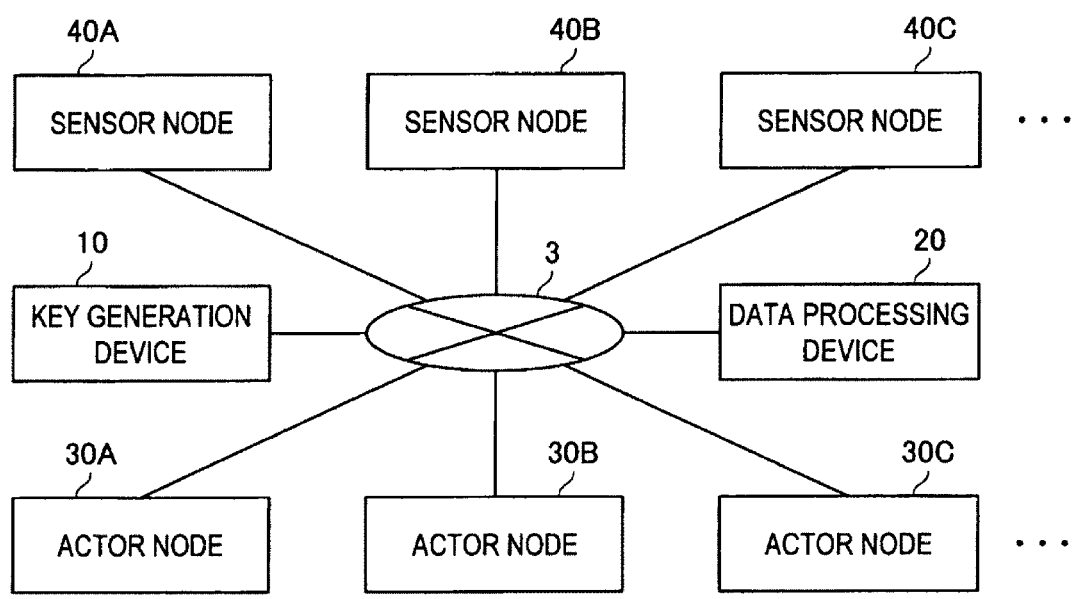
FIG. 1 is an explanatory diagram illustrating an information processing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
(1) First Embodiment
(1-1) Information processing system
(1-2) Configuration of key generation apparatus
(1-3) Configuration of data processing device
(1-4) Configuration of actor node
(1-5) Configuration of sensor node
(1-6) Overview of processings performed in information processing system
(1-7) Setup processing
(1-8) Initial authentication processing
(1-9) Broadcast authentication processing
(1-10) Node exclusion processing
(1-11) Dynamic change processing of coverage grids
(2) Hardware configurations of key generation apparatus, data processing device, actor node, and sensor node according to an embodiment of the present invention
(3) Summary

First Embodiment

Information Processing System

Figure 2:
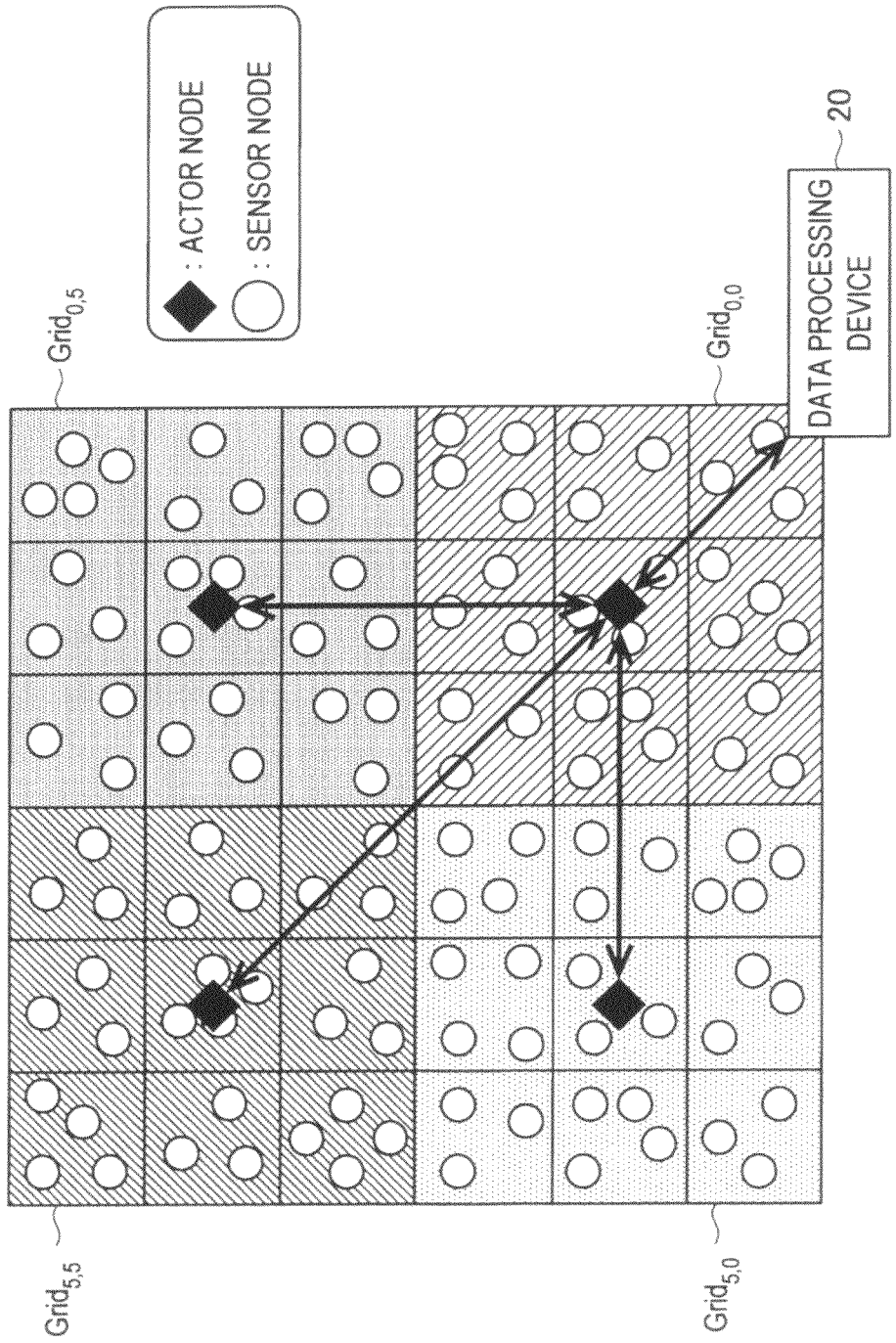
FIG. 2 is an explanatory diagram illustrating the information processing system according to the embodiment.
Figure 3:
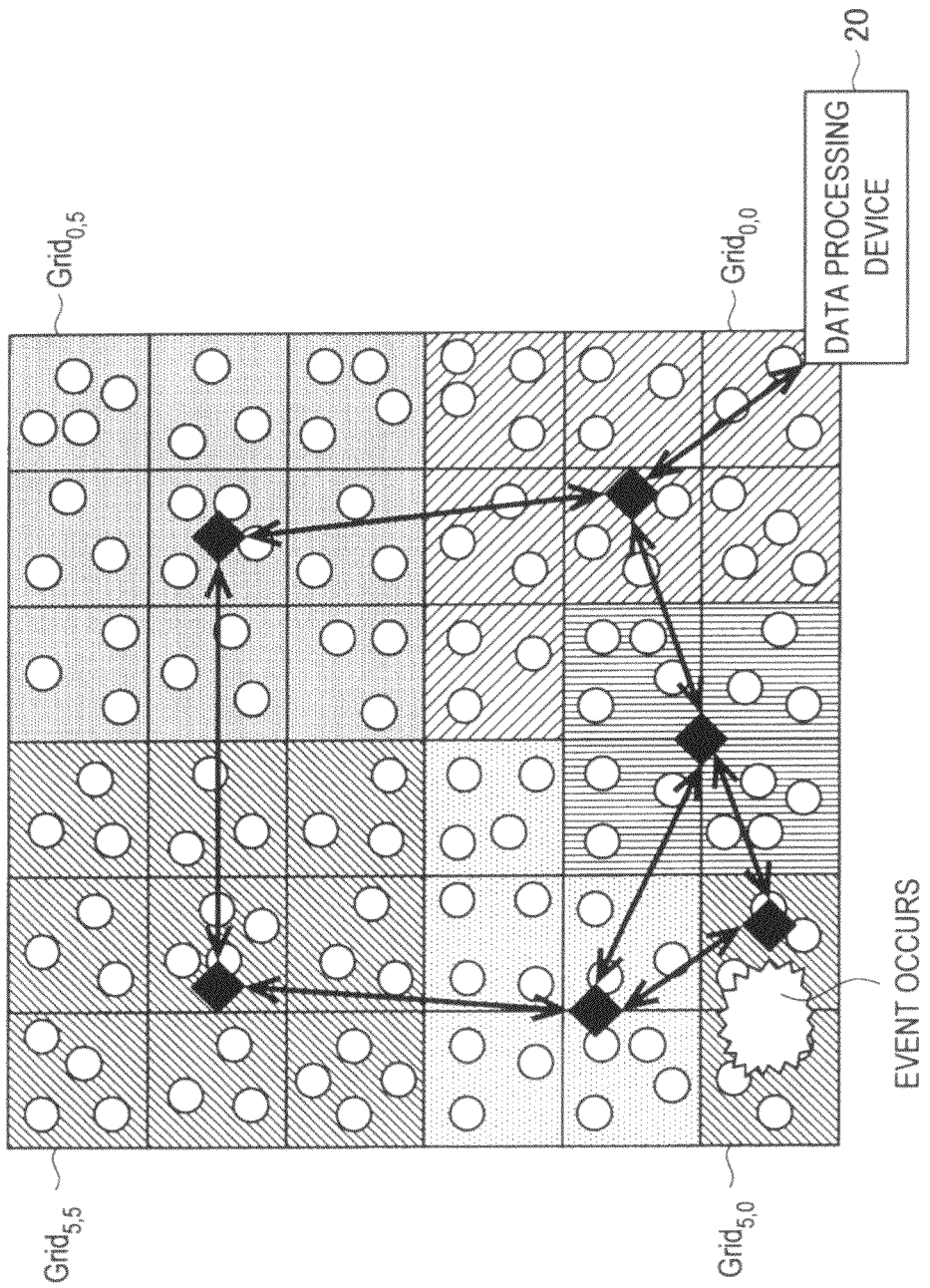
FIG. 3 is an explanatory diagram illustrating the information processing system according to the embodiment.

First, an information processing system according to the first embodiment of the present invention will be explained in detail with reference to FIGS. 1 to 3. FIGS. 1 to 3 are explanatory diagrams for illustrating the information processing system according to the present embodiment.

[Overview of Information Processing System]

For example, as shown in FIG. 1, the information processing system 1 according to the embodiment includes a key generation device 10 and a data processing device 20. Further, the information processing system 1 includes actor nodes 30A, 30B, 30C . . . (hereinafter abbreviated as actor node 30) and sensor nodes 40A, 40B, 40C . . . (hereinafter abbreviated as sensor node 40). These devices are connected with each other via a network 3.

The communication network 3 is a communication circuit network for allowing bidirectional communication between the key generation device 10, the data processing device 20, the actor node 30, and the sensor node 40. Examples of communication circuit networks include public circuit networks such as the Internet, a telephone circuit network, a satellite communication network, a simultaneous communication path, and the like, and dedicated circuit networks such as WAN (Wide Area Network), LAN (Local Area Network), IP-VPN (Internet Protocol-Virtual Private Network), Ethernet (registered trademark), wireless LAN, and the like. This communication network 3 may be connected either wirelessly or via wire. That is, the information processing system 1 according to the embodiment may be a part of a public service using a public circuit network, or may be a private one using a network such as a LAN which is not disclosed to any third party.

The key generation device 10 is an apparatus for generating a key, which is used during communication performed by the data processing device 20, the actor nodes 30, and the sensor nodes 40. This key generation device 10 divides a field, in which the actor nodes 30 and the sensor nodes 40 are arranged, into a plurality of blocks, and determines coverage blocks covered by the actor nodes 30 (hereinafter referred to as coverage grids). Coverage grids covered by each of the actor nodes 30 may be one block, or may be an area including a plurality of blocks. When the key generation device 10 finishes dividing the fields, the key generation device 10 determines, e.g., information representing blocks adjacent to each block.

Further, the key generation device 10 determines various kinds of system parameters used by the data processing device 20, the actor nodes 30, and the sensor nodes 40 when they communicate with each other. The key generation device 10 generates keys according to the types of these devices.

The overview of the key generation device 10 has been explained hereinabove. A setup processing performed by the key generation device 10 will be explained later in detail.

The data processing device 20 uses key information including system parameters and the like and keys obtained from the key generation device 10 to communicate with the actor nodes 30 and the sensor nodes 40 arranged in a field. The data processing device 20 serves as a so-called sink node, and requests an actor node 30 to collect data from a sensor node 40. Thereafter, the data processing device 20 collects, from each actor node 30, data collected by each actor node 30 from the sensor nodes 40, and performs predetermined data processing. Further, the data processing device 20 can determine whether failure occurs in any of the actor nodes 30 and the sensor nodes 40. The data processing device 20 can wirelessly communicate with the actor nodes 30 and the sensor nodes 40. This data processing device 20 will be explained later in detail.

The actor node 30 uses key information including system parameters and the like and keys obtained from the key generation device 10 to communicate with the data processing device 20 and the sensor nodes 40. The actor node 30 can move within a predetermined field. The actor node 30 moves within coverage grids, and uses wireless communication to obtain data generated by the sensor nodes 40 (for example, measured data) from the sensor nodes 40 in the coverage grids. In addition, the actor node 30 transmits data obtained from the sensor nodes 40 to the data processing device 20.

In addition, the actor node 30 can detect a sensor node 40 having failure. Thus, the actor node 30 can find a sensor node 40 having failure, a sensor node 40 intruded by a hacker, and the like, and can exclude such sensor nodes 40 having failure from the field.

The actor node 30 carries out an initial authentication processing, a broadcast authentication processing, a node exclusion processing, and a dynamic change processing, and the like, which are explained later. The details of the actor node 30 and these processings performed by the actor node 30 will be explained later in detail.

The sensor nodes 40 use key information including system parameters and the like and keys obtained from the key generation device 10 to communicate with the actor nodes 30. The sensor node 40 has various kinds of devices used for achieving an object of the information processing system 1 (for example, preventing of fire, monitoring whether there is any intruder or not). Examples of devices in the sensor node include an imaging device capable of taking a motion picture and a still picture, various sensors such as a thermometer and a hygrometer, and the like. The sensor nodes are arranged at respective positions within the field. Unlike the actor nodes 30, the sensor nodes 40 are unable to move. Therefore, the sensor node 40 notifies measured data to the actor node 30 covering the grid in which the sensor node 40 is located.

It should be noted that the sensor node 40 has only a short distance communication function for communicating within the grid in which the sensor node 40 is located and communicating with grids adjacent to the grid in which the sensor node 40 is located. However, any sensor node 40 can relay communication output by another sensor node 40. With this relaying operation, the sensor nodes 40 can indirectly transmit communication to a distant device (for example, a sensor node located in another grid).

The sensor node 40 carries out an initial authentication processing, a broadcast authentication processing, a node exclusion processing, and a dynamic change processing, and the like, which are explained later. The details of the sensor node 40 and these processings performed by the sensor node 40 will be explained later in detail.

[Specific Example of Information Processing System]

Subsequently, a specific example of the information processing system 1 according to the embodiment will be explained with reference to FIGS. 2 and 3.

FIG. 2 is a schematic diagram illustrating a portion of a field in a normal state. Herein, the normal state means a state in which no event is occurring. The event means a phenomenon which may cause failure of an object desired to be achieved by the information processing system 1. In FIG. 2, the portion of the field is divided by the key generation device 10 into 36 rectangular grids. In the below explanation, each grid is represented as $G_{x,y}$.

It is assumed that the data processing device 20 is located at a grid $G_{0,0}$. In the information processing system 1 according to the embodiment, one grid is covered by one actor node. The key generation device 10 determines regions covered by the actor nodes 30 such that each actor node 30 covers about the same number of grids.

In FIG. 2, an actor node 1 (hereinafter abbreviated as actor 1, and in the below explanation, nodes are abbreviated in the same manner) covers grids $G_{0,0}$~$G_{2,2}$. Likewise, an actor 2 covers grids $G_{3,0}$~$G_{5,2}$. Likewise, an actor 3 covers grids $G_{0,3}$~$G_{2,5}$, and an actor 4 covers grids $G_{3,3}$~$G_{5,5}$.

In the field in the normal state as shown in FIG. 2, each actor node 30 of the actor 1 to the actor 4 is located in substantially center of a grid to be covered (coverage grids) in order to suppress energy consumption. As shown in FIG. 2, each actor node 30 may transmit data collected from sensor nodes 40 in each coverage grid to the data processing device 20 via an actor node 30 located at a position closest to the data processing device 20. Alternatively, each actor node 30 may directly transmit collected data to the data processing device 20.

FIG. 3 is an explanatory diagram illustrating a case where an event occurs in the field. FIG. 3 illustrates a case where an event occurs in grids $G_{4,0}$ and $G_{5,0}$. In this case, an actor node located in proximity to the grid in which the event has occurred moves closer to the event in order to solve the event having occurred. According to the movement of the actor node 30, the coverage grids of the actor nodes 30 are dynamically changed. Since some actor nodes 30 are unevenly located closer to one side of the field, new actor nodes (in FIG. 3, two more actor nodes) move within the field in order to solve this uneven arrangement. Therefore, in the information processing system 1 according to the embodiment, not only the event can be solved but also data can be collected when the event occurs.

In FIGS. 2 and 3, the field is divided into rectangular grids. However, the shape of the grid is not limited to the shape shown in the figure. Alternatively, the shape may be triangle, hexagon, and the like, which can fill a predetermined region without leaving any gap.

The information processing system 1 according to the embodiment has been explained hereinabove.

<Configuration of Key Generation Apparatus>

Figure 4:
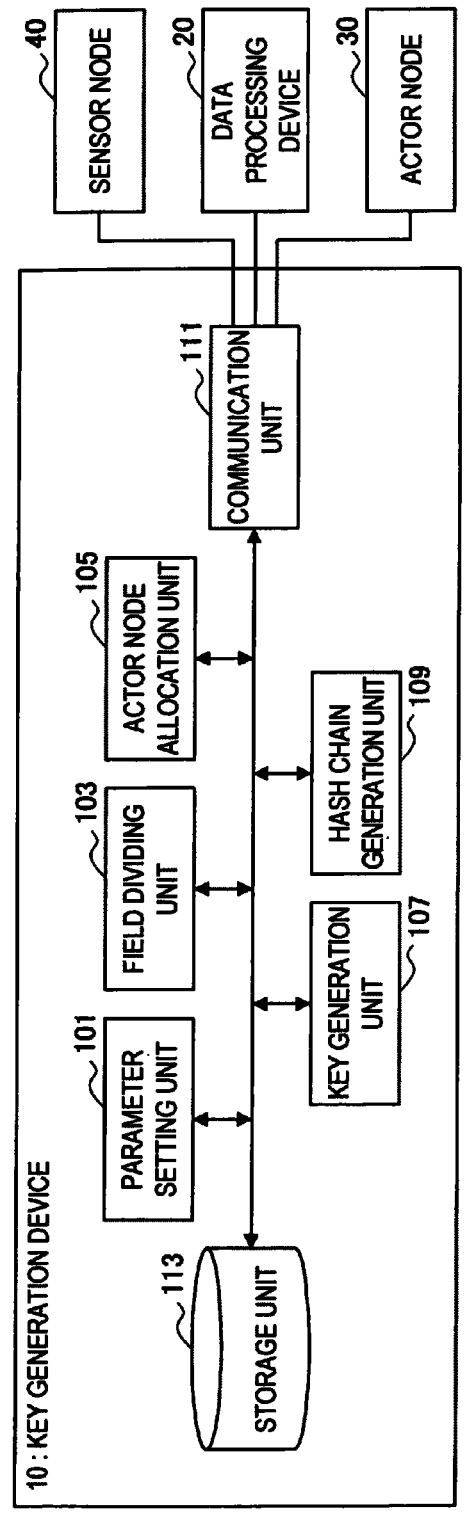
FIG. 4 is a block diagram illustrating a configuration of a key generation apparatus according to the embodiment.

Subsequently, a configuration of a key generation apparatus according to the present embodiment will be explained in detail with reference to FIG. 4. FIG. 4 is a block diagram illustrating the configuration of the key generation apparatus according to the present embodiment.

For example, as shown in FIG. 4, the key generation device 10 according to the present embodiment mainly includes a parameter setting unit 101, a field dividing unit 103, an actor node allocation unit 105, a key generation unit 107, a hash chain generation unit 109, a communication unit 111, and a storage unit 113. Each of these processing units works alone or these processing units work in cooperation with each other to generate key information including information about, e.g., keys and system parameters used in the information processing system 1.

The parameter setting unit 101 is achieved with, for example, a CPU (Central Processing unit), a ROM (Read Only Memory), a RAM (Random Access Memory), and the like. The parameter setting unit 101 sets various kinds of parameters for generating keys used by each device when the device performs communication in the information processing system 1 according to the embodiment. Some of the parameters set by the parameter setting unit 101 are notified as system parameters to the data processing device 20, the actor node 30, and the sensor node 40.

Examples of parameters set by the parameter setting unit 101 include the number of blocks of grids in the field, a two-variable polynomial formula used for generating a key, identification information of the data processing device 20 and the actor node 30, a hash function, and the like. Herein, the identification information of the data processing device 20 and the actor node 30 are set uniquely within the field.

The number of blocks of grids is a value representing how many grids the field arranged with the sensor nodes are divided into. For example, when the field is divided into rectangular grids as shown in FIG. 2, this value may include values representing how many blocks the field is divided into in the horizontal direction and the vertical direction, that is, x blocks in the horizontal direction and y blocks in the vertical direction (in this case, the field is divided into xxy blocks). Alternatively, the number of blocks of grids may be a value representing only the total number of blocks. For example, the entire field is divided into totally X blocks, where X is the number of blocks of grids.

The two-variable polynomial formula F(x, y) set by the parameter setting unit 101 is t-th degree polynomial formula used to generate a key used in the information processing system 1, and is a polynomial formula as shown in the following formula 101.

[Expression 1]

$$F(x,y) = \Sigma a_{i,j} x^i y^j = a_{00} + a_{10}x + a_{01}y + a_{11}xy + \ldots \quad \text{(Formula 101)}$$

In the above formula 101, $a_{i,j}(a_{i,j} \in F_q)$ is a coefficient of each member, and is set to satisfy F(x, y)=F(y, x). In other words, a key used in the information processing system 1 according to the embodiment is a pairwise key generated using F(x, y), and is a symmetric key satisfying F(x, y)=F(y, x).

In the information processing system 1 according to the embodiment, identification information of each device (hereinafter abbreviated as ID) is used as a variable of the two-variable polynomial formula F(x, y). For example, a key used by an actor node 30 represented by identification information ID having a value $ID_1$ and an actor node 30 represented by a value $ID_2$ can be obtained as $F(ID_1, ID_2)$.

The parameter setting unit 101 sets a two-variable polynomial formula capable of generating the following types of keys. In this case, all of the following five types of two-variable polynomial formulas may be the same polynomial formula represented using the same coefficients (general formula represented by the formula 101), or may be separate polynomial formulas represented using coefficients different from each other. Alternatively, some of the five types may be the same polynomial formula.

(a) Generation of key used in communication between the data processing device 20 and an actor node 30

(b) Generation of key used in communication between the data processing device 20 and a sensor node 40

(c) Generation of key used in communication between actor nodes 30

(d) Generation of key used in communication between grids (e) Generation of key used in communication in grid Further, the parameter setting unit 101 notifies the hash function having been set as system parameters to the data processing device 20, the actor nodes 30, and the sensor nodes 40, and each device shares this hash function.

The field dividing unit 103 is achieved with, for example, a CPU, a ROM, a RAM, and the like. The field dividing unit 103 divides the field arranged with the sensor nodes 40 into a plurality of grids, based on the number of blocks of grids set by the parameter setting unit 101. In addition, the field dividing unit 103 also generates information representing relative arrangement of each grid. By using the information representing relative arrangement, the later-explained actor node allocation unit 105 can efficiently allocate the actor nodes. It should be noted that the grids are set only in terms of the control of the actor nodes 30 and the sensor nodes 40, and it is to be understood that the actual field is not divided into the plurality of grids.

In addition, after the field dividing unit 103 divides the field into the plurality of grids, the field dividing unit 103 associates each grid with unique identification information (for example, identification information such as $G_{x,y}$ as shown in FIGS. 2 and 3). Accordingly, the data processing device 20, the actor nodes 30, and the sensor nodes 40 can objectively identify the position of each grid. In the following formula, it is assumed that each grid is associated with identification information, i.e., $G_{x,y}$ (where x, y are coordinates representing positions of grids).

Further, after the field dividing unit 103 divides the field into a plurality of grids, the field dividing unit 103 identifies sensor nodes 40 included in each grid, and associates identification information with each sensor node 40. In this case, identification information of the sensor nodes 40 may be any information as long as the identification information is at least unique within the grid. Alternatively, the identification information of each sensor node 40 may be unique within the entire system. In a case where the identification information unique only within the grid is associated with each sensor node 40, the actor node 30 does not have to store the identification information of each sensor node 40 in later-explained initial authentication processing, and the actor node 30 may store only the number of sensor nodes 40 within each grid. Therefore, the amount of data stored in the actor node 30 can be reduced.

The grids are defined as described above. Therefore, the key generation device 10 can recognize which sensor node 40 is included in which grid. In addition, when the identification information of the grid in which each sensor node 40 is located is determined, the field dividing unit 103 may associate the identification information of the grid in which each sensor node 40 is located with the identification information of the sensor node 40.

The actor node allocation unit 105 is achieved with, for example, a CPU, a ROM, a RAM, and the like. The actor node allocation unit 105 allocates grids (coverage grids) covered by each actor node 30 according to the number of actor nodes 30 that can be arranged within the field and the number of blocks of grids set by the parameter setting unit 101. The coverage grids serve as partitions by which one actor node 30 manages all the sensor nodes 40 within the coverage grids.

At this occasion, the actor node allocation unit 105 preferably adopts grids adjacent to each other as coverage grids of a certain actor node 30 by using information representing relative arrangement of grids. Further, the actor node allocation unit 105 preferably sets the coverage grids such that the number of sensor nodes 40 covered by each actor node 30 becomes almost constant.

Further, when the coverage grids of each actor node are determined, the actor node allocation unit 105 generates information representing grids adjacent to a grid in question (adjacent grid identification information) for each grid within the coverage grids.

The key generation unit 107 is achieved with, for example, a CPU, a ROM, a RAM, and the like. The key generation unit 107 uses identification number of each device set by the parameter setting unit 101 and the two-variable polynomial formulas to generate various kinds of keys used by the devices. The keys are generated using the two-variable polynomial formulas represented by the formula 101 explained above. The data processing device (hereinafter referred to as sink node) 20, the actor nodes 30, and the sensor nodes 40 according to the present embodiment share a key generated by the key generation unit 107 with the devices in communication. Therefore, secure communication can be performed between the devices sharing the key.

Examples of keys generated by the key generation unit 107 are listed below.

Key (S-A key) shared by the data processing device (S) 20 and each actor node 30 (A)

Key (S-S key) shared by the data processing device 20 (S) and each sensor node 40 (S)

Key (A-A key) shared by the actor nodes 30 (A)

In addition the above three types of keys, the key generation unit 107 generates a key used for communication between grids for each grid included in the same partition, based on the adjacent grid identification information generated by the actor node allocation unit 105. The key (G-G key) used for communication between these grids (G) is shared by the nodes which belong to the corresponding grids.

Further, for each grid included in the same partition, the key generation unit 107 generates a polynomial formula by substituting identification information of the actor node 30 covering the partition as its coverage grids into one of the variables of the two-variable polynomial formula and leaving the other variable as variable. The polynomial formula thus generated is a polynomial formula having one variable. This one-variable polynomial formula is managed by the actor node 30 covering the partition as its coverage grids. By using this one-variable polynomial formula, the actor node 30 can generate by itself a key to be shared with another node in the grid in question.

Still further, for each sensor node 40 which belongs to each grid, the key generation unit 107 generates a polynomial formula by substituting identification information of the sensor node 40 into one of the variables of the two-variable polynomial formula and leaving the other variable as variable. By using this one-variable polynomial formula, the sensor node 40 can generate by itself a key to be shared with another node in the grid in question.

The hash chain generation unit 109 is achieved with, for example, a CPU, a ROM, a RAM, and the like. The hash chain generation unit 109 generates one-way hash chain for each grid $G_{x, y}$. The generated one-way hash chain is shared by all the sensor nodes 40 in the corresponding grid $G_{x, y}$ and the actor node 30 covering this grid $G_{x, y}$ as its coverage grids.

The one-way hash chain $O^n$ is generated using an initial value r and a repeating parameter n. The hash chain generation unit 109 generates a random number r, and adopts it as the initial value of the one-way hash chain $O^n$ (that is, one-way hash chain $O^n$ where n=0). Then, the hash chain generation unit 109 uses the hash function and the repeating parameter n set by the parameter setting unit 101 to generate the one-way hash chain as follows. It should be noted that H represents the hash function in the following formula 102. The repeating parameter n is a sufficiently large number. The repeating parameter n is set so as to provide a sufficient number of one-way hash chain values for the processing within the system 1.

$$O^1 = H(O^0) = H(r), O^2 = H(O^1), \ldots, O^n = H(O^{n-1}) \quad \text{(Formula 102)}$$

As its name suggests, the one-way hash chain $O^n$ has a series of a plurality of values having one-way property in which a value of $O^{n-1}$ cannot be obtained using a value of $O^n$. In contrast, the devices sharing the hash function used for generating the one-way hash chain can calculate a value of $O^n$ using a value of $O^{n-1}$.

This one-way hash chain can be used as follows.

When each device sharing the one-way hash chain transmits a message, the device attaches a value of $O^{n-1}$ to the message, and transmits the message to a recipient device. The device having received the message uses the hash function and the $O^{n-1}$ attached to the message to calculate a value of $O^n$, and checks whether the calculated value $O^n$ is the same as the value of $O^n$ stored in the device. When the device having received the message determines that the calculated value $O^n$ is the same as the value of $O^n$ stored in the device, the device can determine that the received message is valid.

The communication unit 111 is achieved with, for example, a CPU, a ROM, a RAM, a communication device, and the like. The communication unit 111 transmits system parameters and various kinds of keys generated by the key generation device 10 to the data processing device 20, the actor node 30, and the sensor nodes 40.

The contents transmitted by the communication unit 111 to each device (i.e., key information) include the following information. As is evident from below contents, the key information transmitted to each device includes information about the key itself, key generation information used for generating the key, and system parameters such as hash chains and hash functions.

The contents transmitted to the data processing device 20
Pairwise key (S-A key) used with each actor node 30
Pairwise key (S-S key) used with each sensor node 40
The contents transmitted to each actor node 30
Pairwise key (A-A key) used with another actor node 30
Pairwise key (S-A key) used with the data processing device 20
Identification information $ID_{A(i)}$
Information P about coverage grids
Two-variable polynomial formula $F_{G(x, y)}(ID_{A(i)}, y)$ (y: variable) for all the grids
One-way hash chain $O_{G(x, y)}{}^n$ of each coverage grid
Adjacent grid identification information $G_{G(x, y)}$ of each coverage grid
Key $K_{G(x, y)}$ (G-G key) for inter-grid communication of each coverage grid
Hash function
The contents to be transmitted to each sensor node 40
Pairwise key (S-S key) used with the data processing device 20
Identification information $ID_{S<j>}$
Identification information $ID_{G(x, y)}$ of the grid in which the device is located
One-way hash chain $O_{G(x, y)}{}^n$ of the grid in which the device is located
Two-variable polynomial formula $F_{G(x, y)}(ID_{S<j>}, y)$ (y: variable) of the grid in which the device is located
Hash function In the above description, a parenthesis ( ) described within a subscript represents a subscript further attached to the subscript (i.e., subscript of subscript). On the other hand, a parenthesis < > described within a subscript represents a superscript further attached to the subscript (i.e., superscript of subscript). In the below explanation, subscripts are described in this manner throughout this specification. It should be noted that superscripts are also described in this manner. That is, a subscript further attached to a superscript is represented as a parenthesis ( ) and a superscript further attached to a superscript is represented as a parenthesis < >.

The storage unit 113 is an example of storage device of the key generation device 10 according to the present embodiment. This storage unit 113 may store various kinds of key information generated by the key generation device 10, system parameters, and the like. Further, this storage unit 113 may store various parameters or progress of processing that are necessary to be stored while the key generation device 10 performs certain processing, and may store various kinds of databases and so on as necessary. This storage unit 113 can be freely read and written by each processing unit of the key generation device 10 according to the present embodiment.

Examples of the functions of the key generation device 10 according to the present embodiment have been hereinabove explained. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the state of art at the time when the present embodiment is carried out.

It is possible to make a computer program for realizing the functions of the above-described key generation apparatus according to the present embodiment, and the computer program can be implemented on a personal computer and the like. Further, a computer-readable recording medium storing such computer program can be provided. Examples of recording media include a magnetic disk, an optical disk, a magneto-optical disk, and a flash memory. Further, for example, the above computer program may be distributed by a network, without using any recording medium.

<Configuration of Data Processing Device>

Figure 5:
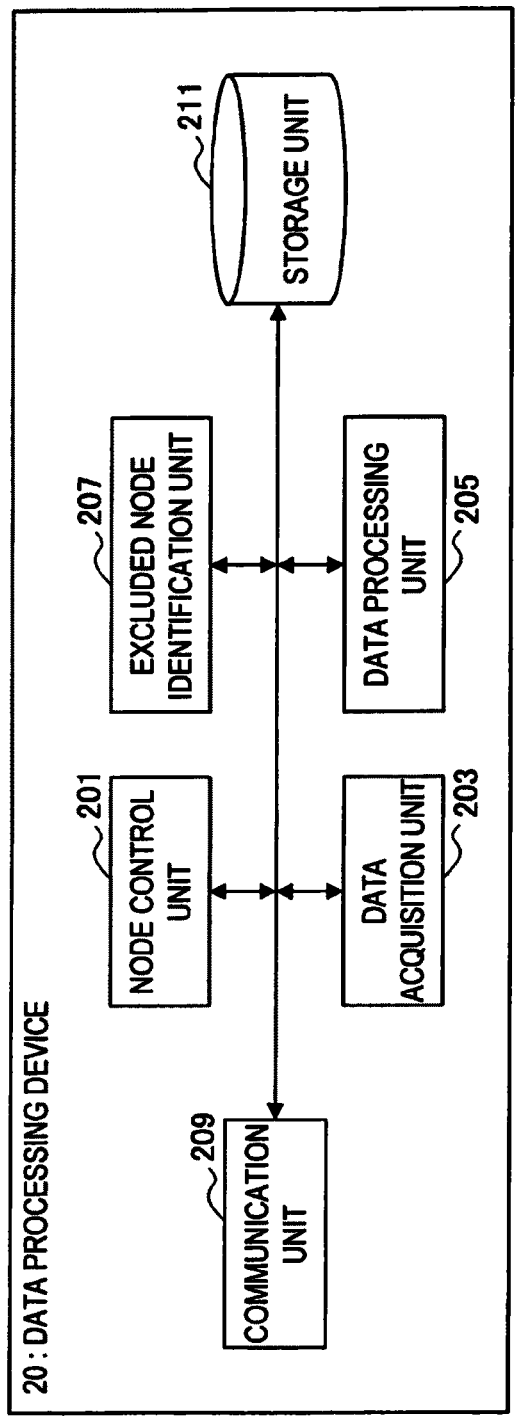
FIG. 5 is a block diagram illustrating a configuration of a data processing device according to the embodiment.

Subsequently, a configuration of the data processing device according to the present embodiment will be explained in detail with reference to FIG. 5. FIG. 5 is a block diagram illustrating the configuration of the data processing device according to the present embodiment.

The data processing device 20 is a device serving as a so-called sink node. For example, as shown in FIG. 5, the data processing device 20 mainly includes a node control unit 201, a data acquisition unit 203, a data processing unit 205, an excluded node identification unit 207, a communication unit 209, and a storage unit 211.

The node control unit 201 is achieved with, for example, a CPU, a ROM, a RAM, and the like. The node control unit 201 is processing unit for controlling the actor nodes 30 and the sensor nodes 40 arranged within the field.

The node control unit 201 requests the data processing unit 203 to obtain data from an actor node 30 with a predetermined time interval or in response to an instruction and the like given by an administrator of the data processing device 20, whereby the data processing device 20 can obtain data from the actor node 30 arranged within the field (this means that the data processing device 20 can also obtain data from sensor nodes 40).

The data acquisition unit 203 is achieved with, for example, a CPU, a ROM, a RAM, and the like. The data acquisition unit 203 obtains key information for the data processing device 20 generated by the key generation device 10 from the key generation device 10, and stores the key information to the later-explained storage unit 211. In addition, in response to a request given by the node control unit 201, the data acquisition unit 203 collects, from each actor node 30 arranged within the field, data collected by the actor node 30, and transmits the collected data to the later-explained data processing unit 205.

The data processing unit 205 is achieved with, for example, a CPU, a ROM, a RAM, and the like. The data processing unit 205 executes predetermined data processing based on the data obtained by the data acquisition unit 203. Therefore, the information processing system 1 according to the embodiment can achieve a matter set as an object.

The excluded node identification unit 207 is achieved with, for example, a CPU, a ROM, a RAM, and the like. The excluded node identification unit 207 can find operational states of the actor nodes 30 and the sensor nodes 40 arranged within the field, and can also find a failure if the failure occurs in the nodes. For example, in a case where a failure such as malfunction occurs at each node arranged within the field or in a case where key information including a communication key is compromised by a malicious third party, the excluded node identification unit 207 finds which node causes a failure.

When the node having the failure is an actor node 30, the excluded node identification unit 207 notifies, to another actor node 30, information about the actor node 30 having the failure. In addition, the excluded node identification unit 207 reallocates the grid covered by the actor node 30 having the failure to another actor node 30, so as to prevent adverse effect in data collection.

When the node having the failure is a sensor node 40, the excluded node identification unit 207 shares information about the sensor node 40 having the failure with the actor node 30.

Therefore, even when there is a node having failure, the data processing device 20 can achieve a matter set as an object by the information processing system 1.

The communication unit 209 is achieved with, for example, a CPU, a ROM, a RAM, a communication device, and the like. The communication unit 209 is a processing unit for controlling communication performed between the data processing device 20 and each device. The communication unit 209 communicates with the key generation device 10, the actor nodes 30, and the sensor nodes 40 according to a protocol used in the information processing system 1.

The storage unit 211 is an example of storage device of the data processing device 20 according to the present embodiment. The storage unit 211 may store various kinds of key information generated by the key generation device 10, system parameters, and the like. Further, the storage unit 211 may store various parameters or progress of processing that are necessary to be stored while the data processing device 20 performs certain processing, and may store various kinds of databases and so on as necessary. This storage unit 211 can be freely read and written by each processing unit of the data processing device 20 according to the present embodiment.

Examples of the functions of the data processing device 20 according to the present embodiment have been hereinabove explained. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the state of art at the time when the present embodiment is carried out.

It is possible to make a computer program for realizing the functions of the above-described data processing device according to the present embodiment, and the computer program can be implemented on a personal computer and the like. Further, a computer-readable recording medium storing such computer program can be provided. Examples of recording media include a magnetic disk, an optical disk, a magneto-optical disk, and a flash memory. Further, for example, the above computer program may be distributed by a network, without using any recording medium.

<Configuration of Actor Node>

Figure 6:
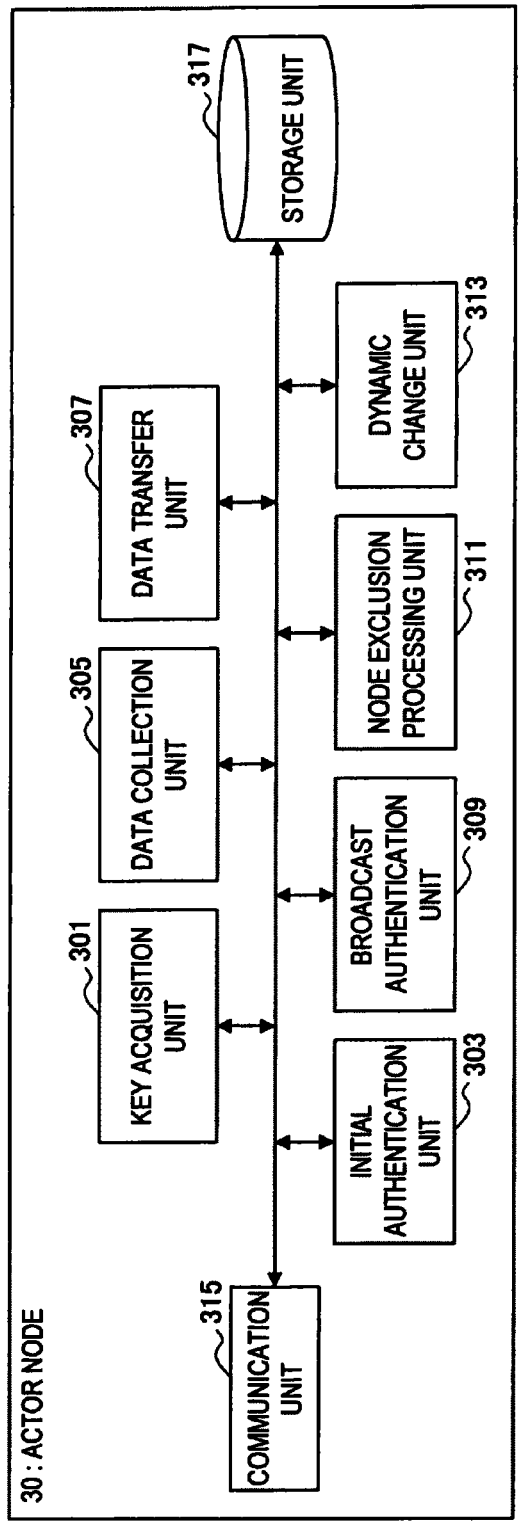
FIG. 6 is a block diagram illustrating a configuration of an actor node according to the embodiment.

Subsequently, a configuration of the actor node 30 according to the present embodiment will be explained in detail with reference to FIG. 6. FIG. 6 is a block diagram illustrating the configuration of the actor node 30 according to the present embodiment.

For example, as shown in FIG. 6, the actor node 30 mainly includes a key acquisition unit 301, an initial authentication unit 303, a data collection unit 305, a data transfer unit 307, a broadcast authentication unit 309, a node exclusion processing unit 311, a dynamic change unit 313, a communication unit 315, and a storage unit 317.

The key acquisition unit 301 is achieved with, for example, a CPU, a ROM, a RAM, and the like. The key acquisition unit 301 obtains key information including key generation information for the actor node 30 generated by the key generation device 10 and various kinds of system parameters. Further, the key acquisition unit 301 may store the obtained key information to the later-explained storage unit 317.

The actor node 30 according to the present embodiment can mutually communicate with the data processing device 20, another actor node 30, and the sensor nodes 40 by obtaining the key information.

The initial authentication unit 303 is achieved with, for example, a CPU, a ROM, a RAM, and the like. The initial authentication unit 303 performs later-explained initial authentication processing with sensor nodes 40 in each grid included in the coverage grids of the actor node 30. In this way, the actor node 30 and the sensor nodes 40 within the coverage grids can perform mutual authentication with each other. In this initial authentication processing, the actor node 30 moves over the grids within the coverage grid. After the initial authentication processing is finished, the actor node 30 moves to a position located at a substantially center of the coverage grids.

This initial authentication processing will be explained later in detail.

The data collection unit 305 is achieved with, for example, a CPU, a ROM, a RAM, and the like. The data collection unit 305 obtains various kinds of data measured by the sensor nodes 40 from the sensor nodes 40 arranged within the coverage grids. The data collection unit 305 can find whether failure occurs or not in each sensor node 40, for example, by communicating with each sensor node 40 with a regular interval. Likewise, the data collection unit 305 can find whether failure occurs or not in another actor node 30.

The data transfer unit 307 is achieved with, for example, a CPU, a ROM, a RAM, and the like. The data transfer unit 307 transfers data collected by the data collection unit 305 (data obtained from the sensor nodes 40 within the coverage grids) to the data processing device 20 serving as the sink node. Therefore, the data processing device 20 can obtain measurement data and the like measured by each sensor node 40.

The broadcast authentication unit 309 is achieved with, for example, a CPU, a ROM, a RAM, and the like. When the broadcast authentication unit 309 performs broadcast transmission to sensor nodes 40 in a certain grid within the coverage grids, the broadcast authentication unit 309 authenticates a message to be broadcast. This processing is hereinafter referred to as broadcast authentication processing. The broadcast authentication unit 309 authenticates a message by using a one-way hash chain generated by the key generation device 10 and a message authentication code (MAC). In some cases, the broadcast authentication unit 309 directly transmits the message to a target grid or transmits the message by way of several grids within the coverage grids.

This broadcast authentication processing will be explained later in detail.

The node exclusion processing unit 311 is achieved with, for example, a CPU, a ROM, a RAM, and the like. When a certain failure occurs in a sensor node 40 within the coverage grids or another actor node 30, the node exclusion processing unit 311 performs node exclusion processing to exclude the node having the failure from the system.

When a failure occurs in a sensor node 40 within the coverage grids, the node exclusion processing unit 311 performs the node exclusion processing while cooperating with another sensor node 40 within the grid in which the sensor node 40 having the failure resides. When a failure occurs in another sensor node 30, the node exclusion processing unit 311 performs the node exclusion processing while cooperating with the data processing device 20 and another actor node 30 that does not cause any failure.

This node exclusion processing will be explained later in detail.

The dynamic change unit 313 is achieved with, for example, a CPU, a ROM, a RAM, and the like. The dynamic change unit 313 temporarily changes the coverage grids with at least some of the actor nodes 30, and causes another actor node 30 to obtain data from sensor nodes 40 in at least a portion of the coverage grids. This temporary change of the coverage grids is performed in a case where a certain event occurs in the information processing system 1. This temporary change of the coverage grids (hereinafter referred to as dynamic change processing) may be performed in cooperation with the data processing device 20. By cooperating with the data processing device 20, the dynamic change unit 313 can efficiently reallocate the coverage grids. In the information processing system 1 according to the embodiment, the dynamic change unit 313 of the actor node 30 performs the dynamic change processing when an event occurs. Therefore, not only event-handling but also data-collection can be achieved at the same time.

The dynamic change processing performed by the dynamic change unit 313 is carried out mainly by cooperation between the dynamic change unit 313 and the sensor nodes 40 located in a grid of another actor node 30 and of which the actor node 30 is to be changed. The dynamic change processing performed by the dynamic change unit 313 includes two major flows, i.e., a processing performed at the start of dynamic change processing and a recovery processing back to coverage grids in normal state. These processings will be explained later in detail.

The communication unit 315 is achieved with, for example, a CPU, a ROM, a RAM, a communication device, and the like. The communication unit 315 is a processing unit for controlling communication between an actor node 30 and each device including another actor node 30. The communication unit 315 communicates with the key generation device 10, the actor nodes 30, and the sensor nodes 40 according to the protocol used in the information processing system 1.

The storage unit 317 is an example of storage device of an actor node 30 according to the present embodiment. The storage unit 317 may store various kinds of key information generated by the key generation device 10, system parameters, and the like. Further, the storage unit 317 may store various parameters or progress of processing that are necessary to be stored while the actor node 30 performs certain processing, and may store various kinds of databases and so on as necessary. This storage unit 317 can be freely read and written by each processing unit of the actor node 30 according to the present embodiment.

Examples of the functions of the actor node 30 according to the present embodiment have been hereinabove explained. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the state of art at the time when the present embodiment is carried out.

It is possible to make a computer program for realizing the functions of the above-described actor node according to the present embodiment, and the computer program can be implemented on a personal computer and the like. Further, a computer-readable recording medium storing such computer program can be provided. Examples of recording media include a magnetic disk, an optical disk, a magneto-optical disk, and a flash memory. Further, for example, the above computer program may be distributed by a network, without using any recording medium.

<Configuration of Sensor Node>

Figure 7:
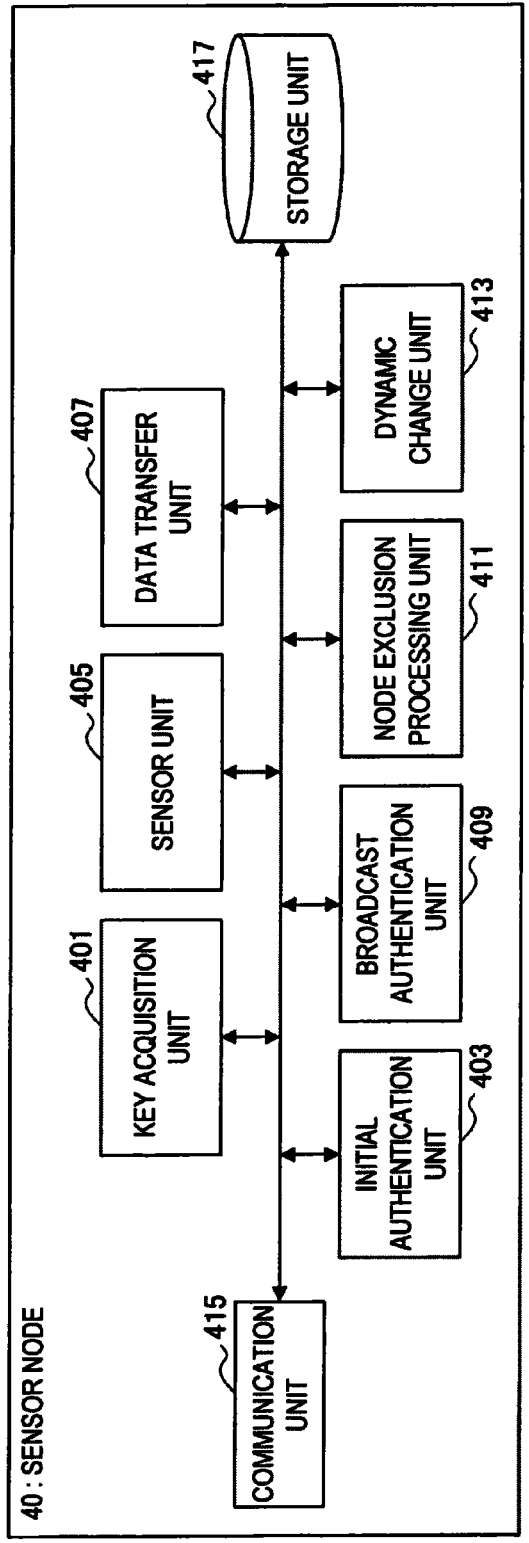
FIG. 7 is a block diagram illustrating a configuration of a sensor node according to the embodiment.

Subsequently, a configuration of the sensor node 40 according to the present embodiment will be explained in detail with reference to FIG. 7. FIG. 7 is a block diagram illustrating the configuration of the sensor node 40 according to the present embodiment.

For example, as shown in FIG. 7, the sensor node 40 mainly includes a key acquisition unit 401, an initial authentication unit 403, a sensor unit 405, a data transfer unit 407, a broadcast authentication unit 409, a node exclusion processing unit 411, a dynamic change unit 413, a communication unit 415, and a storage unit 417.

The key acquisition unit 401 is achieved with, for example, a CPU, a ROM, a RAM, and the like. The key acquisition unit 401 obtains key information including key generation information for the sensor node 40 generated by the key generation device 10 and various kinds of system parameters. Further, the key acquisition unit 401 may store the obtained key information to the later-explained storage unit 417.

The sensor node 40 according to the present embodiment can mutually communicate with the data processing device 20, the actor node 30, and other sensor nodes 40 by obtaining the key information.

The initial authentication unit 403 is achieved with, for example, a CPU, a ROM, a RAM, and the like. The initial authentication unit 403 performs later-explained initial authentication processing with the actor node 30 covering the grid in which the sensor node 40 resides. In this way, the sensor node 40 and the actor node 30 can perform mutual authentication with each other.

The sensor unit 405 is achieved with, for example, a CPU, a ROM, a RAM, various kinds of sensors, and the like. The sensor unit 405 generates data about ambient environment by detecting and measuring various kinds of data about environment around the position at which the sensor node 40 is installed. The sensors possessed by the sensor unit 405 include various kinds of devices used to obtain various kinds of data used for achieving an object to be achieved by the information processing system 1 according to the embodiment.

For example, if the information processing system 1 according to the embodiment is a system for the purpose of preventing fire, the sensor unit 405 is equipped with measuring devices as sensors (such as a thermometer, an image-capturing device such as a camera, a gas detector, and the like) which are useful for detecting fire. If the information processing system 1 according to the embodiment is a system for the purpose of detecting an intruder, the sensor unit 405 is equipped with measuring devices as sensors (such as various kinds of image-capturing devices and a sound-collecting microphone, and the like) which are useful for detecting an intruder. The above examples of sensors are merely examples, and the sensor unit 305 can be equipped with any device other than the above listed detection devices and measuring devices.

The data transfer unit 407 is achieved with, for example, a CPU, a ROM, a RAM, and the like. The data transfer unit 407 transfers data collected by the sensor unit 405 to the actor node 30 covering the grid in which the sensor node 40 is located. Therefore, the data processing device 20 can obtain measurement data and the like measured by each sensor node 40.

The broadcast authentication unit 409 is achieved with, for example, a CPU, a ROM, a RAM, and the like. The broadcast authentication unit 409 performs processing to authenticate a message broadcast by the actor node 30 covering the grid in which the sensor node 40 is located (broadcast authentication processing). The broadcast authentication unit 409 authenticates a message by using a one-way hash chain generated by the key generation device 10 and a message authentication code (MAC).

Further, the broadcast authentication unit 409 determines whether a message broadcast by the actor node 30 is transmitted to the grid in which the sensor node 40 is located or transmitted to another grid. When the destination grid to which the message is transmitted by the actor node 30 is determined not to be the grid in which the sensor node 40 is located, the broadcast authentication unit 409 relays the broadcast message to broadcast the message to the destination grid.

This broadcast authentication processing will be explained later in detail.

The node exclusion processing unit 411 is achieved with, for example, a CPU, a ROM, a RAM, and the like. When a certain failure occurs in the actor node 30 covering the grid in which the sensor node 40 is located or another sensor node 40 within the grid in which the sensor node 40 is located, the node exclusion processing unit 411 performs node exclusion processing to exclude the node having the failure from the system. The node exclusion processing unit 411 performs the node exclusion processing while cooperating with the actor node 30 covering the grid in which the sensor node 40 is located or an actor node 30 which is to cover the grid in which the sensor node 40 is located in the future.

This node exclusion processing will be explained later in detail.

The dynamic change unit 413 is achieved with, for example, a CPU, a ROM, a RAM, and the like. When the actor node 30 covering the grid in which the sensor node 40 is located is temporarily changed, the dynamic change unit 413 performs dynamic change processing of the actor node 30 while cooperating with the actor node 30 before the change. The dynamic change processing performed by the dynamic change unit 413 includes two major flows, i.e., a processing performed at the start of dynamic change processing and a recovery processing back to the actor node 30 in normal state. These processings will be explained later in detail.

The communication unit 415 is achieved with, for example, a CPU, a ROM, a RAM, a communication device, and the like. The communication unit 415 is a processing unit for controlling communication between a sensor node 40 and each device. The communication unit 415 communicates with the key generation device 10, the actor nodes 30, and the sensor nodes according to the protocol used in the information processing system 1.

The storage unit 417 is an example of storage device of a sensor node 40 according to the present embodiment. The storage unit 417 may store various kinds of key information generated by the key generation device 10, system parameters, and the like. Further, the storage unit 417 may store various parameters or progress of processing that are necessary to be stored while the sensor node 40 performs certain processing, and may store various kinds of databases and so on as necessary. This storage unit 417 can be freely read and written by each processing unit of the sensor node 40 according to the present embodiment.

Examples of the functions of the sensor node 40 according to the present embodiment have been hereinabove explained. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the state of art at the time when the present embodiment is carried out.

It is possible to make a computer program for realizing the functions of the above-described sensor node according to the present embodiment, and the computer program can be implemented on a personal computer and the like. Further, a computer-readable recording medium storing such computer program can be provided. Examples of recording media include a magnetic disk, an optical disk, a magneto-optical disk, and a flash memory. Further, for example, the above computer program may be distributed by a network, without using any recording medium.

<Overview of Processings Performed in Information Processing System>

Figure 8:
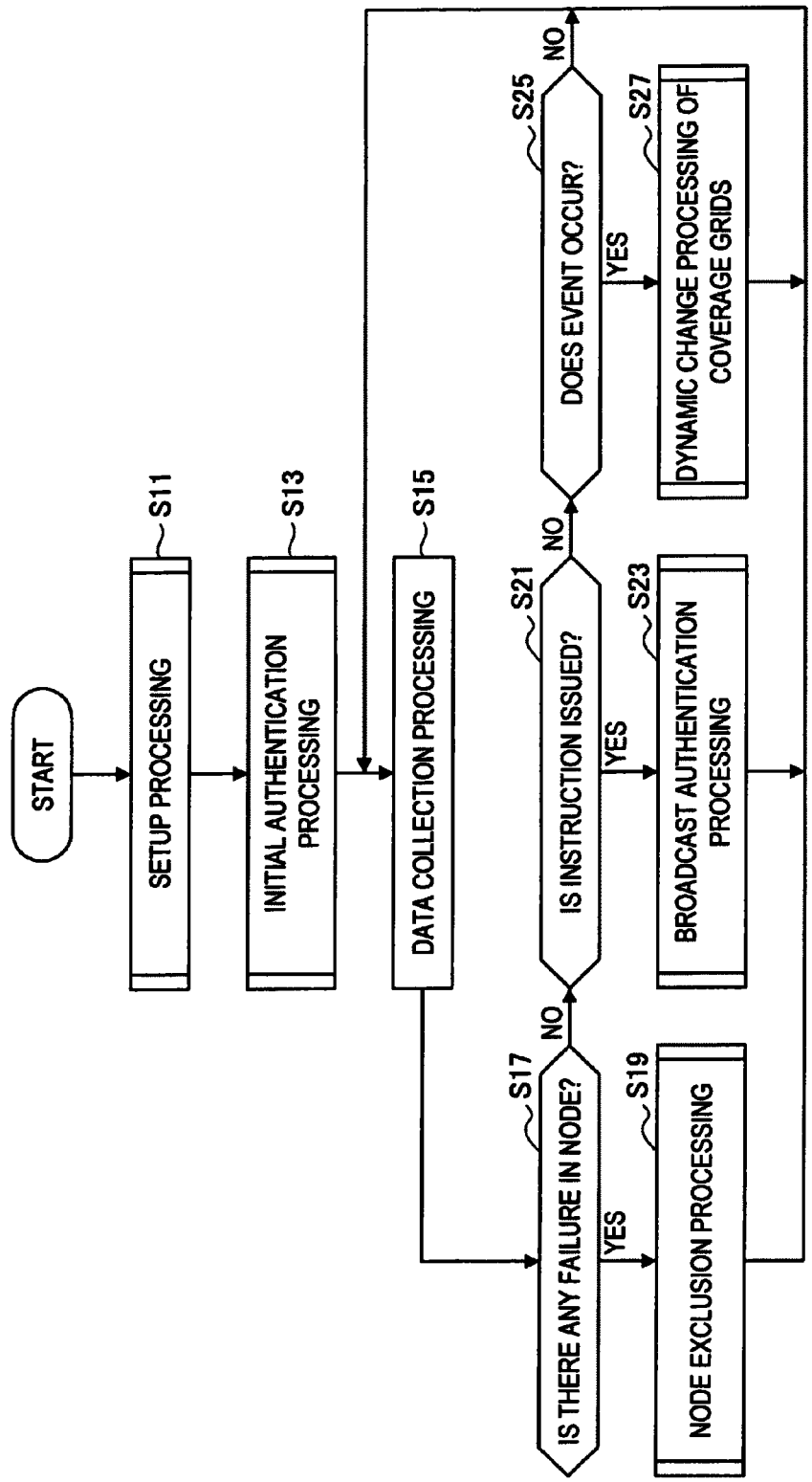
FIG. 8 is a flow diagram illustrating processings performed by the information processing system according to the embodiment.

Subsequently, an overview of processings performed in the information processing system according to the embodiment will be briefly explained with reference to FIG. 8. FIG. 8 is a flow diagram illustrating the processings performed in the information processing system according to the embodiment.

First, in the information processing system 1 according to the embodiment, the key generation device 10 performs setup processing including dividing the field into grids, generating various kinds of keys, and setting system parameters (S11). The key information including the keys generated by the key generation device 10 and some of the system parameters is transmitted to the data processing device 20, the actor node 30, and the sensor node 40.

Subsequently, the initial authentication processing is performed by the actor nodes 30 and the sensor nodes 40 arranged within the field, and mutual authentication is performed by the actor nodes 30 and the sensor nodes 40 (step S13).

This initial authentication processing enables the actor nodes 30 to collect data from the sensor nodes 40, and the data processing device 20 performs data collection processing from the sensor nodes 40 using the actor nodes 30 (step S15). This data collection processing is not limited to a specific method. Any data collection processing may be used.

Further, the data processing device 20 and the actor nodes 30 monitors the actor nodes 30 and the sensor nodes 40 to find if there is any failure in the actor nodes 30 or the sensor nodes 40 (step S17). When a failure occurs in a node, for example, when a node is broken or a node is taken over by a malicious third party, other normally operating actor nodes 30 and sensor nodes 40 perform node exclusion processing by cooperating with each other (step S19). The data processing device 20 serving as the sink node may also join the node exclusion processing.

Even when no failure occurs in the nodes, the actor nodes 30 may issue various kinds of instructions and the like to the sensor nodes 40 (step S21). In this case, the actor nodes 30 and the sensor nodes 40 perform authentication processing of broadcast messages (broadcast authentication processing) by cooperating with each other (step S23).

In the information processing system 1, an event may occur that causes adverse affect on the object to be achieved by the system (step S25). In such case, the dynamic change processing of the coverage grids is performed by the actor nodes 30 and the sensor nodes 40 (step S27). In the dynamic change processing, the grids covered by the actor nodes 30 are temporarily changed.

As described above, in the information processing system 1 according to the embodiment, various kinds of processings are performed according to various kinds of situations. In the below explanation, the setup processing, the initial authentication processing, the broadcast authentication processing, the node exclusion processing, and the dynamic change processing of the coverage grids will be hereinafter explained in detail with reference to the drawings.

<Setup Processing>

Figure 9:
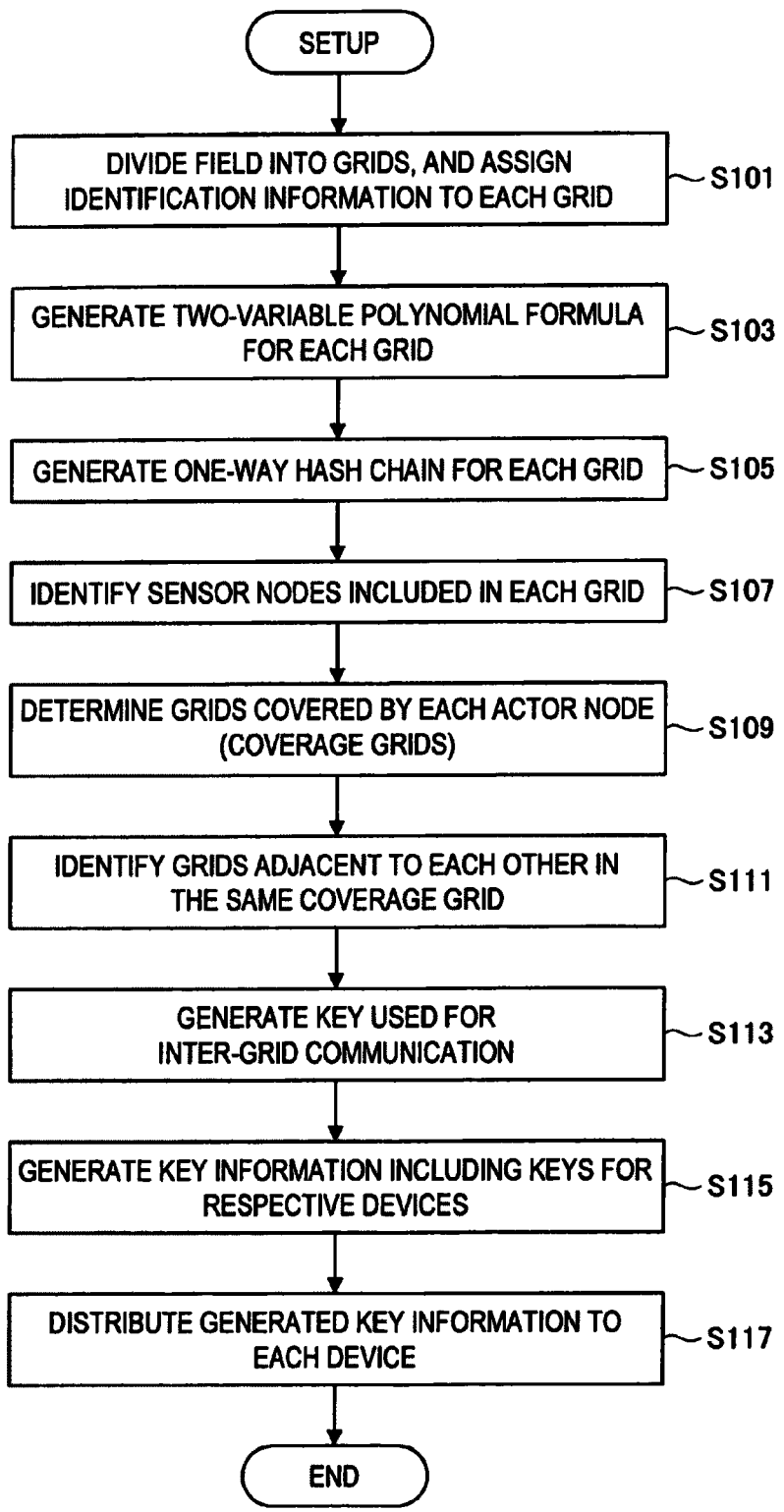
FIG. 9 is a flow diagram illustrating a setup processing performed by the key generation apparatus according to the embodiment.

First, the setup processing performed by the key generation device 10 according to the present embodiment will be explained in detail with reference to FIG. 9. FIG. 9 is a flow diagram illustrating the setup processing according to the present embodiment.

Before the following explanation, it is assumed that the data processing device 20 and the actor nodes 30 are associated with identification information unique within the system 1 by the parameter setting unit 101.

The setup processing is performed by the key generation device 10 when the information processing system 1 is established and starts operation. First, the parameter setting unit 101 of the key generation device 10 sets parameter about the number of blocks of grids. Then, the field dividing unit 103 divides the field arranged with the actor nodes 30 and the sensor nodes 40 into a plurality of grids while referencing the parameter about the number of blocks of grids, and assigns identification information to each grid (step S101). In the below explanation, it is assumed that the field is divided into totally XY pieces of grids $G_{x,y}$ ($0 \leq x \leq X-1$, $0 \leq y \leq Y-1$), and identification information $ID_{G(x,y)}$ is assigned to each grid.

Subsequently, the parameter setting unit 101 randomly generates t-th degree two-variable polynomial formula $F_{G(x,y)}$ for each grid $G_{x,y}$ (step S103).

Further, the hash chain generation unit 109 uses the hash function H set by the parameter setting unit 101 and the randomly generated random number r to generate one-way hash chain $O_{G(x,y)}^n$ for each grid $G_{x,y}$ (step S105).

Subsequently, the field dividing unit 103 identifies sensor nodes 40 included in each grid $G_{x,y}$ (step S107), and associates the identification information with each sensor node 40. Then, the actor node allocation unit 105 determines a grid $P_{A(i)}$ covered by an actor node $A_i$ (coverage grid) such that each actor node 30 covers about the same number of sensor nodes 40 (step S109). The coverage grids $P_{A(i)}$ serve as partitions according to which each actor node 30 manages all the sensor nodes 40 within the coverage grids.

When the coverage grids for each actor node $A_i$ are determined, the actor node allocation unit 105 identifies grids adjacent to each other in each grid $G_{x,y}$ included in each partition (step S111), thereby generating adjacent grid identification information $G_{G(x,y)}$.

Subsequently, the key generation unit 107 generates keys (G-G keys) $K_{G(x,y)}$ used for inter-grid communication by referencing the adjacent grid identification information $G_{G(x,y)}$ (step S113). The keys used in the inter-grid communication can be calculated using identification information $ID_{G(x,y)}$ associated with the grids and the two-variable polynomial formula $F(x, y)$.

Subsequently, the key generation unit 107 generates the key information including keys for respective actor nodes $A_i$ and respective sensor nodes $S^j$ (step S115). More specifically, the key generation unit 107 generates symmetric keys shared by the data processing device 20 and each actor node 30 and symmetric keys shared by the actor nodes. When the number of actor nodes is A, $A(A+1)/2$ pieces of symmetric keys shared by the actor nodes are generated. This is because $F(x, y)=F(y, x)$ holds in the two-variable polynomial formula $F(x, y)$.

Further, the key generation unit 107 uses the identification information $ID_{A(i)}$ of each actor node $A_i$ to generate a key generation polynomial formula $F_{G(x, y)}(ID_{A(i)}, y)$ (y: variable) for each of the grids $G_{x, y}$. Then, the key generation unit 107 uses the identification information $ID_{S<j>}$ of each sensor node $S^j$ to generate a key generation polynomial formula $F_{G(x, y)}(ID_{S<j>}, y)$ (y: variable) for each sensor node $S^j$ located in the same grid $G_{x, y}$.

Thereafter, the communication unit 111 of the key generation device 10 distributes the above-explained key information including the key generation information and the system parameters to the data processing device 20, the actor nodes 30, and the sensor nodes 40 (step S117).

By using the key information thus generated, the data processing device 20, the actor nodes 30, and the sensor nodes 40 in the information processing system 1 according to the embodiment can securely exchange information with each other.

<Initial Authentication Processing>

Figure 10A:
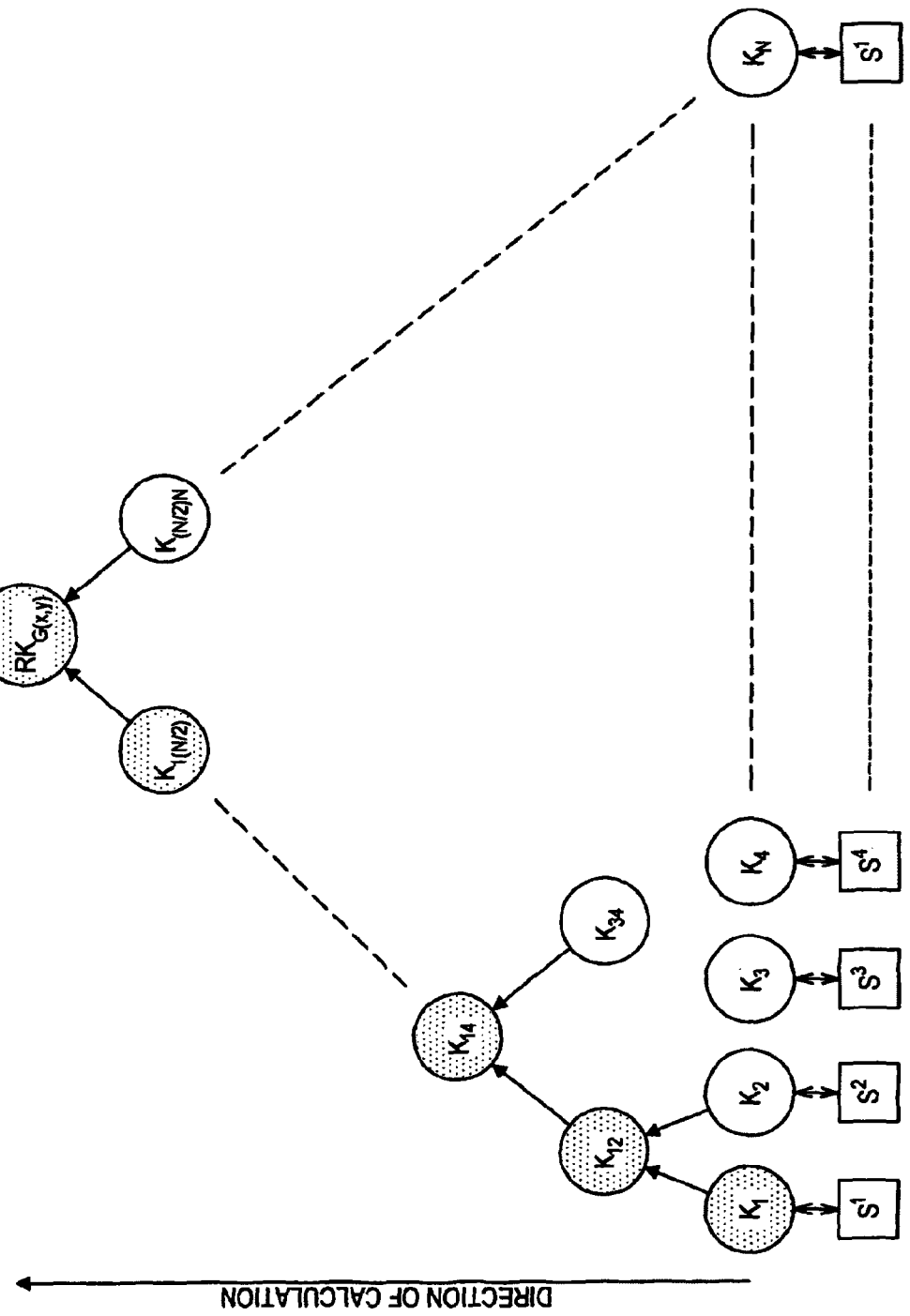
FIG. 10A is an explanatory diagram illustrating a one-way function tree.
Figure 10B:
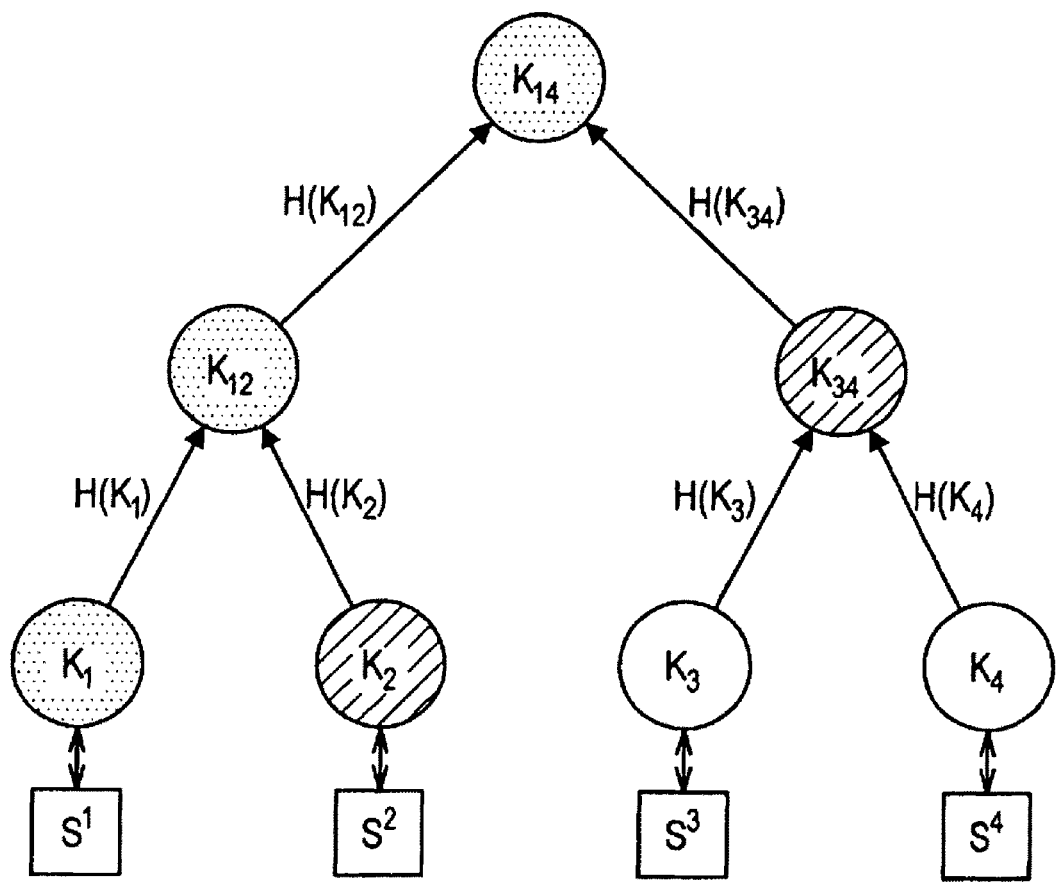
FIG. 10B is an explanatory diagram illustrating the one-way function tree.
Figure 12A:
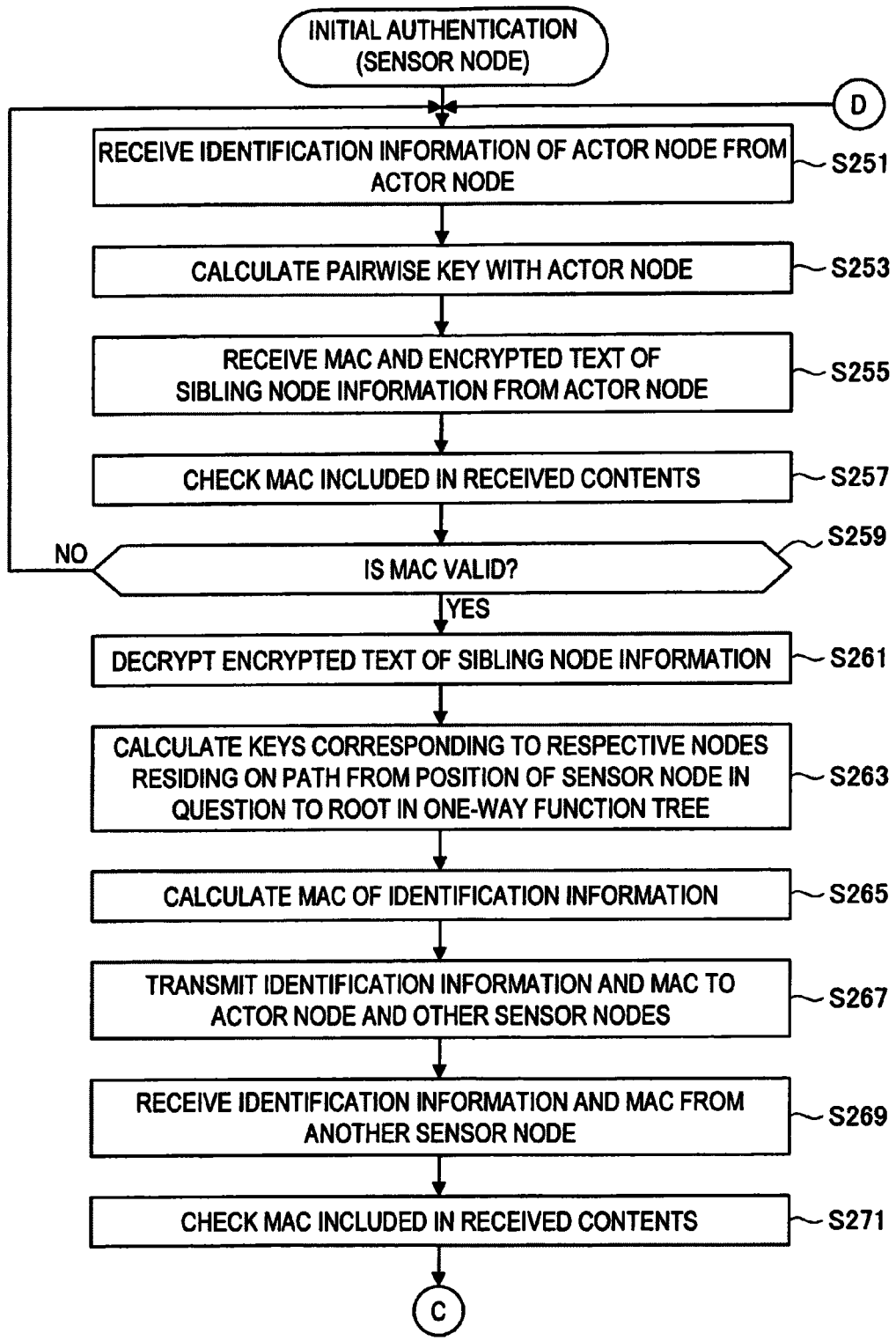
FIG. 12A is a flow diagram illustrating an initial authentication processing performed by the sensor node according to the embodiment.

Subsequently, the initial authentication processing performed by the actor nodes 30 and the sensor nodes 40 according to the present embodiment will be explained in detail with reference to FIGS. 10A to 12B. FIGS. 10A and 10B are explanatory diagrams illustrating a one-way function tree used in the initial authentication processing. FIGS. 11A and 11B are flow diagrams illustrating the initial authentication processing performed by the actor nodes 30 according to the present embodiment. FIGS. 12A and 12B are flow diagrams illustrating the initial authentication processing performed by the sensor nodes 40 according to the present embodiment.

[One-Way Function Tree]

Before explaining the initial authentication processing, the one-way function tree (one way function tree) used in the initial authentication processing will be briefly explained with reference to FIGS. 10A and 10B.

In the information processing system 1 according to the embodiment, an encrypted message can be decrypted only in a case where a common key is shared by a transmitting device and a receiving device when the encrypted message is exchanged. In the present embodiment, messages can be exchanged securely because keys are shared between the actor nodes, between the data processing device and the actor nodes, and between the data processing device and the sensor nodes. However, in some cases, it may be desired that information be securely exchanged between the sensor nodes within the same grid. Accordingly, in the information processing system 1 according to the embodiment, the one-way function tree as shown in FIG. 10A is used to achieve generation of keys allowing communication with a sensor node within the same grid based on minimal information.

FIG. 10A illustrates an example of one-way function tree. In the one-way function tree according to the present embodiment, each node of the tree structure corresponds to a symmetric key. End nodes (leaf node) $K_1$~$K_N$ of the tree structure represent symmetric keys possessed by each sensor node $S^j$. In this example, attention is given to a leaf node $K_1$. This node corresponds to a sensor node $S^1$ in a certain grid. When the sensor node $S^1$ has only the key $K_1$ as shown in FIG. 10A, the sensor node $S^1$ cannot exchange a message with a sensor node located in the same level (for example, a sensor node $S^2$) using a key. However, when the sensor node $S^1$ and the sensor node $S^2$ can calculate and share a key of a parent node $K_{12}$, the sensor node $S^1$ can perform secure communication with the sensor node $S^2$.

Likewise, the sensor nodes $S^1$ to $S^4$ can achieve secure communication as follows. A key corresponding to a node $K_{12}$ and a key corresponding to a node $K_{34}$ are used to calculate a key corresponding to $K_{14}$, i.e., a parent node of these nodes, and this calculated key is shared by corresponding sensor nodes.

Accordingly, in the initial authentication processing performed in the information processing system 1 according to the embodiment, the actor node 30 covering each grid generates the one-way function tree, an example of which is shown in FIG. 10A, and the actor node 30 notifies minimum information to the sensor nodes 40 within the coverage grids. As is evident from the above explanation, $K_{jk}$ as in FIG. 10A represents a key shared by $S^j$, $S^{j+1}$, ..., $S^k$, and a key $RK_{G(x, y)}$ corresponding to a root represents a key shared by the sensor nodes 40 located within the grid.

When a key corresponding to a parent node (for example, $K_{12}$ when attention is given to $K_1$) is calculated, the information processing system 1 according to the embodiment uses the hash function H, i.e., a system parameter. When the key corresponding to the parent node is calculated, it is necessary to have a key of a node (sibling node) located in the same level as the node in question, which is branched from the parent node whose key is to be calculated. In the following explanation, a method for calculating the key corresponding to the parent node will be explained in a concrete manner with reference to the example shown in FIG. 10B.

In the below explanation, it is assumed that the actor node 30 has identification information of the sensor nodes 40 installed within the coverage grids. As explained later, the symmetric keys shared by the actor nodes 30 and the sensor nodes 40 are generated using identification information of each node. Therefore, the actor node 30 is considered to have all the keys shared with the sensor nodes 40 within the coverage grids.

First, the actor node 30 uses the key $K_1$ and the hash function H, i.e., system parameter to calculate a hash value $L_1=H(K_1)$ of the key $K_1$. Likewise, the actor node 30 uses each of the keys $K_2$ to $K_4$ and the hash function H to calculate hash values $L_2$ to $L_4$.

Subsequently, the actor node 30 calculates $K_{12}$, i.e., the parent node of $K_1$ and $K_2$ according to the formula $K_{12}=H(L_1 \| L_2)$. It should be noted that a sign (x∥y) means a concatenation of a bit string x and a bit string y. Likewise, the actor node 30 calculates $K_{34}$, i.e., the parent node of $K_3$ and $K_4$ according to the formula $K_{34}=H(L_3 \| L_4)$.

Subsequently, the actor node 30 uses the calculated keys K12, K34 and the hash function H to calculate a root key $K_{14}$ according to $K_{14}=H(L_{12} \| L_{34})$.

By repeating the above calculations, the actor node 30 can calculate a root key $RK_{G(x, y)}$ of the one-way function tree as shown in FIG. 10A.

On the other hand, when attention is given to the sensor node $S^1$ in FIG. 10B, and the sensor node $S^1$ calculates the root key $K_{14}$, $K_{12}$ is calculated first and then root key $K_{14}$ is calculated, as is evident from the tree structure. At this occasion, the sensor node $S^1$ needs to have a hash value $L_2$ of the node $K_2$, i.e., a sibling node of the node $K_{12}$ and a hash value $L_{34}$ of the node $K_{24}$, i.e., a sibling node of the node $K_{14}$. Accordingly, as explained later, the actor node 30 transfers the hash values corresponding to the sibling nodes necessary for calculation of the root key, sibling node information, to each sensor node 40. By using the received sibling node information, each sensor node $S^j$ can calculate the key shared with the other sensor nodes 40 within the same grid. In this processing, only the minimum information necessary for the calculation is transmitted. Therefore, the data size of the message transmitted from the actor node 30 to the sensor nodes during the initial authentication processing can be reduced.

[Initial Authentication Processing Performed by Actor Nodes]

Subsequently, the flow of the initial authentication processing performed by the actor nodes will be explained in detail with reference to FIGS. 11A and 11B.

Before the following explanation, it is assumed that an actor node 30 previously has the identification information of the sensor nodes 40 within the coverage grids. In the following explanation, a certain actor node 30 (actor node $A_i$) will be explained as an example.

First the actor node $A_i$ moves to a grid (unauthenticated grid) within the coverage grids for which initial authentication processing has not yet been executed (step S201). Subsequently, the initial authentication unit 303 uses the identification information $ID_{A(i)}$ of the actor node and identification information $ID_{S<j>}$ of the sensor nodes $S^j$ ($1 \leq j \leq N$) within the grid to calculate pairwise keys $K_{A(i),S<j>}$ for the respective sensor nodes based on the following formula 201 (step S203). As is evident from the following formula 201, the pairwise keys for the respective sensor nodes are generated using the two-variable polynomial formula included in the key generation information (more specifically, the polynomial formula in which the identification information of the actor node is substituted into one of variables).

[Expression 2]

$$K_{A_i,S^j} = F_{G_{x,y}}(ID_{A_i}, ID_{S^j}) \qquad \text{(Formula 201)}$$

Subsequently, the initial authentication unit 303 uses the calculated pairwise keys $K_{A(i),S<j>}$ to generate one-way function tree $T_{G(x, y)}$, examples of which are shown in FIG. 10A, FIG. 10B (step S205), and stores the generated one-way function tree $T_{G(x, y)}$ to the storage unit 317.

Subsequently, the initial authentication unit 303 broadcast the identification information $ID_{A(i)}$ of the actor node to all the sensor nodes $S^j$ within the grid (step S207). Therefore, each sensor node $S^j$ within the grid can also calculate the pairwise key used in communication with the actor node 30 covering the sensor node $S^j$.

Subsequently, the initial authentication unit 303 uses the generated one-way function tree $T_{G(x, y)}$ to identify a sibling node corresponding to each sensor node $S^j$ within the tree, and generates information about sibling nodes (sibling node information) $V^{S<j>}$ (step S209). The information about sibling nodes includes a hash value $L=H(K)$ of a key K corresponding to a sibling node. For example, the one-way function tree as shown in FIG. 10B is generated. When attention is given to a sensor node $S^1$, sibling nodes thereof are $K_2$ and $K_{34}$, and information about sibling nodes $V^{S<1>}$ includes hash values $L_2$ and $L_{34}$.

Subsequently, the initial authentication unit 303 encrypts the generated sibling node information $V^{S<j>}$ for respective sensor nodes $S^j$ using keys $K_{A(i),S<j>}$ for the respective sensor nodes $S^j$, and obtains encrypted text (step S211). In the below explanation, the generated encrypted text will be represented as the following notation 201.

[Expression 3]

$$Enc_{K_{A_i,S^j}}(V^{S^j}) \qquad \text{(Notation 201)}$$

Subsequently, the initial authentication unit 303 uses the generated encrypted text of the sibling node information to generate a message authentication code (MAC) of this encrypted text (step S213). The MAC is calculated using the key $K_{A(i),S<j>}$ for the sensor node $S^j$. By using this MAC, the sensor node $S^j$ having received the message can check the authenticity of the message. In the below explanation, the generated MAC is represented as the following notation 202.

[Expression 4]

$$MAC_{K_{A_i,S^j}}(Enc_{K_{A_i,S^j}}(V^{S^j})) \qquad \text{(Notation 202)}$$

Subsequently, the initial authentication unit 303 transmits (unicast) the generated encrypted text Enc of the sibling node information and the MAC thereof to the corresponding sensor node $S^j$ (step S215).

Thereafter, the actor node $A_i$ receives a reply message from each sensor node $S^j$ within the grid $G_{x, y}$ (step S217). This reply message includes the identification information $ID_{S<j>}$ of each sensor node, the MAC of the identification information $ID_{S<j>}$ using the root key $RK_{G(x, y)}$ generated by the sensor node $S^j$.

Subsequently, the initial authentication unit 303 of the actor node $A_i$ checks the MAC included in the reply message (step S219), and confirms that each reply message is a valid message transmitted from the sensor node $S^j$. Since this message is generated using the root key calculated by the sensor node $S^j$ as described above, the actor node $A_i$ can confirm that the sensor node $S^j$ and the root key can be shared by confirming the authenticity of this message.

Subsequently, the initial authentication unit 303 determines whether valid messages have been received from all the sensor node $S^j$ within the grid $G_{x, y}$ (step S221). When the valid messages have not yet been received from all the sensor nodes $S^j$, the initial authentication unit 303 returns back to step S203 to repeat the initial authentication processing.

When the valid messages have been received from all the sensor nodes $S^j$ within the grid $G_{x, y}$, the initial authentication unit 303 references the information $P_{A(i)}$ about the coverage grids included in the key information to determine whether the coverage grids include only one grid being processed (step S223). In a case where the coverage grids include only one grid, the initial authentication unit 303 terminates the initial authentication processing.

On the other hand, in a case where the coverage grids include not only one grid but also other grids, the initial authentication unit 303 performs the following processing. That is, the initial authentication unit 303 generates information about adjacent grids including $O^{n-1}$ of the hash chain $O^n$ for the grid $G_{x, y}$, the adjacent grid identification information $G_{G(x, y)}$, and the key $K_{G(x, y)}$ for inter-grid communication. Thereafter, initial authentication unit 303 uses the root key $RK_{G(x,y)}$ of the grid $G_{x, y}$ to encrypt the generated information about adjacent grids, and generates an encrypted text as shown in the following notation 203 (step S225).

[Expression 5]

$$Enc_{RK_{G_{x,y}}}(O^{n-1}, G_{G_{x,y}}, K_{G_{x,y}}) \quad \text{(Notation 203)}$$

Subsequently, the initial authentication unit 303 uses the root key $RK_{G(x, y)}$ to calculate the MAC of the encrypted text of the generated information about adjacent grids, as represented by the following notation 204 (step S227).

[Expression 6]

$$MAC_{RK_{G_{x,y}}}\left(Enc_{RK_{G_{x,y}}}(O^{n-1}, G_{G_{x,y}}, K_{G_{x,y}})\right) \quad \text{(Notation 204)}$$

Subsequently, the initial authentication unit 303 broadcasts a message including the MAC of the notation 204 and the encrypted text of the notation 203 to all the sensor nodes $S^j$ within the grid $G_{x, y}$ (step S229).

Subsequently, the initial authentication unit 303 determines whether the grid currently being processed is the final grid in the coverage grids (step S231). When the grid currently being processed is the final grid, the initial authentication unit 303 terminates the initial authentication processing. When the grid currently being processed is not the final grid, the initial authentication unit 303 returns back to step S201 to execute the initial authentication processing on other grids.

[Initial Authentication Processing Performed by Sensor Nodes]

Subsequently, the flow of the initial authentication processing performed by the sensor nodes will be explained in detail with reference to FIGS. 12A and 12B.

First, the initial authentication unit 403 of a sensor node $S^j$ located within a grid $G_{x, y}$ receives identification information $ID_{A(i)}$ of the actor node $A_i$ covering the grid in question from the actor node $A_i$ (step S251).

Subsequently, the initial authentication unit 403 uses the identification information $ID_{A<j>}$ of the sensor node and the obtained identification information $ID_{A(i)}$ of the actor node Ai to calculate the pairwise key $K_{S<j>,A(i)}$ for the actor node according to the following formula 211 (step S253). As is evident from the following formula 211, the pairwise keys for the actor node is generated using the two-variable polynomial formula included in the key generation information (more specifically, the polynomial formula in which the identification information of the sensor node is substituted into one of variables). Note that the pairwise key represented by the formula 211 is the same as the pairwise key represented by the formula 201 due to the nature of the two-variable polynomial formula according to the present embodiment.

[Expression 7]

$$K_{S^j, A_i} = F_{G_{x,y}}(ID_{S^j}, ID_{A_i}) \quad \text{Formula (211)}$$
$$= F_{G_{x,y}}(ID_{A_i}, ID_{S^j})$$
$$= K_{A_i, S^j}$$

Subsequently, the initial authentication unit 403 receives, from the actor node $A_i$, a message including a MAC of an encrypted text of sibling node information represented by the notation 202 and an encrypted text of the notation 201 (encrypted text of sibling node information) (step S255). When the message is received, the initial authentication unit 403 checks the MAC represented by the notation 202 (step S257), and confirms that the received message is a valid message transmitted from the actor node $A_i$.

When the MAC is determined not to be valid, the sensor node $S^j$ returns back to step S251, and waits for the identification information of the actor node $A_i$.

On the other hand, when the MAC is determined to be valid, the initial authentication unit 403 uses the key generated in step S253 to decrypt the encrypted text of the notation 201 (step S261). Thereafter, the initial authentication unit 403 uses the sibling node information obtained from the decrypted result and the key generated in step S253 to calculate keys corresponding to respective nodes residing on a path from the position of the sensor node in question to the root in the one-way function tree (step S263).

Subsequently, the initial authentication unit 403 of the sensor node $S^j$ uses the calculated root key $RK_{G(x, y)}$ to calculate the MAC of the identification information $ID_{S<j>}$ of the sensor node (step S265). Subsequently, the initial authentication unit 403 transmits, by unicast, a message including the identification information $ID_{S<j>}$ and the MAC to the actor node $A_i$ covering the grid and the other sensor nodes within the same grid (step S267).

Subsequently, the sensor node $S^j$ receives a message including the identification information $ID_{S<k>}$ and the MAC from another sensor node $S^k$ ($k \ne j$) within the same grid (step S269). Thereafter, the initial authentication unit 403 checks the MAC included in the received message (step S271).

The initial authentication unit 403 determines whether valid messages have been received from all the sensor nodes based on the verification result of the MAC (step S273). When valid messages have not yet been received from all the sensor nodes, the initial authentication unit 403 returns back to step S251 to repeat the initial authentication processing.

On the other hand, when valid messages have been received from all the sensor nodes, the initial authentication unit 403 waits for a message including information about adjacent grids transmitted from the actor node A. When the initial authentication unit 403 receives a message including an encrypted text of the notation 203 (encrypted text of information about adjacent grids) and the MAC represented by the notation 204 (step S275), the initial authentication unit 403 checks the MAC included in the message (step S277). When the MAC is determined to be valid, the initial authentication unit 403 decrypts the encrypted text included in the message (step S279).

As described above, the information about adjacent grids include a portion ($O^{n-1}$) of the one-way hash chain $O^n$ used in the grid $G_{x, y}$. Accordingly, the initial authentication unit 403 uses the hash chain $O^{n-1}$ and the hash function H, i.e., system parameter to calculate $H(O^{n-1})$, and determines whether the calculated hash value is the same as the value of the one-way hash chain $O^n$ held in the sensor node (step S281).

The initial authentication unit 403 determines whether the hash chain has been successfully verified or not (step S283). When the verification has failed, the initial authentication unit 403 returns back to step S275 to wait for a message from the actor node $A_i$. On the other hand, when the verification is successful, the initial authentication unit 403 stores the information about adjacent grids ($G_{G(x, y)}$, $K_{G(x, y)}$) included in the message to the storage unit 417 (step S285).

The actor nodes $A_i$ and the sensor nodes $S^j$ according to the present embodiment perform the initial authentication processing as described above, thus sharing the keys used in communication between the nodes.

<Broadcast Authentication Processing>

Figure 13A:
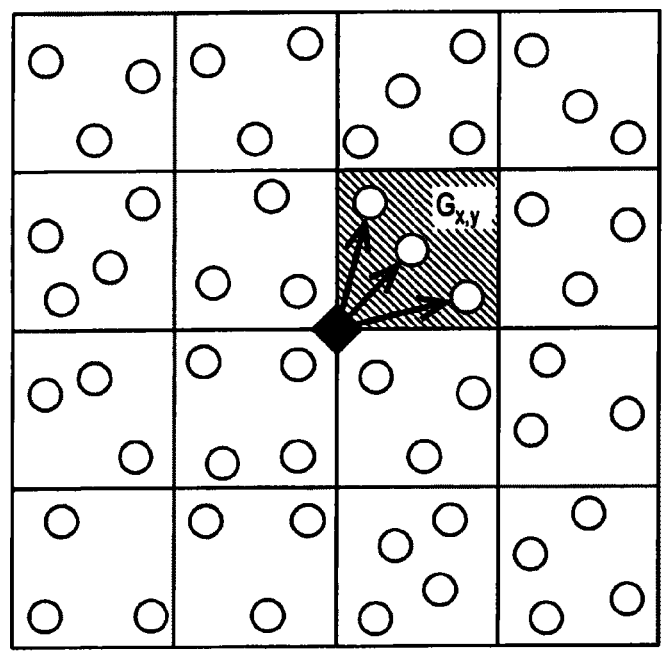
FIG. 13A is an explanatory diagram illustrating a transmission method of a message in the information processing system according to the embodiment.
Figure 13B:
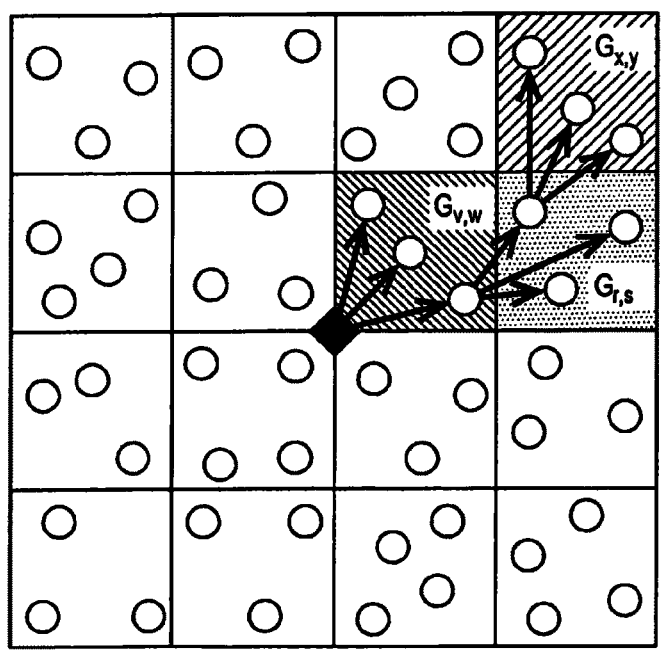
FIG. 13B is an explanatory diagram illustrating a transmission method of a message in the information processing system according to the embodiment.
Figure 15A:
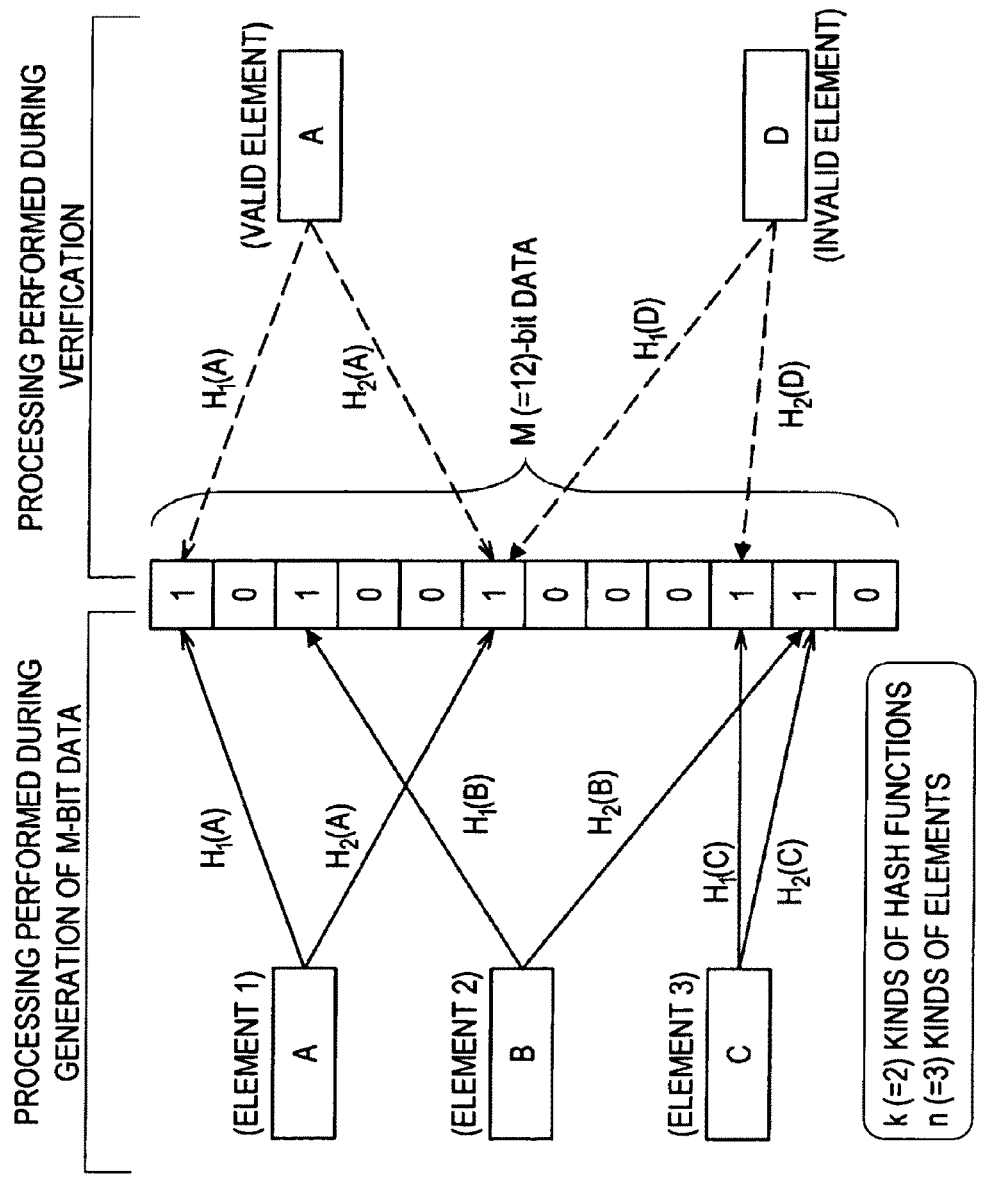
FIG. 15A is an explanatory diagram illustrating Bloom Filter.
Figure 15B:
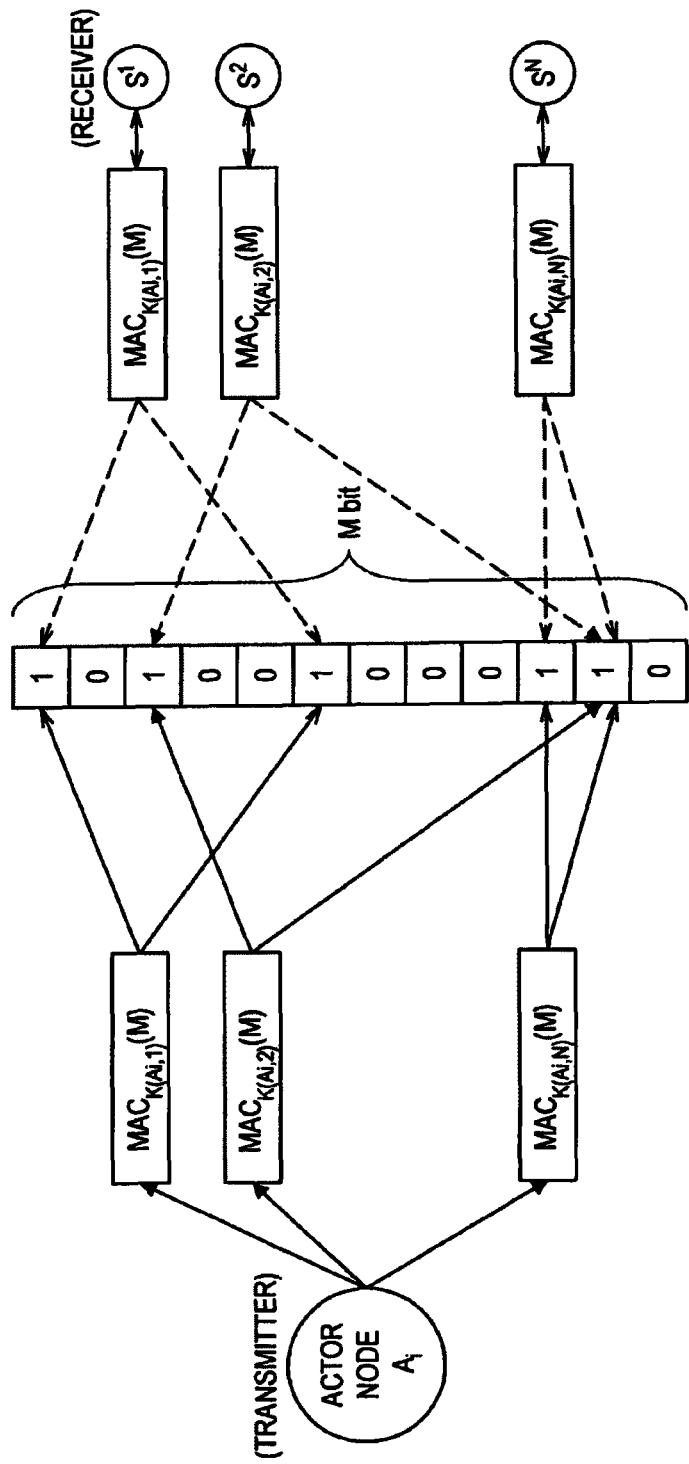
FIG. 15B is an explanatory diagram illustrating Bloom Filter.
Figure 16A:
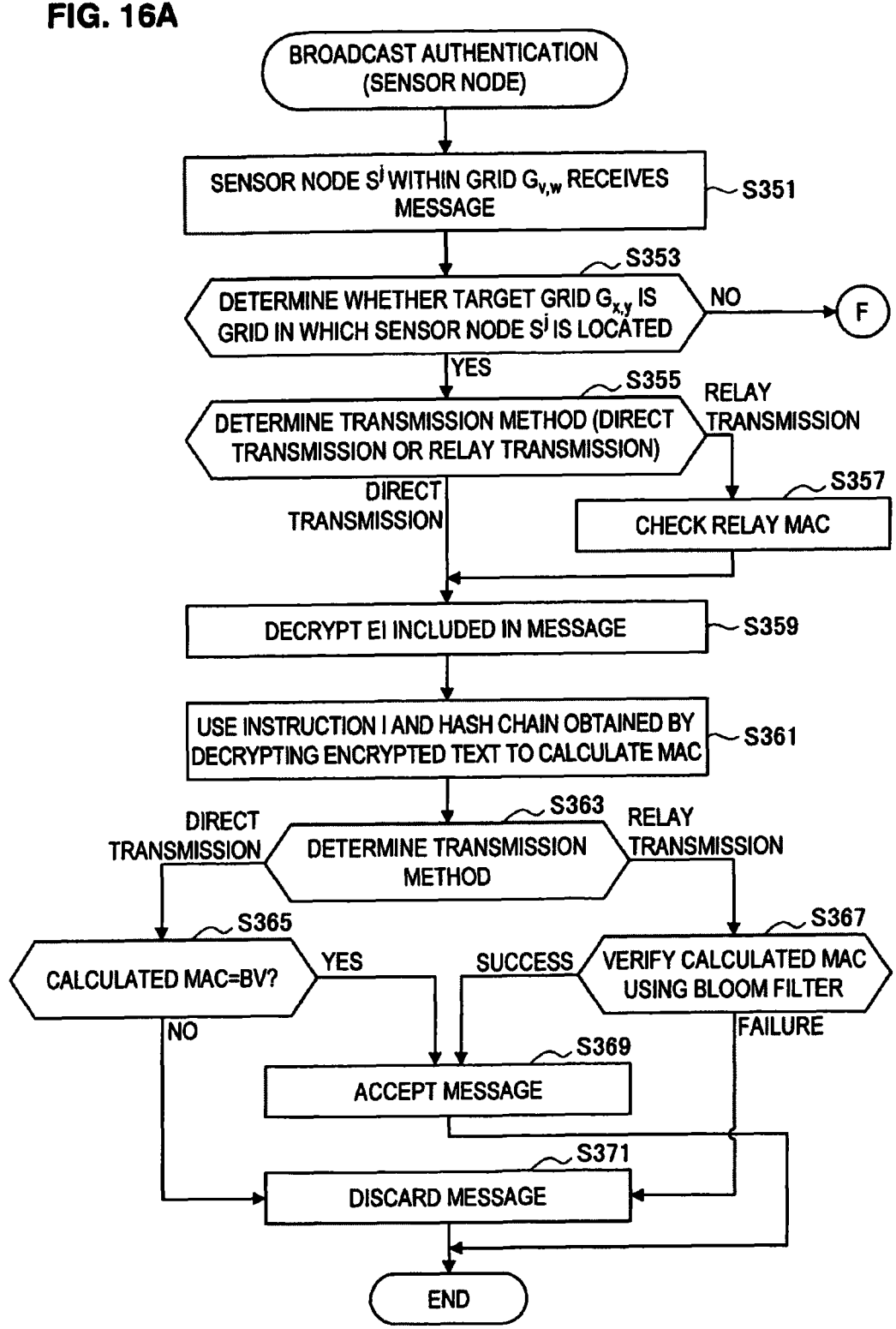
FIG. 16A is a flow diagram illustrating a broadcast authentication processing performed by the sensor node according to the embodiment.

Subsequently, broadcast authentication processing performed by the actor nodes 30 and the sensor nodes 40 according to the present embodiment will be explained in detail with reference to FIGS. 13A to 16B. FIGS. 13A and 13B are explanatory diagrams illustrating a method for transmitting a message in the information processing system according to the embodiment. FIGS. 14A and 14B are flow diagrams illustrating the broadcast authentication processing performed by the actor nodes 30 according to the present embodiment. FIGS. 15A and 15B are explanatory diagrams illustrating Bloom Filter. FIGS. 16A and 16B are flow diagrams illustrating the broadcast authentication processing performed by the sensor nodes 40 according to the present embodiment.

[Message Transmission Method]

Before explaining the broadcast authentication processing according to the present embodiment, a message transmission method performed by the information processing system 1 according to the embodiment will be briefly explained with reference to FIGS. 13A and 13B.

The communication range of a communication apparatus (wireless communication apparatus) of the actor nodes 30 and the sensor nodes 40 according to the present embodiment is limited. Accordingly, the information processing system 1 according to the embodiment uses two kinds of message transmission methods as shown in FIGS. 13A and 13B, thereby allowing an actor node 30 to reliably transmit messages to the sensor nodes 40 within the coverage grids.

FIG. 13A shows a case where a grid to which an actor node 30 is to transmit message (i.e., transmission target grid which will also be hereinafter referred to as a target grid) $G_{x,y}$ is located within the communication range of the actor node 30. In such case, the actor node 30 can directly transmit a message to sensor nodes 40 within a transmission target grid $G_{x,y}$ (direct transmission).

In some cases, the transmission target grid $G_{x,y}$ is located far away from the actor node 30 as shown in FIG. 13B. In such case, the actor node 30 transmits a message in a relay method using grids residing on the way to the transmission target grid (relay transmission), instead of directly transmitting the message to the transmission target grid $G_{x,y}$. In the example shown in FIG. 13B, an actor node 30 located in proximity to a grid $G_{v,w}$ uses a grid $G_{r,s}$ as a relay grid to transmit a message to a transmission target grid $G_{x,y}$ according to the relay method.

[Broadcast Authentication Processing Performed by Actor Nodes]

Subsequently, the flow of broadcast authentication processing performed by the actor nodes will be explained in detail with reference to FIGS. 14A and 14B.

First, the broadcast authentication unit 309 of an actor node $A_i$ generates an instruction I to be transmitted to a target grid $G_{x,y}$ (step S301). Subsequently, the broadcast authentication unit 309 uses information representing relative arrangement of grids to determine whether an instruction I can be transmitted to the target grid $G_{x,y}$ according to the direct transmission method as shown in FIG. 13A (step S303).

When the broadcast authentication unit 309 determines that the instruction I can be transmitted by the direct transmission method, the broadcast authentication unit 309 uses a portion of the hash chain and the generated instruction I to generate transmission information, and calculates a transmission parameter BV represented by the following formula 301 (step S305).

[Expression 8]

$$BV = MAC_{RK_{G_{x,y}}}(O^{i-1}, I) \quad \text{(Formula 301)}$$

The above formula 301 includes a portion $O^{i-1}$ of the hash chain, which has not yet been used at the time of execution of the broadcast authentication processing. For example, this means that, when values up to $O^{100}$ (n=100) of the hash chain $O^n$ (n>100) are used at the time of execution of the broadcast authentication processing, $O^{99}$ is selected in the above formula 301.

On the other hand, when the broadcast authentication unit 309 determines not to use the direct transmission method, the broadcast authentication unit 309 uses a portion of the hash chain and the generated instruction I to generate transmission information, and calculates a MAC represented by the following formula 302 for each sensor node $S^j$ (step S307). The MAC calculated for each sensor node $S^j$ is used as a piece of data (transmission parameter) in the following processing. This transmission parameter will be hereinafter referred to as pre_BV.

[Expression 9]

$$\text{pre\_BV} = \left\{ MAC_{K_{A_i,S^1}}(O^{i-1}, I), \ldots, MAC_{K_{A_i,S^N}}(O^{i-1}, I) \right\} \quad \text{(Formula 302)}$$

Subsequently, the broadcast authentication unit 309 performs Bloom Filter processing on the calculated plurality of MACs, and adopts the output of the Bloom Filter as the transmission parameter BV (step S309). In the below explanation, the Bloom Filter processing performed on data x is represented as BF(x). According to this notation, the processing in step S309 can be represented as BV=BF(pre_BV).

Now, the explanation about the broadcast authentication processing is interrupted here, and the Bloom Filter will be briefly explained with reference to FIGS. 15A and 15B.

The Bloom Filter is a probabilistic data structure which is used to determine whether a certain element is a member of a set. This Bloom Filter is represented as an M-bit data array.

This Bloom Filter includes three parameters, i.e., the number of bits M of the data array, the number of hash functions k used for generation of the data array, and the number of elements n subjected to filter processing. In this case, the hash function used for generation of the data array is a hash function for uniformly mapping an input value to any one of the $\{0, 1, \ldots, m-1\}$-th bits.

FIG. 15A illustrates a Bloom Filter in a case where M=12, k=2, n=3, for the sake of convenience. The processings shown on the left side of the M-bit data column located in the center of the figure schematically represents processings performed during generation of M-bit data (during generation of the Bloom Filter). The processings shown on the right side of the M-bit data column schematically represents processings performed when verification is performed to determine whether an element is a member or not.

First, the processings performed during generation of the M-bit data will be explained.

The Bloom Filter is a data array including M pieces of zero at the start of the processings. Now, it is assumed that, when the first element A is substituted into the first hash function $H_1$, the element A is mapped to the uppermost bit as shown in the figure. In this case, the value of the uppermost bit changes from 0 to 1. Likewise, it is assumed that, when the element A is substituted into the second hash function $H_2$, the element A is mapped to the sixth bit from the top as shown in the figure. In this case, the value of the sixth bit from the top changes from 0 to 1.

When the processing is performed on the element B and the element C in the same manner, a data array as shown in the center of the figure is generated. The generated data array is used as a filter for determining whether an element is a member of a set. In some cases, a plurality of elements may be mapped to one bit, for example the second bit from the bottom in the figure. In the Bloom Filter, this kind of collision of mapping is tolerated. Even when collision of mapping of more than two elements occurs, the value of the bit in question is maintained at one.

Subsequently, the verification processing as to whether an element is a member or not will be explained.

Before the verification processing, it is assumed that the parameter about the generation of the Bloom Filter is somehow shared with a verifier. When the verifier determines whether the element A is a valid element or not, the hash function shared in advance is used to calculate $H_1(A)$ and $H_2(A)$ to determine whether the corresponding bit values of them both are "1" or not. When all the calculated values are the same as the values of the Bloom Filter, the element A is determined to be a valid element. As shown in the figure, in some cases, hash values $H_1(D)$ and $H_2(D)$ of an invalid element D may be the same as the value of the Bloom Filter. However, in the Bloom Filter, this kind of incorrect determination caused by false positive is tolerated.

The information processing system 1 according to the embodiment uses the above-described Bloom Filter to determine whether a sensor node receiving a message is a regular member or not. More specifically, as shown in FIG. 15B, broadcast authentication unit 309 generates a Bloom Filter for each MAC included in the generated pre_BV, and transmits the obtained Bloom Filter to the sensor nodes. On the other hand, the sensor nodes verify the respectively received messages using the Bloom Filter as shown in FIG. 15B.

In some cases, during the broadcast authentication processing, confirmation process may be performed to determine whether a source node is included in a set of nodes to which a message is to be transmitted. At this occasion, the above-explained Bloom Filter is used. Accordingly, it is not necessary to attach information for identifying recipients to each message, and the amount of communication of messages can be reduced.

In FIG. 15B, there are two kinds of hash functions (k=2). However, the types of the hash functions according to the present embodiment are not limited to two types. The number of generated bits M may also be set to any value according to the number of elements n and the like.

FIGS. 14A and 14B are referenced again. The broadcast authentication processing performed by the actor nodes 30 according to the present embodiment will be explained.

After the broadcast authentication unit 309 of the actor node $A_i$ generates the transmission parameter BV, the broadcast authentication unit 309 generates an encrypted text EI (Formula 303) of the transmission information including the instruction I and a portion of the hash chain (step S311).

[Expression 10]

$$EI = Enc_{RK_{G_{x,y}}}(O^{i-1}, I) \qquad \text{(Formula 303)}$$

Subsequently, the broadcast authentication unit 309 uses the information representing relative arrangement of grids to determine whether the instruction I can be transmitted to the target grid $G_{x, y}$ according to the direct transmission method as shown in FIG. 13A (step S313). It should be noted that instead of determining the transmission method again in this step, the broadcast authentication unit 309 may store the determination result of step S303 performed in advance, and may apply the determination result to the processing of this step.

When the broadcast authentication unit 309 determines that a message can be transmitted according to the direct transmission method, the broadcast authentication unit 309 generates a message including an identifier indicating the direct transmission method, the identification information of the target grid, and the generated data EI and BV, and broadcasts the generated message to the grid $G_{x, y}$ (step S315). The contents of the message broadcast in this step are shown in the following notation 301.

[Expression 11]

$$messageM = \{\text{"Direct message"}, ID_{G_{x,y}}, EI, BV\} \qquad \text{(Notation 301)}$$

On the other hand, when the broadcast authentication unit 309 determines that a message cannot be transmitted according to the direct transmission method, the broadcast authentication unit 309 generates a MAC of the information including the data EI and BV generated using the root key $RK_{G(v, w)}$ of the relay grid (step S317). The broadcast authentication unit 309 uses the generated MAC (Formula 304) as a relay MAC (R_MAC).

[Expression 12]

$$R\_MAC = MAC_{RK_{G_{v,w}}}(EI, BV) \qquad \text{(Formula 304)}$$

Subsequently, the broadcast authentication unit 309 generates a message (Notation 302) including an identifier indicating relay transmission, the identification information of the target grid, the generated EI and BV, and the relay MAC, and broadcasts the generated message to the relay grid $G_{v, w}$ (step S319).

[Expression 13]

$$\text{message } M = \{\text{"Relaying message"}, ID_{G_{x,y}}, EI, BV, R\_MAC\} \qquad \text{(Notation 302)}$$

[Broadcast Authentication Processing Performed by Sensor Nodes]

Subsequently, the flow of the broadcast authentication processing performed by the sensor nodes will be explained in detail with reference to FIGS. 16A and 16B.

First, the sensor node $S^j$ within the grid $G_{v, w}$ receives the message broadcast by the actor node (step S351). Subsequently, the broadcast authentication unit 409 references the identification information $ID_{G(x, y)}$ of the target grid included in the message to determine whether the target grid $G_{x, y}$ is the grid in which the sensor node $S^j$ is located (step S353).

When the grid in which the sensor node $S^j$ is located is determined to be the target grid, the broadcast authentication unit 409 performs step S355 to step S371 which are explained below. When the grid in which the sensor node $S^j$ is located is determined not to be the target grid, the broadcast authentication unit 409 relays the message by performing step S373 to step S387 which are explained below.

First, the case will be explained where the grid in which the sensor node $S^j$ is located is determined to be the target grid.

In this case, the broadcast authentication unit 409 determines how the received message has been transmitted (step S355) by referencing the identifier included in the received message.

When the broadcast authentication unit 409 receives a message transmitted by way of relay transmission, the broadcast authentication unit 409 checks the relay MAC (R_MAC) included in the received message (step S357). When the relay MAC is successfully confirmed, the broadcast authentication unit 409 performs subsequent step S359.

On the other hand, when the broadcast authentication unit 409 receives a message transmitted by the direct transmission method, the broadcast authentication unit 409 performs step S359 explained below.

When the broadcast authentication unit 409 receives a message transmitted by the direct transmission method or successfully confirms the relay MAC, the broadcast authentication unit 409 decrypts the encrypted text EI included in the message (step S359). Thereafter, the broadcast authentication unit 409 uses the instruction I and a portion $O^{i-1}$ of the hash chain, obtained by decrypting the encrypted text EI, to calculate a parameter t represented by the following formula 311 (step S361).

[Expression 14]

$$t = MAC_{RK_{G_{v,w}}}(O^{i-1}, I) \qquad \text{(Formula 311)}$$

Subsequently, the broadcast authentication unit 409 checks the message transmission method again (step S363). It should be noted that instead of determining the transmission method again in this step, the determination result obtained in step S355 performed in advance may be stored, and the stored determination result may be applied to the processing of this step.

When the broadcast authentication unit 409 determines that the message is transmitted by the direct transmission method, the broadcast authentication unit 409 determines whether the value of the calculated parameter t is the same as the parameter BF included in the received message (step S365). When the parameter t=parameter BV holds, the broadcast authentication unit 409 accepts the received message (step S369), and terminates the broadcast authentication processing. On the other hand, when the parameter t=parameter BV does not hold, the broadcast authentication unit 409 discards the received message (step S371), and terminates the broadcast authentication processing.

When the broadcast authentication unit 409 determines that the message is transmitted by the relay transmission, the broadcast authentication unit 409 verifies the calculated parameter t using the Bloom Filter BF (step S367). In other words, the broadcast authentication unit 409 determines whether BF(t)∈BV holds or not. When the calculated parameter t is successfully verified by the Bloom Filter, the broadcast authentication unit 409 accepts the received message (step S369), and terminates the broadcast authentication processing. On the other hand, when the calculated parameter t is not successfully verified by the Bloom Filter, the broadcast authentication unit 409 discards the received message (step S371), and terminates the broadcast authentication processing.

Subsequently, the case will be explained where the grid in which the sensor node $S^j$ is located is determined not to be the target grid.

In this case, the broadcast authentication unit 409 determines how the received message has been transmitted (step S373) by referencing the identifier included in the received message.

When the broadcast authentication unit 409 receives a message transmitted by the direct transmission method, the broadcast authentication unit 409 checks the relay MAC (R_MAC) by using the key $RK_{G(v, w)}$ of the grid in which the sensor node $S^j$ is located (step S375).

When the broadcast authentication unit 409 receives a message transmitted by the relay transmission, the broadcast authentication unit 409 checks the relay MAC (R_MAC) by using the key $K_{G(t, u),G(v, w)}$ shared with the grid $G_{t, u}$ from which the message is transmitted (step S377).

Subsequently, the broadcast authentication unit 409 uses the information representing relative arrangement of grids and the like to find the arrangement between the target grid and the grid to which the sensor node $S^j$ belongs, and identifies the grid $G_{r, s}$ to which the message is relayed (step S379).

When the broadcast authentication unit 409 identifies the grid to which the message is relayed, the broadcast authentication unit 409 calculates a relay MAC of information including the data EI and BV by using the key shared between the grid to which the message is relayed and the grid in which the sensor node $S^j$ is located (step S381). The calculated relay MAC (R_MAC) is represented by the following formula 312.

[Expression 15]

$$R\_MAC' = MAC_{K_{G_{v,w}G_{r,s}}}(EI, BV) \qquad \text{(Formula 312)}$$

Subsequently, the broadcast authentication unit 409 determines whether other nodes in the same grid have already performed relay transmission processing of the received message (step S383).

First, a case will be explained where the other nodes in the same grid have not yet performed broadcast transmission of a message to be relayed. In this case, the broadcast authentication unit 409 generates a message (Notation 303) including an identifier indicating relay transmission, the identification information of the target grid, the generated data EI and BV, and the calculated relay MAC (R_MAC'). Thereafter, the broadcast authentication unit 409 broadcasts the generated message to the grid $G_{r, s}$ to which the message is relayed.

[Expression 16]

$$messageM = \qquad \text{(Notation 303)}$$
$$\{\text{"Relaying message"}, ID_{G_{x,y}}, EI, BV, R\_MAC'\}$$

On the other hand, when other nodes have already broadcast the message to be relayed, the broadcast authentication unit 309 halts the relay transmission processing in order to prevent redundant transmission of the message (step S387).

The actor node $A_i$ and the sensor node $S^j$ according to the present embodiment perform the above-explained broadcast authentication processing while cooperating with each other to securely broadcast a message to the sensor node which belongs to the target grid.

<Node Exclusion Processing>

Subsequently, the node exclusion processing performed by the actor nodes 30 and the sensor nodes 40 according to the present embodiment will be explained in detail with reference to FIGS. 17A to 18. FIGS. 17A and 17B are flow diagrams illustrating the node exclusion processing performed by the actor nodes 30 according to the present embodiment. FIG. 18 is a flow diagram illustrating the node exclusion processing performed by the sensor node 40 according to the present embodiment.

[Node Exclusion Processing Performed by Actor Nodes]

First, the flow of the node exclusion processing performed by the actor nodes will be explained in detail with reference to FIGS. 17A and 17B.

When a failure occurs in an actor node 30 or a sensor node 40 within the field, the data processing device 20, i.e., sink node, and the actor node 30 perform detection to find which node has caused failure (step S401). The detection of the node having failure may be performed by any method.

Subsequently, the data processing device 20 and the actor node 30 determines the type of the node having the failure (whether it is an actor node or a sensor node) (step S403). The processings of the node exclusion processing subsequently performed are different according to the type of the node having the failure.

First, a case will be explained where the node having the failure is an actor node $A_i$.

When the actor node $A_i$ causes the failure, the excluded node identification unit 207 of the data processing device 20 calculates the MAC of the identification information $ID_{A(i)}$ of the actor node $A_i$ represented by the notation 401 (step S405). As is evident from the following notation 401, this MAC is generated using the key (S-S key) shared by the data processing device 20, i.e., sink node, and each sensor node 40. The MAC represented by the notation 401 is generated for each sensor node within the grid in question. Therefore, a set of MACS represented by the notation 401 is actually generated.

[Expression 17]

$$MAC_{K_{S,S^j}}(ID_{A_i}) \quad \text{(Notation 401)}$$

Subsequently, the excluded node identification unit 207 of the data processing device 20 determines one or more actor nodes $A_k$ performing processings on behalf of the excluded actor node Ai (step S407). Subsequently, the excluded node identification unit 207 of the data processing device 20 transmits the MAC generated in step S405 to the determined proxy actor node $A_k$ (step S409).

When the node exclusion processing unit 311 of the proxy actor node $A_k$ receives the MAC from the data processing device 20, the node exclusion processing unit 311 of the proxy actor node $A_k$ generates a message represented by the notation 402. As shown below, this message includes an identifier indicating node exclusion, identification information of the actor node $A_i$ to be excluded, and a MAC of the identification information of the actor node $A_i$ to be excluded.

[Expression 18]

$$messageM = \{\text{"Revocation"}, ID_{A_j}, MAC_{K_S,K_{S^j}}(ID_{A_i})\} \quad \text{(Notation 402)}$$

When the message is generated, the node exclusion processing unit 311 transmits the generated message to the corresponding sensor node $S^j$ by unicast (step S411). By sending this message, the proxy actor node $A_k$ can notify each sensor node $S^j$ that the actor node $A_i$ is excluded.

Subsequently, the initial authentication unit 303 of the proxy actor node $A_k$ performs the above-explained initial authentication processing with the sensor node belonging to a node that has come into the coverage of the proxy actor node $A_k$ (step S413).

By performing the above-explained processings, the information processing system 1 according to the embodiment can exclude the actor node having the failure, and can maintain data exchange between the new actor node and the sensor node.

Subsequently, a case will be explained where the node having the failure is a sensor node $S^j$ in a certain grid $G_{x,y}$. In this case, the actor node $A_i$ covering the grid $G_{x,y}$ to which the sensor node $S^j$ belongs performs the following processings.

First, the node exclusion processing unit 311 of the actor node $A_i$ randomly generates random number $R_{A(i)}$ (step S415), and replaces the key $K_j$ of the failed sensor node with the random number $R_{A(i)}$, thereby updating the one-way function tree of the grid $G_{x,y}$ (step S417).

Subsequently, the node exclusion processing unit 311 uses the updated one-way function tree to generate key update information KU represented by the following formula 401 (step S419).

[Expression 19]

$$KU = \left\{ Enc_{V_1^{S^j}}(K_2^{S^j}), \ldots, Enc_{V_{h-1}^{S^j}}(K_h^{S^j} = RK_{G_{x,y}}) \right\} \quad \text{(Formula 401)}$$

In this case, in the above formula 401, a parameter h represents a height (the number of levels) of the one-way function tree. For example, in the one-way function tree as shown in FIG. 10B, the parameter h is 3, and h=3 represents the level in which the root resides. $V_i^{S<j>}$ means a key corresponding to a sibling node of a node in a level of h=i on a route to the root from a key corresponding to the sensor node $S^j$ of the one-way function tree. For example, when attention is given to a sensor node $S^1$ in the one-way function tree as shown in FIG. 10B, $V_1^{S<1>}$ is $K_2$, and $V_2^{S<1>}$ is $K_{34}$. $K_{i+1}^{S<j>}$ means a key corresponding to a node in a level of h=i+1 on a route to the root from the key corresponding to the sensor node $S^j$ of the one-way function tree. For example, when attention is given to a sensor node $S^1$ in the one-way function tree as shown in FIG. 10B, $K_2^{S<1>}$ is $K_{12}$.

Subsequently, the node exclusion processing unit 311 generates the message represented by the following notation 403. Subsequently, the broadcast authentication unit 309 uses broadcast authentication processing to transmit the generated message to sensor nodes other than the sensor node $S^j$ belonging to the grid $G_{x,y}$ (step S421).

[Expression 20]

$$\text{message } M = \{\text{"Revocation"}, ID_{S^j}, KU\} \quad \text{(Notation 403)}$$

When the other sensor nodes in the grid to which the excluded sensor node $S^j$ belongs receive the message represented by the notation 403, the sensor nodes can recognize that the sensor node $S^j$ is excluded from the system.

The key used for inter-grid communication may be compromised by a malicious third party depending on a failure occurred in the sensor node. However, what can be obtained by the malicious third party is only the information about the key unique to the sensor node having the failure, and the malicious third party cannot know the structure of the one-way function tree. Accordingly, in the node exclusion processing according to the present embodiment, the key unique to the sensor node $S^j$ having the failure is replaced with a newly generated random number, and a new key used for inter-sensor node communication is generated by reusing the structure of the one-way function tree itself. In order to cause another sensor node to execute this key regeneration processing, the actor node transmits a message including the key update information KU to the sensor node that does not have any failure. The another sensor node can easily update the key used for inter-sensor node communication in the grid by using KU included in the message.

[Node Exclusion Processing Performed by Sensor Nodes]

Subsequently, the flow of the node exclusion processing performed by the sensor node will be explained in detail with reference to FIG. 18.

First, the sensor node $S^j$ receives a message about node exclusion from the actor node $A_i$ (step S451).

Subsequently, the node exclusion processing unit 411 of the sensor node $S^j$ determines the type of the node having failure by referencing the identification information described in the received message (step S453).

In a case where the node having failure is an actor node, the node exclusion processing unit 411 first checks the MAC included in the message by using the key shared with the data processing device (step S455). When the MAC is determined to be valid, the initial authentication unit 403 of the sensor node $S^j$ subsequently performs initial authentication processing with a new node (step S457). The sensor node in the grid that was covered by the actor node having the failure can establish secure communication environment with the new proxy actor node.

Subsequently, a case will be explained where the node having the failure is a sensor node $S^j$ in the same grid $G_{x, y}$.

In this case, the node exclusion processing unit 411 of another sensor node $S^k$ in the grid receives the message transmitted using the broadcast authentication processing from the actor node covering the partition (step S459).

Subsequently, the node exclusion processing unit 411 extracts information used for updating the key used for inter-sensor node communication within the grid from among the key update information described in the received message (step S461). This extraction processing is performed by extracting information in which key $V_i^{S<j>}$ used for encryption is the same as key $K_i^{S<k>}$ stored in the sensor node $S^k$.

Subsequently, the node exclusion processing unit 411 uses the key $K_i^{s<k>}$ stored in the sensor node $S^k$ to decrypt the information extracted from the key update information (step S463). Subsequently, the node exclusion processing unit 411 uses the decrypted information to update the key of each node residing on the route of the one-way function tree (step S465).

In this processing, the sensor node $S^k$ can exclude the sensor node $S^j$ having the failure, and can also securely generate the new key for inter-sensor node communication between the sensor nodes that do not have any failure.

<Dynamic Change Processing Performed by Coverage Grids>

Figure 19B:
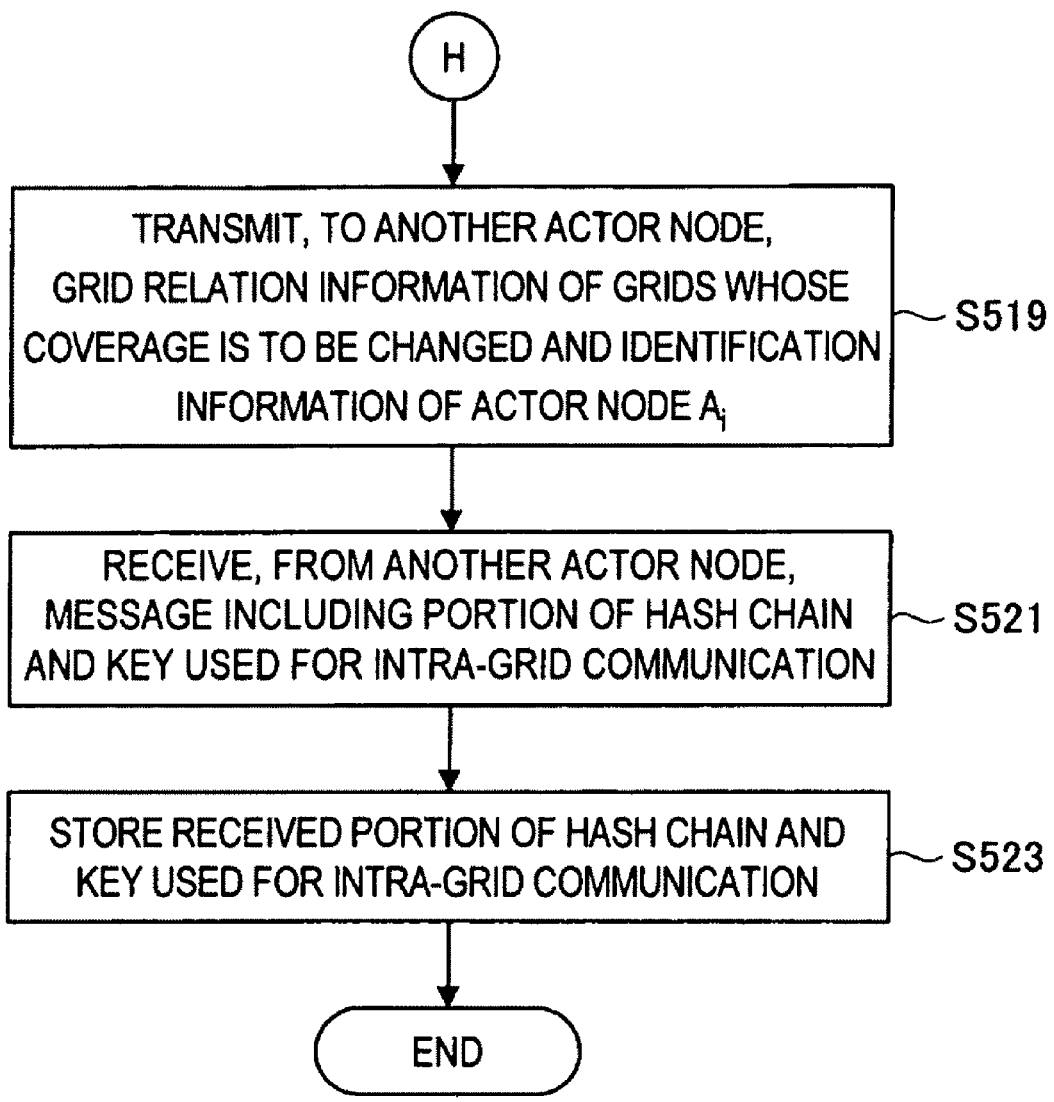
FIG. 19B is a flow diagram illustrating a dynamic change processing performed by the actor node according to the embodiment.
Figure 20:
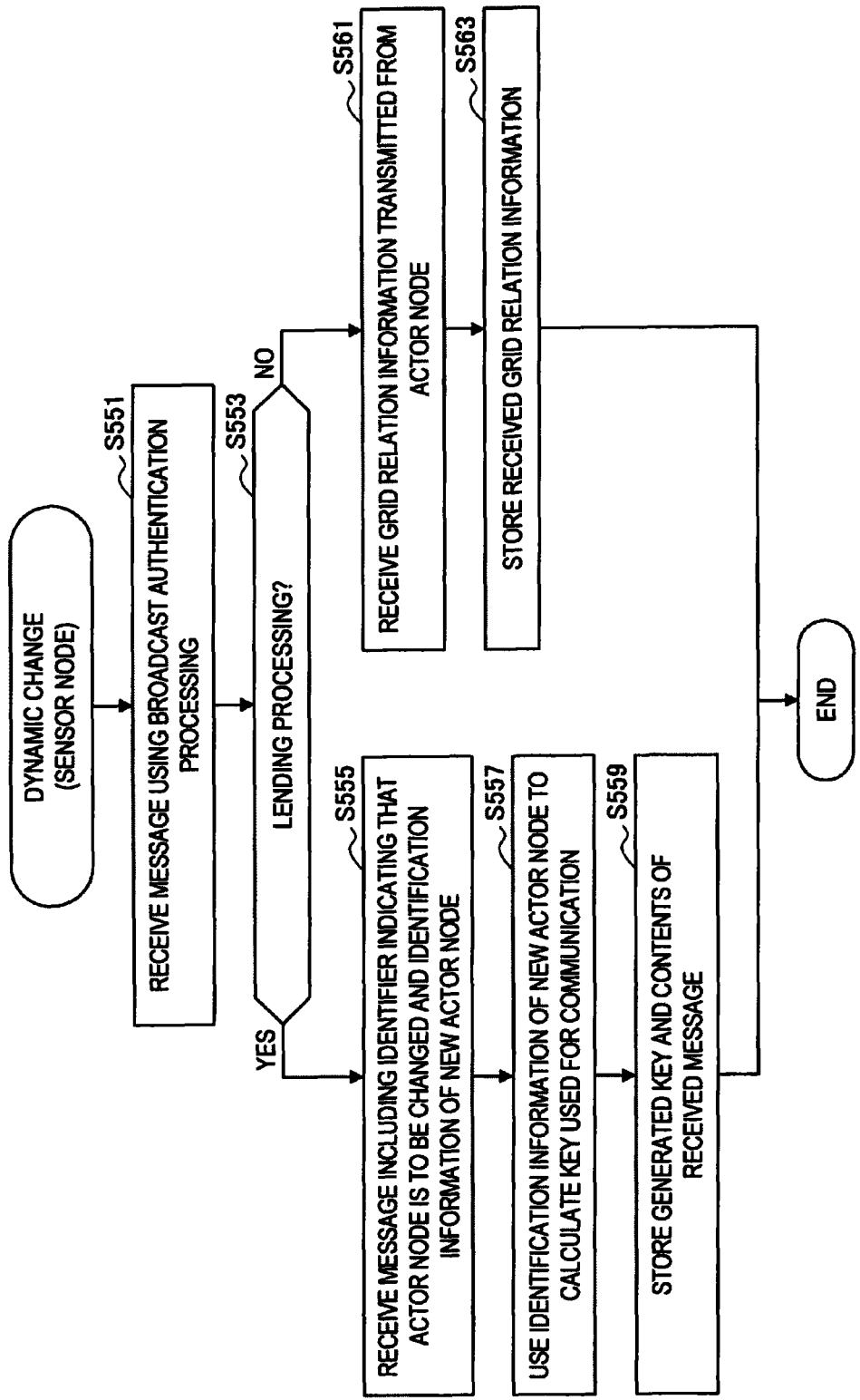
FIG. 20 is a flow diagram illustrating a dynamic change processing performed by the sensor node according to the embodiment.

Subsequently, the actor node 30 according to the present embodiment and the dynamic change processing performed by the sensor nodes 40 will be explained in detail with reference to FIGS. 19A to 23. FIGS. 19A and 19B are flow diagrams for illustrating the dynamic change processing performed by the actor nodes according to the present embodiment. FIGS. 20A and 20B are explanatory diagrams for illustrating the dynamic change processing according to the present embodiment. FIG. 21 is a flow diagram for illustrating the dynamic change processing performed by the sensor nodes according to the present embodiment. FIG. 22 is a flow diagram for illustrating the dynamic change processing performed by the actor nodes according to the present embodiment. FIG. 23 is a flow diagram for illustrating the dynamic change processing performed by the sensor nodes according to the present embodiment.

The dynamic change processing of coverage grids according to the present embodiment includes two processings, i.e., processing performed with start of dynamic change and recovery processing back to normal state, as described above. In the below explanation, the processing performed with start of dynamic change will be explained in detail with reference to FIGS. 19A to 21B.

Processing Performed with Start of Dynamic Change
[Dynamic Change Processing Performed by Actor Nodes]

First, the dynamic change processing performed by the actor nodes (processing performed with start of dynamic change) will be first explained in detail with reference to FIGS. 19A and 19B.

It should be noted that, before the following explanation, it is assumed that the information about the coverage grids changed after the occurrence of an event is notified to the actor nodes in advance by the data processing device 20 and the like. In the actor nodes, it is assumed that the storage unit 317 and the like stores and holds coverage grids $P_{A(i)}$ before dynamic change processing, adjacent grid identification information $G_{G(x, y)}$, key $K_{G(x, y)}$ used for inter-grid communication, and the like, before the event occurrence state is finished.

First, the dynamic change unit 313 of the actor node $A_i$ identifies changed coverage grids $P'_{A(i)}$ based on information and the like notified from the data processing device 20 and the like (step S501). Subsequently, for each grid $G_{x, y}$ included in the changed coverage grids, the dynamic change unit 313 determines which grids are adjacent to a grid in question, and accordingly, generates new adjacent grid identification information $G'_{G(x, y)}$ (step S503).

Subsequently, for each grid included in the changed coverage grids, the dynamic change unit 313 updates the keys used for the inter-grid communication while referencing the newly generated adjacent grid identification information $G'_{G(x, y)}$ (step S505). The dynamic change unit 313 determines whether each key used for the inter-grid communication has been changed or not. When there is a grid that does not share any key between the grids, the dynamic change unit 313 randomly generates a random number to make a random key. By doing such processing, the dynamic change unit 313 generates key $K'_{G(x, y)}$ used for new inter-grid communication.

Subsequently, the broadcast authentication unit 309 uses the broadcast authentication processing to transmit changed information $\{G'_{G(x, y)}, K'_{G(x, y)}\}$ to grids $G_{x, y}$ ($G_{x, y} \in P_{A(i)}$ and $P'_{A(i)}$) which are common in both of the original coverage grids and the changed coverage grids (step S507).

Subsequently, the dynamic change unit 313 determines the type of dynamic change. More specifically, the dynamic change unit 313 determines whether the grids $G_{x, y}$ are changed to coverage of another node or are changed from coverage of another actor node (step S509).

The flow of the change processing for switching the grids $G_{x, y}$ to coverage of another actor node will be hereinafter explained first (which may be also hereinafter referred to as lending processing).

In this case, the dynamic change unit 313 of the actor node $A_i$ receives the following message including grid relation information of the grids $G_{x,y}$ and the identification information $ID_{A(j)}$ of the actor node $A_j$ from the another actor node $A_j$ covering the grids $G_{x,y}$ (step S511). Herein the grid relation information means $\{G_{G(x,y)}, K_{G(x,y)}\}$.

[Expression 21]

$$\{ID_{A_j}, G_{G_{x,y}}, K_{G_{x,y}}\} \quad \text{(Notation 501)}$$

Subsequently, the dynamic change unit 313 of the actor node $A_i$ generates the following message represented by the notation 502, which is to be transmitted to the sensor nodes whose actor node is changed (i.e., sensor nodes belonging to the grids $G_{x,y}$).

[Expression 22]

$$messageM = \{\text{"Lending"}, ID_{A_j}, G_{G_{x,y}}, K_{G_{x,y}}\} \quad \text{(Notation 502)}$$

Subsequently, the broadcast authentication unit 309 of the actor node $A_i$ uses the broadcast authentication processing to transmit the message represented by the notation 502 to the sensor nodes belonging to the grids $G_{x,y}$ whose actor node is changed (step S513).

Subsequently, the dynamic change unit 313 of the actor node $A_i$ uses the identification information $ID_{A(j)}$ of the actor node $A_j$ and the root key $RK_{G(x,y)}$ of the grids $G_{x,y}$ to generate a new key $RK'_{G(x,y)}$ of the grids to be covered (step S515).

[Expression 23]

$$RK'_{G_{x,y}} = H(ID_{A_j}, RK_{G_{x,y}}) \quad \text{(Formula 501)}$$

Subsequently, the dynamic change unit 313 of the actor node $A_i$ generates the following message represented by the notation 503, and transmits the message to the actor node $A_j$ (step S517).

[Expression 24]

$$\text{message } M = \quad \text{(Notation (503))}$$
$$\{\text{"Update OK"}, RK'_{G_{x,y}}, \{O^t_{G_{x,y}}\}, \dots, \{O^{i-1}_{G_{x,y}}\}\}$$

In the notation 503, "Update OK" is an identifier representing completion of change. On the other hand, $\{O^t_{G(x,y)}\}$ (t≤i−1) and the like is a one-way hash chain unique to the grid $G_{x,y}$.

As explained above, the one-way hash chain is unique to each grid $G_{x,y}$, and this hash chain is shared by the actor node covering the grid and the sensor node in the grid. In the dynamic change processing according to the present embodiment in which a certain actor node causes another actor node to perform the series of processings including data collection on behalf of the actor node, the another actor node cannot know the hash chain unique to the grid. Accordingly, the actor node causing the another actor node to perform the series of processings on behalf of the actor node notifies, to the another actor node, an unused portion of the hash chain held in the actor node by attaching it to the above message.

By performing the above processings, the actor node $A_i$ causing the another node $A_i$ to perform the series of processings of the grid $G_{x,y}$ on behalf of the actor node $A_i$ can notify, to the another node $A_j$, the series of information used for managing the sensor nodes.

Subsequently, the flow of the change processing for switching the grid $G_{x,y}$ from coverage of another actor node $A_j$ (which may also be hereinafter referred to as borrowing processing) will be explained.

In this case, the dynamic change unit 313 of the actor node $A_i$ transmits the following message including grid relation information of the grids $G_{x,y}$ whose coverage is to be changed and the identification information $ID_{AO}$) of the actor node $A_i$ to the another actor node $A_i$ (step S519).

[Expression 25]

$$\{ID_{A_i}, G_{G_{x,y}}, K_{G_{x,y}}\} \quad \text{(Notation 511)}$$

Thereafter, the dynamic change unit 313 of the actor node $A_i$ receives the message represented by the notation 503 from the actor node $A_j$ originally covering the grid $G_{x,y}$ (step S521). Subsequently, the actor node $A_i$ stores, to the storage unit 317 and the like, a portion of the hash chain included in the message and the key $RK'_{G(x,y)}$ used for inter-grid communication (step S523).

Further, the actor node $A_i$ stores the two-variable polynomial formula unique to each grid (strictly speaking, polynomial formula in which identification information of each grid is substituted into one of two variables) for all the grids $G_{x,y}$. Accordingly, the actor node $A_i$ uses the polynomial formula of the grid $G_{x,y}$ that has come into the coverage of the actor node $A_i$ and the identification information of the sensor node $S^j$ belonging to this grid to calculate a pairwise key unique to the sensor node $S^j$.

By performing the above processings, the actor node $A_i$ can obtain the series of information used for managing the sensor nodes of the grid $G_{x,y}$.

[Dynamic Change Processing Performed by Sensor Nodes]

Subsequently, the dynamic change processing (processing performed with start of dynamic change) of the sensor nodes will be explained in detail with reference to FIG. 20.

Before the following explanation, it is assumed that, in the sensor nodes, the storage unit 417 and the like of stores and holds adjacent grid identification information $G_{G(x,y)}$ before dynamic change processing, key $K_{G(x,y)}$ used for inter-grid communication, and the like, before the event occurrence state is finished.

First, the dynamic change unit 413 of the sensor node $S^j$ receives the message transmitted using the broadcast authentication processing from the actor node (step S551). Subsequently, the dynamic change unit 413 determines whether the grid in which the sensor node $S^j$ is located is to be subjected to the lending processing based on the contents of the received message (step S553).

The message shown in the notation 502 is transmitted from the actor node $A_i$ to the sensor node $S^j$ belonging to the grid that is to be subjected to the lending processing. Accordingly, the sensor node $S^j$ receives the message shown in the notation 502 (step S555).

In this case, the dynamic change unit 413 uses the identification information of the new actor node included in the received message and the root key $RK_{G(x,y)}$ of the sensor node $S^j$ to calculate a new root key $RK'_{G(x,y)}$ according to the formula 501 (step S557). In addition, the dynamic change unit 413 uses the two-variable polynomial formula held in the sensor node $S^j$ and the identification information of the new actor node included in the message to calculate a pairwise key used for communication with the new actor node according to the formula 511 (step S557).

[Expression 26]

$$K_{S^j,A_i} = F_{G_{x,y}}(ID_{S^j}, ID_{A_i}) \quad \text{(Formula 511)}$$

Subsequently, the dynamic change unit 413 stores the calculated key and the contents of the received message (i.e., the identification information $ID_{A(i)}$ of the new actor node $A_i$ and the grid relation information) to the storage unit 417 and the like (step S559).

On the other hand, a message including $\{G_{G(x, y)}, K_{G(x, y)}\}$ is transmitted from the actor node $A_i$ to the sensor node $S^j$ belonging to the grid that is not to be subjected to the lending processing. Accordingly, the sensor node $S^j$ receives the message including $\{G_{G(x, y)}, K_{G(x, y)}\}$ (step S561), and stores the received grid relation information to the storage unit 417 and the like (step S563).

EMBODIMENTS

Subsequently, a specific example of dynamic change processing (processing performed with start of dynamic change) performed by the actor nodes and the sensor nodes will be explained with reference to FIGS. 21A and 21B.

In the below explanation, the following case will be considered. Coverage grids of an actor 1 to an actor 4 as shown in FIG. 21A in a normal state change to coverage grids as shown in FIG. 21B in response to a certain event. In the below explanation, the processing of the actor 1 will be briefly explained. The processings of the actor 2 to the actor 4 are also performed in the same manner as the below explanation.

Figure 21A:
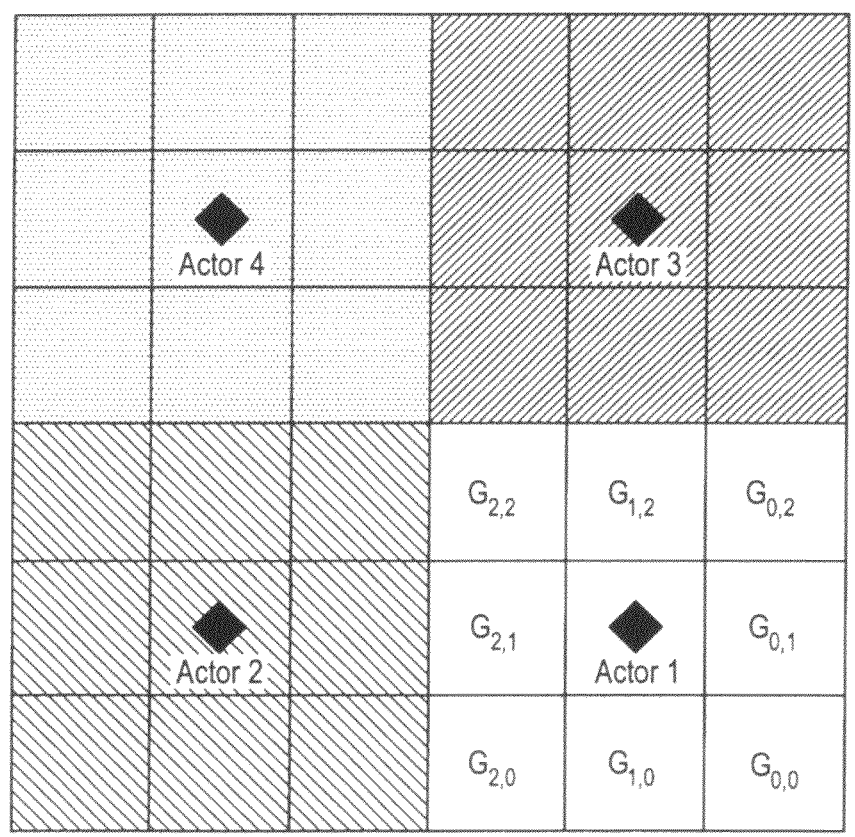
FIG. 21A is an explanatory diagram illustrating a dynamic change processing according to the embodiment.
Figure 21B:
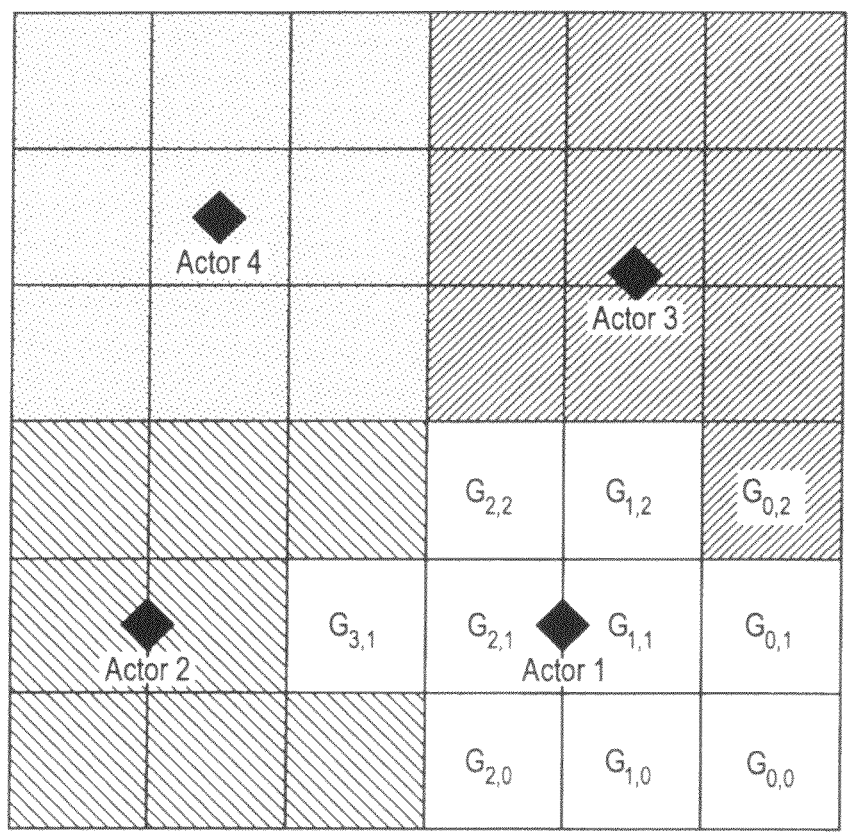
FIG. 21B is an explanatory diagram illustrating a dynamic change processing according to the embodiment.

In the normal state, the coverage grids of the actor 1 are nine grids $G_{0,0}$ to $G_{2,2}$ as shown in FIG. 21A. When these coverage grids are changed as shown in FIG. 21B in response to an event, it is understood that the grid $G_{3,1}$ is covered by the actor 1, and the grid $G_{0,2}$ is covered by the actor 3.

Accordingly, the dynamic change unit 313 of the actor 1 transmits grid relation information of changed grids to sensor nodes belonging to the grids $G_{0,0}, G_{0,1}, G_{1,0}, G_{1,1}, G_{1,2}, G_{2,0}, G_{2,1}, G_{2,2}$ which are common in both of the original coverage grids and the changed coverage grids.

In this case, the grids whose adjacent grid identification information is changed before and after the change are only three grids $G_{0,1}, G_{1,2}, G_{2,1}$. The grid relation information of the other grids does not change. Accordingly, the dynamic change unit 313 may transmit the grid relation information of the changed grids to only the changed grids, and may not transmit the grid relation information to the grids, including non-changed grids, which are common in both of the original coverage grids and the changed coverage grids.

Subsequently, attention is given to the grid $G_{0,2}$ whose actor node covering this grid is changed.

In this case, from the perspective of the actor 1, the grid $G_{0,2}$ is considered to be subjected to the lending processing. From the perspective of the actor node 3, the grid $G_{0,2}$ is considered to be subjected to the borrowing processing.

First, the dynamic change unit 313 of the actor 3 transmits the identification information $ID_{A(3)}$ of the actor 3 and the grid relation information of the grid $G_{0,2}$ to the actor 1. As a result the actor 1 broadcasts a message including the received identification information $ID_{A(3)}$, the received grid relation information of the grid $G_{0,2}$, and an identifier indicating the lending processing to the sensor nodes belonging to the grid $G_{0,2}$.

Further, the actor 1 uses the obtained identification information of the actor 3 and the root key of the grid $G_{0,2}$ stored in the actor 1 to generate a new root key. Thereafter, the actor 1 transmits a message including a portion of the hash chain, the root key newly generated, and an identifier indicating completion of change to the actor 3.

The actor 3 calculates a pairwise key unique to the sensor node belonging to the grid $G_{0,2}$, and stores the portion of the hash chain and the root key included in the received message to a predetermined location.

On the other hand, the sensor node belonging to the grid $G_{0,2}$ uses the identification information included in the message transmitted from the actor 1 to calculate a new root key and a pairwise key, and stores the calculated new key and the grid relation information included in the received message to a predetermined location.

By performing the above processings, the actor 3 can obtain a key used for the series of processings in the grid $G_{0,3}$.

It should be noted that the same processings are also performed in the grid $G_{3,1}$, and therefore, the detailed description thereabout is omitted here in the below explanation.

Recovery Processing Back to Normal State
[Dynamic Change Processing Performed Actor Nodes]

Subsequently, dynamic change processing (recovery processing back to normal state) performed by the actor nodes will be explained in detail with reference to FIG. 22.

First, the recovery processing back to normal state is started when it is decided that the actor node $A_i$ temporarily covering the grid $G_{x, y}$ returns back to an initial position (i.e., position in normal state) (step S601). At this occasion, the dynamic change unit 313 of the actor node $A_i$ generates a message including an identifier indicating recovery back to the normal state represented by the following notation 601. Subsequently, the broadcast authentication unit 309 of the actor node $A_i$ broadcasts a message generated using the broadcast authentication processing to sensor nodes in the grids currently covered by the actor node $A_j$ (step S603). Thereafter, the actor node $A_j$ moves to the initial position (step S605).

[Expression 29]

$$\text{message } M = \{\text{"Deportation"}, \{O^{t-1}_{G_{x,y}}\}\} \quad \text{(Notation 603)}$$

Subsequently, the dynamic change unit 313 of the actor node $A_i$ having caused the actor node $A_i$ to temporarily perform processings on behalf of the actor node $A_i$ generates a message including an identifier representing a message for confirming recovery represented by the following notation 602. In addition, the generated message also includes a message for replying identification information of the actor node covering the grids. Subsequently, the broadcast authentication unit 309 the actor node $A_i$ uses the broadcast authentication processing to broadcast the generated message to the sensor nodes within the coverage grids (step S607). Thereafter, the actor node $A_i$ waits for reply messages transmitted from the sensor nodes in the coverage grids

[Expression 28]

$$\text{message } M=\{\text{"Return\_confirm"}\} \quad \text{(Notation 602)}$$

The dynamic change unit 313 of the actor node $A_i$ determines whether all the sensor nodes have returned back to the normal state based on whether or not all the sensor nodes in the coverage grids have transmitted reply messages to the above message (step S609).

In a case where all the sensor nodes in the coverage grids have sent regular reply messages, and all the sensor nodes are considered to have returned back to the normal state (state before the dynamic change), the dynamic change unit 313 of the actor node $A_i$ terminates the recovery processing back to normal state. Herein, the dynamic change unit 313 of the actor node $A_i$ makes the determination based on whether the identification information included in the reply message is the identification information $ID_{A(i)}$ assigned to the actor node $A_i$.

On the other hand, in a case where all the sensor nodes in the coverage grids have not sent regular reply messages, the dynamic change unit 313 of the actor node $A_i$ generates a message represented by the following notation 603 including an identifier indicating forcible recovery request and a portion of the hash chain. It should be noted that the hash chain attached to this message is unique to the grids having not yet recovered. Thereafter, the broadcast authentication unit 313 of the actor node $A_i$ uses the broadcast authentication processing to broadcast a message generated by the dynamic change unit 313 to the sensor nodes located in the grids having not yet recovered (step S611). Thereafter, the dynamic change unit 313 returns back to step S609 and continues the processings.

[Expression 29]

$$\text{message } M = \{\text{"Deportation"}, \{O_{G_{x,y}}^{t-1}\}\} \quad \text{(Notation 603)}$$

By performing the above processings, the actor node $A_i$ whose coverage grids are temporarily changed recovers the coverage grids back to the coverage grids in the normal state, and thereby enabling operation in the normal state.

[Dynamic Change Processing Performed by Sensor Nodes]

Subsequently, the dynamic change processing (recovery processing back to normal state) performed by the sensor nodes will be explained in detail with reference to FIG. 23.

The sensor node $S^j$ in the grid $G_{x,y}$ covered by a temporarily changed actor node receives a message transmitted from the actor node by the broadcast authentication processing (step S651). Subsequently, the dynamic change unit 413 of the sensor node $S^j$ confirms the identifier described in the message (step S653).

In a case where the identifier is determined to be an identifier "Return_confirm" indicating a recovery confirmation message, the dynamic change unit 413 transmits the identification information $ID_{A(i)}$ of the actor node $A_i$ covering the grid $G_{x,y}$ as a reply message (step S655). The actor node having received the reply message can determine whether the sensor node $S^j$ has recovered back to the normal state by determining the identification information described in the message.

In addition, when the identifier is determined to be an identifier "Deportation" indicating the forcible recovery request, the dynamic change unit 413 verifies validity of the hash chain described in the message (step S657). More specifically, the dynamic change unit 413 substitutes the hash chain $O^{t-1}$ described in the message into the hash function H, i.e., system parameter, and determines whether the obtained value $H(O^{t-1})$ is equal to the hash chain $O^t$ held in the sensor node $S^j$ (step S659). When the calculated value is equal to the hash chain held in the sensor node $S^j$, the dynamic change unit 413 determines that the verification is successful. On the other hand, when the calculated value is not equal to the hash chain held in the sensor node $S^j$, the dynamic change unit 413 determines that the verification has failed.

When the hash chain has been successfully verified, the dynamic change unit 413 replaces the hash chain held in the sensor node $S^j$ with the hash chain $O^{t-1}$ included in the message (step S661). For example, in a case where the unused hash chain held in the sensor node $S^j$ is $O^{100}$, and the above message includes $O^{90}$, the dynamic change unit 413 replaces the hash chain with $O^{90}$ regardless of the state of use of the hash chains $O^{91}$ to $O^{100}$. Thereafter, the dynamic change unit 413 performs later-explained step S665.

On the other hand, when the verification of the hash chain fails, the dynamic change unit 413 discards the message transmitted from the actor node $A_i$ (message requesting forcible recovery) (step S663), and terminates the processings.

When the identifier included in the message is an identifier "Return" indicating recovery in step S653, or the hash chain is replaced in step S661, the dynamic change unit 413 performs the following processings. That is, the dynamic change unit 413 recovers the grid relation information used during the occurrence of the event back to the stored information representing the original state (information in the normal state)(step S665).

By performing the above processings, the sensor node $S^j$ in each grid recovers back to the normal state, and enables operation in the normal state.

(Hardware Configuration)

Figure 24:
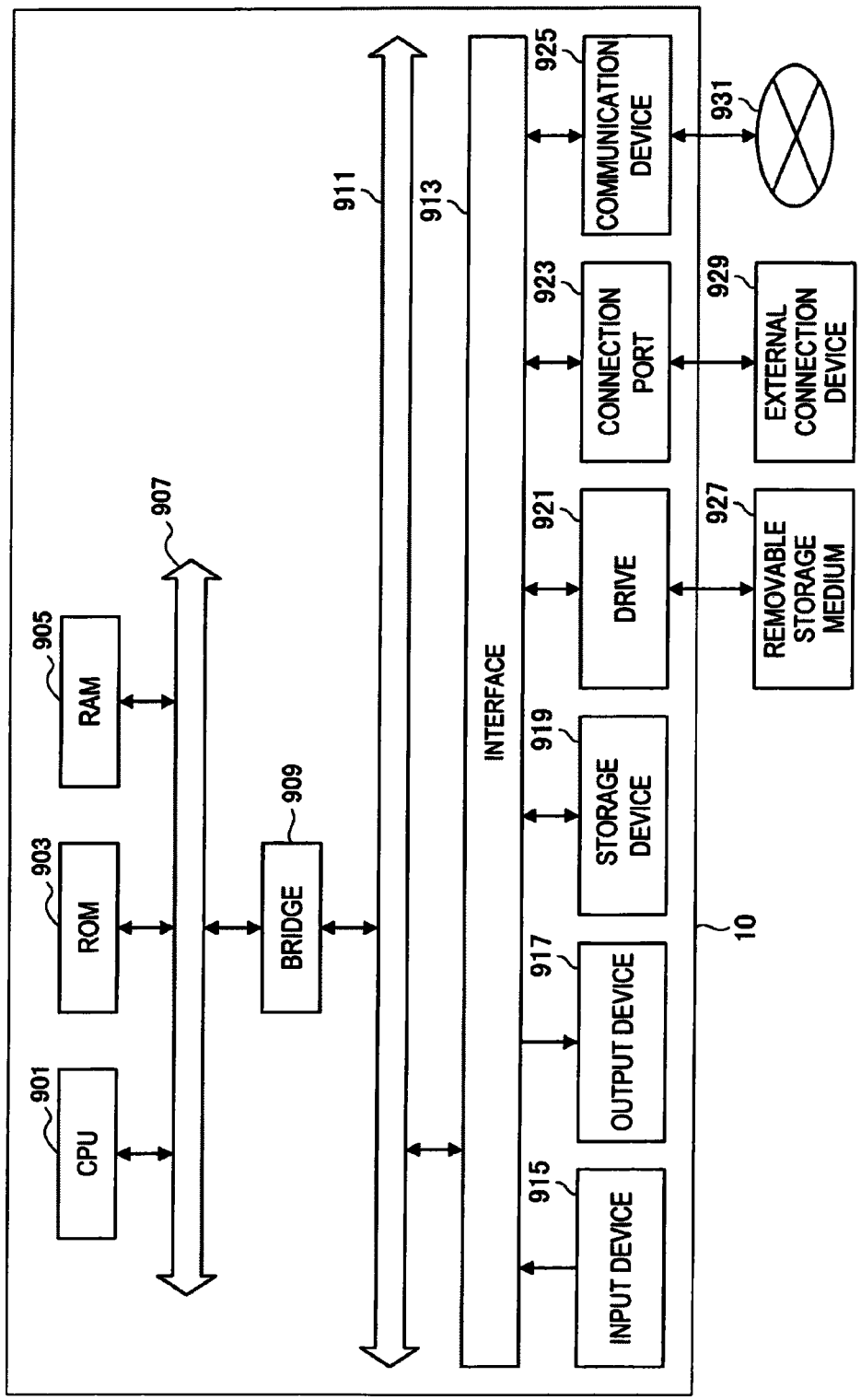
FIG. 24 is a block diagram illustrating a hardware configuration of a key processing device according to an embodiment of the present invention.

Next, the hardware configuration of the key generation device 10 according to the embodiment of the present invention will be described in detail with reference to FIG. 24. FIG. 24 is a block diagram for illustrating the hardware configuration of the key generation device 10 according to the embodiment of the present invention.

The key generation device 10 mainly includes a CPU 901, a ROM 903, and a RAM 905. Furthermore, the key generation device 10 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the key generation device 10 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the key generation device 10. Furthermore, the input device 915 generates an input signal based on, for example, information which is input by a user with the above operation means, and is configured from an input control circuit for outputting the input signal to the CPU 901. The user of the key generation device 10 can input various data to the key generation device 10 and can instruct the key generation device 10 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the key generation device 10. More specifically, the display device displays, in the form of texts or images, a result obtained by various processes performed by the key generation device 10. On the other hand, the audio output device converts an audio signal such as reproduced audio data and sound data into an analog signal, and outputs the analog signal.

The storage device 919 is a device for storing data configured as an example of a storage unit of the key generation device 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the key generation device 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the key generation device 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the key generation device 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, Heretofore, an example of the hardware configuration capable of realizing the functions of the key generation device 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

The hardware configuration of the data processing device 20 and the actor nodes 30 according to the embodiment of the present invention is the same as the hardware configuration of the key generation device 10 according to the embodiment of the present invention, and therefore, the description thereabout is omitted. The hardware configuration of the sensor node 40 according to the embodiment of the present invention is substantially the same as the hardware configuration of the key generation device 10 according to the embodiment of the present invention except that the sensor node 40 includes various kinds of sensors, and therefore, the description thereabout is omitted.

SUMMARY

As described above, the information processing system according to the embodiment of the present invention dynamically changes the grids covered by the actor nodes in the field when an event occurs. Therefore, even when an actor node handles an unexpected event when an event occurs, another actor node can collect data from sensor nodes from which the actor node handing the event is originally expected to collect data. As a result, in the information processing system according to the embodiment of the present invention, even when an event occurs, not only event-handling but also data-collection can be achieved at the same time.

It should be understood by those skilled in the art that various modifications, combinations, sub-combinations and alterations may occur depending on design requirements and other factors insofar as they are within the scope of the appended claims or the equivalents thereof.

What is claimed is:

1. An actor node capable of mutually communicating with a sensor node arranged in a predetermined region divided into a plurality of blocks, the actor node obtaining data generated by the sensor node from the sensor node arranged in a block covered by the actor node, the actor node comprising:

a key acquisition unit for obtaining, from a predetermined device, key information including a key used for communication with another actor node, key generation information for generating a key used for communication with the sensor node arranged in a coverage block, and a hash chain having a predetermined length unique to the coverage block; and a dynamic change unit for temporarily changing the coverage block in which data are obtained from the sensor node and temporarily causing the another actor node to obtain, on behalf of the actor node, data from the sensor node arranged in a partial region of at least a portion of the coverage blocks, wherein the key acquisition unit and the dynamic change unit are implemented by a central processing unit (CPU), and wherein the dynamic change unit obtains identification information unique to the another actor node from the another actor node, the dynamic change unit notifies, to the sensor node arranged in the partial region, the identification information unique to the another actor node and an identifier indicating temporary change of the actor node performing data collection, the dynamic change unit notifies, to the another actor node, a portion of the hash chain and a temporary key generated using the identification information unique to the another actor node and the key used for communication with the sensor node arranged in the partial region.

2. The actor node according to claim 1, wherein the actor node holds block identification information for identifying blocks adjacent to each other for each of the plurality of blocks included in the coverage blocks, when the dynamic change unit delegates the partial region to the another actor node, the dynamic change unit identifies a block whose block identification information is changed, and the dynamic change unit notifies, to a sensor node arranged in a coverage block common to original coverage blocks and changed coverage blocks, the changed block identification information and information about a predetermined key changed due to the delegation.

3. The actor node according to claim 2, wherein when the delegation of the partial region to the another actor node is not cancelled, the dynamic change unit notifies, to the sensor node arranged in the partial region, an identifier indicating cancellation of the delegation to the another actor node and a portion of the hash chain.

4. The actor node according to claim 1, wherein the key generation information includes information about a two-variable polynomial formula of a predetermined degree, and the actor node calculates the key unique to the sensor node used for communication with the sensor node arranged in the coverage block by substituting identification information unique to the actor node and identification information unique to the sensor node into the two-variable polynomial formula.

5. The actor node according to claim 1, wherein when the actor node is unable to directly communicate with a sensor node, with which the actor node is to communicate, arranged in a coverage block, the actor node uses Bloom Filter to generate information for identifying the sensor node with which the actor node is to communicate.

6. The actor node according to claim 1, further comprising:

a node exclusion unit for excluding a sensor node or another actor node having a failure from a system, wherein the node exclusion unit is implemented by the CPU, and wherein when the sensor node has a failure, the node exclusion unit randomly selects a random number in place of a key, unique to the sensor node having the failure, used for communication with the sensor node having the failure, the node exclusion unit uses the randomly selected random number to generate key update information for updating a key used for inter-sensor node communication in a block, to which the sensor node having the failure belongs, by another sensor node arranged in the block, and the node exclusion unit notifies the key update information to the block including the sensor node having the failure.

7. The actor node according to claim 1, further comprising:

an initial authentication unit for performing mutual authentication, prior to communication, with the sensor node arranged in the coverage blocks; and a node exclusion unit for excluding a sensor node having a failure or another actor node from a system, wherein the node exclusion unit and the initial authentication unit are implemented by the CPU, and wherein in a case where a failure occurs in the another actor node, and the actor node is to newly cover the block that was covered by the another actor node, the node exclusion unit notifies, to the sensor node belonging to the block newly covered by the actor node, identification information unique to the actor node and an identifier indicating that the actor node having the failure is to be excluded, and the initial authentication unit performs mutual authentication with the sensor node belonging to the block newly covered by the actor node.

8. A coverage block change method performed by an actor node capable of mutually communicating with a sensor node arranged in a predetermined region divided into a plurality of blocks, the actor node obtaining data generated by the sensor node from the sensor node arranged in a block covered by the actor node, the coverage block change method comprising the steps of:

obtaining, from a predetermined device, key information including a key used for communication with another actor node, key generation information for generating a key used for communication with the sensor node arranged in a coverage block, and a hash chain having a predetermined length unique to the coverage block; and temporarily changing the coverage block in which data are obtained from the sensor node and temporarily causing the another actor node to obtain, on behalf of the actor node, data from the sensor node arranged in a partial region of at least a portion of the coverage blocks, wherein in the step of temporarily causing the another actor node to obtain the data on behalf of the actor node, identification information unique to the another actor node is obtained from the another actor node, the identification information unique to the another actor node and an identifier indicating temporary change of the actor node performing data collection are notified to the sensor node arranged in the partial region, and a portion of the hash chain and a temporary key generated using the identification information unique to the another actor node and the key used for communication with the sensor node arranged in the partial region are notified to the another actor node.

9. A non-transitory computer readable medium having stored thereon a program for causing a computer to function as an actor node capable of mutually communicating with a sensor node arranged in a predetermined region divided into a plurality of blocks, the actor node obtaining data generated by the sensor node from the sensor node arranged in a block covered by the actor node, the program causing the computer to realize:

a key acquisition function for obtaining, from a predetermined device, key information including a key used for communication with another actor node, key generation information for generating a key used for communication with the sensor node arranged in a coverage block, and a hash chain having a predetermined length unique to the coverage block; and a dynamic change function for temporarily changing the coverage block in which data are obtained from the sensor node and temporarily causing the another actor node to obtain, on behalf of the actor node, data from the sensor node arranged in a partial region of at least a portion of the coverage blocks, the dynamic change function including a function for obtaining identification information unique to the another actor node from the another actor node, a function for notifying, to the sensor node arranged in the partial region, the identification information unique to the another actor node and an identifier indicating temporary change of the actor node performing data collection, and a function for notifying, to the another actor node, a portion of the hash chain and a temporary key generated using the identification information unique to the another actor node and the key used for communication with the sensor node arranged in the partial region.

10. An information processing system comprising:

a sensor node arranged in a predetermined region divided into a plurality of blocks, the sensor node generating predetermined data in the block in which the sensor node is arranged; and an actor node for obtaining the data generated by the sensor node from the sensor node arranged in the block covered by the actor node, wherein the actor node includes:

a key acquisition unit for obtaining, from a predetermined device, key information including a key used for communication with another actor node, key generation information for generating a key used for communication with the sensor node arranged in a coverage block, and a hash chain having a predetermined length unique to the coverage block; and a dynamic change unit for temporarily changing the coverage block in which data are obtained from the sensor node and temporarily causing the another actor node to obtain, on behalf of the actor node, data from the sensor node arranged in a partial region of at least a portion of the coverage blocks, the key acquisition unit and the dynamic change unit are implemented by a central processing unit (CPU), the dynamic change unit of the actor node obtains identification information unique to the another actor node from the another actor node, the dynamic change unit notifies, to the sensor node arranged in the partial region, the identification information unique to the another actor node and an identifier indicating temporary change of the actor node performing data collection, the dynamic change unit notifies, to the another actor node, a portion of the hash chain and a temporary key generated using the identification information unique to the another actor node and the key used for communication with the sensor node arranged in the partial region, the sensor node includes:

a key acquisition unit for obtaining, from a predetermined device, key information including key generation information for generating a key used for communication with the actor node or another sensor node and a hash chain having a predetermined length unique to the block in which the sensor node is arranged; and a dynamic change unit for temporarily changing a parameter used for communication with the another sensor node according to an instruction given by the actor node to which the generated data are transmitted, and when the actor node instructs the sensor node to temporarily change the recipient of the data to the another actor node, the dynamic change unit of the sensor node uses the identification information unique to the another actor node notified by the actor node to update a key used for communication with the another actor node and a key used for communication with the another sensor node, and wherein the key acquisition unit and the dynamic change unit are implemented by the CPU.

* * * * *